(12) United States Patent
Taguchi

(10) Patent No.: US 12,196,897 B2
(45) Date of Patent: Jan. 14, 2025

(54) PHOTON COUNTING DETECTOR

(71) Applicant: THE JOHNS HOPKINS UNIVERSITY, Baltimore, MD (US)

(72) Inventor: Katsuyuki Taguchi, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 267 days.

(21) Appl. No.: 17/795,697

(22) PCT Filed: Jan. 27, 2021

(86) PCT No.: PCT/US2021/015288
§ 371 (c)(1),
(2) Date: Jul. 27, 2022

(87) PCT Pub. No.: WO2021/154851
PCT Pub. Date: Aug. 5, 2021

(65) Prior Publication Data
US 2023/0095795 A1    Mar. 30, 2023

Related U.S. Application Data

(60) Provisional application No. 62/966,463, filed on Jan. 27, 2020.

(51) Int. Cl.
*G01T 1/24* (2006.01)
(52) U.S. Cl.
CPC .................................. *G01T 1/247* (2013.01)

(58) Field of Classification Search
CPC .............................. G01T 1/247; G01T 1/2985
See application file for complete search history.

(56) References Cited

U.S. PATENT DOCUMENTS

| | | |
|---|---|---|
| 6,207,958 B1 | 3/2001 | Giakos |
| 6,559,453 B2 | 5/2003 | Lundqvist |
| 6,590,215 B2 | 7/2003 | Nygard et al. |
| 7,433,443 B1 | 10/2008 | Tkaczyk et al. |

(Continued)

OTHER PUBLICATIONS

Iritsky, E. (RU International Officer), International Search Report and Written Opinion in corresponding International Application No. PCT/US2021/015288 mailed on May 13, 2021, 6 pages.

(Continued)

*Primary Examiner* — Christine S. Kim
(74) *Attorney, Agent, or Firm* — MH2 Technology Law Group LLP

(57) ABSTRACT

A method, a system, a device, and a computer program produce for photon detection is disclosed. The method includes receiving, by a plurality of anodes, a photon via one or more of the plurality of anodes; measuring respective voltages of the photon at each of the plurality of anodes; counting incidents in which the photon is detected by more than one of the plurality of anodes based on the measuring; and outputting information regarding a counted number of incidents in which the photon is detected by more than one of the plurality of anodes, wherein the information regarding the courted number of incidents in which the photon is detected by more than one of the plurality of anodes is used as part of a production of an image associated with the received photon.

20 Claims, 28 Drawing Sheets

Pair-wise MEICC for sub-pixel resolution. There is a coincidence counter for each of the neighbor pixels, e.g., POI and pixel N, POI and pixel S, etc. No charge sharing at the POI indicates that the photon was incident onto region 3, while charge sharing with pixel N means the photon hit region 1.

MEICC parameters
- # of counters (energy windows)
- Threshold energies
- # of coincidence counters (CC)
- How CC are linked
- Windowing scheme (threshold or direct windowing)
- 4 neighbors (NSEW pixels) or 8 neighbors (all of 3x3 pixels)

(56) References Cited

U.S. PATENT DOCUMENTS

| | | | |
|---|---|---|---|
| 9,031,197 B2* | 5/2015 | Spahn | H04N 5/32 |
| | | | 378/98.8 |
| 9,784,854 B2 | 10/2017 | Blevis et al. | |
| 10,024,979 B1 | 7/2018 | Viswanath et al. | |
| 10,292,669 B2 | 5/2019 | Ishitsu et al. | |
| 10,365,380 B2 | 7/2019 | Booker et al. | |
| 11,540,791 B2 | 1/2023 | Goederer et al. | |
| 11,883,216 B2 | 1/2024 | Goederer et al. | |
| 2013/0193333 A1 | 8/2013 | Oda | |
| 2015/0049855 A1 | 2/2015 | Funk et al. | |
| 2020/0069266 A1* | 3/2020 | Cai | A61B 6/4241 |

OTHER PUBLICATIONS

Alvarez, Robert E. "Estimator for photon counting energy selective x-ray imaging with multibin pulse height analysis." Medical physics 38.5 (2011): 2324-2334.

Ballabriga, R. et al. "Photon counting detectors for X-ray imaging with emphasis on CT." IEEE Transactions on Radiation and Plasma Medical Sciences 5.4 (2020): 422-440.

Ballabriga, R. et al. "Review of hybrid pixel detector readout ASICs for spectroscopic X-ray imaging." Journal of Instrumentation 11.01 (2016): P01007.

Ballabriga, R. et al. "The Medipix3 prototype, a pixel readout chip working in single photon counting mode with improved spectrometric performance." IEEE Transactions on Nuclear Science 54.5 (2007): 1824-1829.

Bellazzini, R. et al. "Pixie III: a very large area photon-counting CMOS pixel ASIC for sharp X-ray spectral imaging." Journal of Instrumentation 10.01 (2015): C01032.

Cormode, David P. et al. "Atherosclerotic plaque composition: analysis with multicolor CT and targeted gold nanoparticles." Radiology 256.3 (2010): 774-782.

Faby, Sebastian et al. "Performance of today's dual energy CT and future multi energy CT in virtual non-contrast imaging and in iodine quantification: a simulation study." Medical physics 42.7 (2015): 4349-4366.

Feuerlein, Sebastian et al. "Multienergy photon-counting K-edge imaging: potential for improved luminal depiction in vascular imaging." Radiology 249.3 (2008): 1010-1016.

Fredenberg, Erik et al. "Energy resolution of a photon-counting silicon strip detector." Nuclear Instruments and Methods in Physics Research Section A: Accelerators, Spectrometers, Detectors and Associated Equipment 613.1 (2010): 156-162.

Gutjahr, Ralf et al. "Human imaging with photon counting-based computed tomography at clinical dose levels: contrast-to-noise ratio and cadaver studies." Investigative radiology 51.7 (2016): 421-429.

Heanue, Joseph A. et al. "CdZnTe detector array for a scanning-beam digital x-ray system." Medical Imaging 1999: Physics of Medical Imaging. vol. 3659. SPIE, 1999.

Hsieh, Scott S. et al. "A dynamic attenuator improves spectral imaging with energy-discriminating, photon counting detectors." IEEE transactions on medical imaging 34.3 (2014): 729-739.

Hsieh, Scott S. "Coincidence counters for charge sharing compensation in spectroscopic photon counting detectors." IEEE transactions on medical imaging 39.3 (2019): 678-687.

Hsieh, Scott S. et al. "Digital count summing vs analog charge summing for photon counting detectors: A performance simulation study." Medical physics 45.9 (2018): 4085-4093.

Hsieh, Scott S. et al. "Improving pulse detection in multibin photon-counting detectors." Journal of Medical Imaging 3.2 (2016): 023505-023505.

Koenig, Thomas et al. "Charge summing in spectroscopic x-ray detectors with high-Z sensors." IEEE Transactions on Nuclear Science 60.6 (2013): 4713-4718.

Lee, Okkyun et al. "Estimation of basis line-integrals in a spectral distortion-modeled photon counting detector using low-order polynomial approximation of x-ray transmittance." IEEE transactions on medical imaging 36.2 (2016): 560-573.

Lee, Okkyun et al. "Estimation of basis line-integrals in a spectral distortion-modeled photon counting detector using low-rank approximation-based x-ray transmittance modeling: K-edge imaging application." IEEE transactions on medical imaging 36.11 (2017): 2389-2403.

Leng, Shuai et al. "Dose-efficient ultrahigh-resolution scan mode using a photon counting detector computed tomography system." Journal of Medical Imaging 3.4 (2016): 043504-043504.

Macias-Montero, J-G. et al. "ERICA: an energy resolving photon counting readout ASIC for X-ray in-line cameras." Journal of Instrumentation 11.12 (2016): C12027.

Maj et al., "Measurements of Matching and Noise Performance of a Prototype Readout Chip in 40 nm CMOS Process for Hybrid Pixel Detectors," IEEE Transactions on Nuclear Science, vol. 62, No. 1, Feb. 2015.

Michel et al., "A fundamental method to determine the signal-to-noise ratio (SNR) and detective quantum efficiency (DQE) for a photon counting pixel detector," Nuclear Instruments and Methods in Physics Research A 568 (2006) 799-802.

Pan et al., "Computed Tomography in Color: NanoK-Enhanced Spectral CT Molecular Imaging, " Functional Nanocolloids, Angew. Chem. Int. Ed. 2010, 49, 9635-9639.

Pourmorteza et al., "Dose Efficiency of Quarter-Millimeter Photon-Counting Computed Tomography First-in-Human Results," Investigative Radiology, vol. 53, No. 6, Jun. 2018, 365-372.

Pourmorteza et al., "Abdominal Imaging with Contrast-enhanced Photoncounting CT: First Human Experience," Radiology, vol. 279, No. 1, Apr. 2016, 239-245.

Roessl et al., "K-edge imaging in x-ray computed tomography using multi-bin photon counting detectors," Phys. Med. Biol. 52 (2007) 4679-4696.

Schmidt et al., "A Spectral CT Method to Directly Estimate Basis Material Maps From Experimental Photon-Counting Data," IEEE Transactions on Medical Imaging, vol. 36, No. 9, Sep. 2017, 1808-1819.

Stierstorfer, Karl et al. "A Monte Carlo assessment of the spectral performance of four types of photon counting detectors." arXiv preprint arXiv:2408.07538 (2024).

Stierstorfer, "Modeling the frequency-dependent detective quantum efficiency of photon-counting x-ray detectors," Med. Phys. 45 (1), Jan. 2018, 156-166.

Stierstorfer et al., "Modeling the DQE(f) of photon-counting detectors: impact of the pixel sensitivity profile," Phys. Med. Biol. 64 (2019) 105008 (14pp).

Symons et al., "Feasibility of Dose-reduced Chest CT with Photon-counting Detectors: Initial Results in Humans," Radiology: vol. 0, No. 0, 2017, 1-10.

Taguchi, "Vision 20/20: Single photon counting x-ray detectors in medical imaging," Med. Phys. 40 (10), Oct. 2013, 100901-1 to 100901-19.

Taguchi et al., "Spatio-energetic cross talk in photon counting detectors: Detector model and correlated Poisson data generator," Med. Phys. 43 (12), Dec. 2016, 6386-6404.

Taguchi et al., "Spatio-energetic cross-talk in photon counting detectors: Numerical detector model (PcTK) and workflow for CT image quality assessment," Med. Phys. 45 (5), May 2018, 1985-1998.

Taguchi et al., "Spatio-energetic cross-talk in photon counting detectors: N 3 N binning and sub-pixel masking," Med. Phys. 45 (11), Nov. 2018, 4822-4842.

Taguchi et al., "Direct energy binning for photon counting detectors: Simulation study," Med Phys. 2024;51:70-79.

Taguchi, "Assessment of Multienergy Interpixel Coincidence Counters (MEICC) for Charge Sharing Correction or Compensation for Photon Counting Detectors With Boxcar Signals," IEEE Transactions on Radiation and Plasma Medical Sciences, vol. 5, No. 4, Jul. 2021, 465-475.

Taguchi et al., "Assessment of multi-energy inter-pixel coincidence counters for photon-counting detectors at the presence of charge sharing and pulse pileup: A simulation study," Medical Physics. 2021;48:4909-4925.

(56) References Cited

OTHER PUBLICATIONS

Taguchi, "Multi-energy inter-pixel coincidence counters for charge sharing correction and compensation in photon counting detectors," Med. Phys. 47 (5), May 2020, 2085-2098.

Ullberg et al., "Measurements of a dual-energy fast photon counting CdTe detector with integrated charge sharing correction," Medical Imaging 2013: Physics of Medical Imaging, Proc. of SPIE vol. 8668, 86680P.

Yu et al., "Evaluation of conventional imaging performance in a research whole-body CT system with a photon-counting detector array," Phys. Med. Biol. 61 (2016) 1572-1595.

Yu et al., "How Low Can We Go in Radiation Dose for the Data-completion Scan on a Research Whole-body Photon-counting CT System," J Comput Assist Tomogr. Author manuscript; available in PMC Jul. 1, 2017, 20 pages.

Yu et al., "Noise performance of low-dose CT: comparison between an energy integrating detector and a photon counting detector using a whole-body research photon counting CT scanner," Journal of Medical Imaging 3(4), 043503 (Oct.-Dec. 2016), 043503-1 to 043503-6.

\* cited by examiner

(1) Full scale design. $N_{CC} = N_C \times N_C = 16$

|    |    | Neighboring pixels ||||
|----|----|------|------|------|------|
|    | -  | W1   | W2   | W3   | W4   |
| W1 | C1 | CC11 | CC12 | CC13 | CC14 |
| W2 | C2 | CC21 | CC22 | CC23 | CC24 |
| W3 | C3 | CC31 | CC32 | CC33 | CC34 |
| W4 | C4 | CC41 | CC42 | CC43 | CC44 |

FIG. 6A

(2) Moderate design. $N_{CC} = N_C + \alpha = 6$

|    |    | Neighboring pixels ||||
|----|----|------|------|----|----|
|    | -  | W1   | W2   | W3 | W4 |
| W1 | C1 | CC1Y | CC1Y | CC1Y | CC1Y |
| W2 | C2 | CC2Y | CC2Y | CC2Y | CC2Y |
| W3 | C3 | CC31 | CC32 | -  | -  |
| W4 | C4 | CC41 | CC42 | -  | -  |

FIG. 6B

(3) Minimal info design. $N_{CC} = N_C = 4$

|    |    | Neighboring pixels ||||
|----|----|------|------|----|----|
|    | -  | W1   | W2   | W3 | W4 |
| W1 | C1 | CC1Y | CC1Y | CC1Y | CC1Y |
| W2 | C2 | CC2Y | CC2Y | CC2Y | CC2Y |
| W3 | C3 | CC3Y | CC3Y | -  | -  |
| W4 | C4 | CC4Y | CC4Y | -  | -  |

FIG. 6C

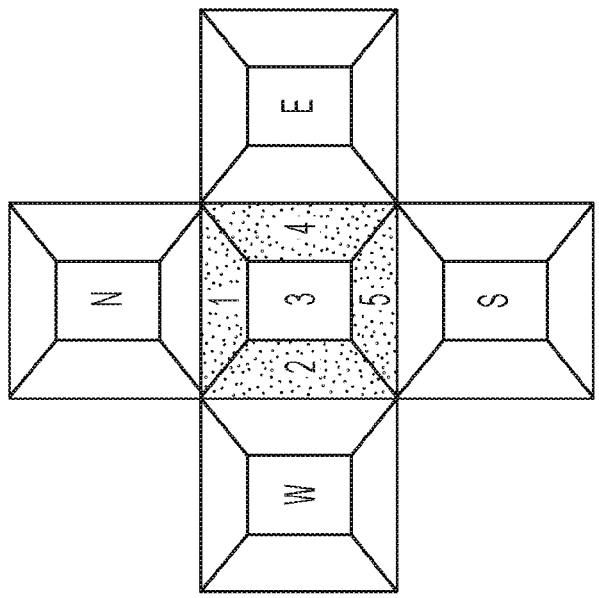

Pair-wise MEICC for sub-pixel resolution. There is a coincidence counter for each of the neighbor pixels, e.g., POI and pixel N, POI and pixel S, etc. No charge sharing at the POI indicates that the photon was incident onto region 3, while charge sharing with pixel N means the photon hit region 1.

MEICC parameters
- # of counters (energy windows)
- Threshold energies
- # of coincidence counters (CC)
- How CC are linked
- Windowing scheme (threshold or direct windowing)
- 4 neighbors (NSEW pixels) or 8 neighbors (all of 3x3 pixels)

FIG. 7

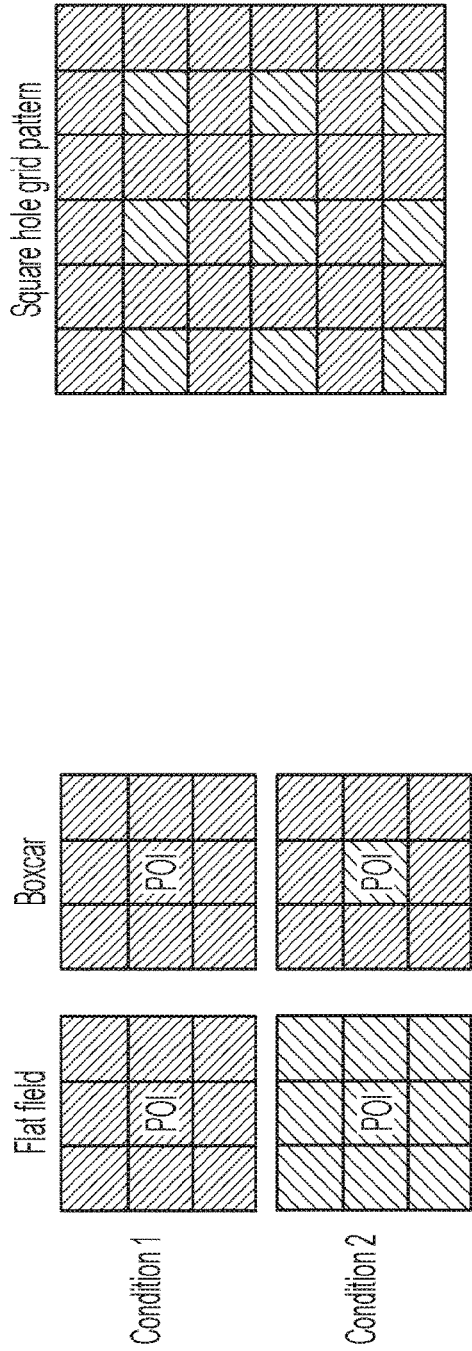
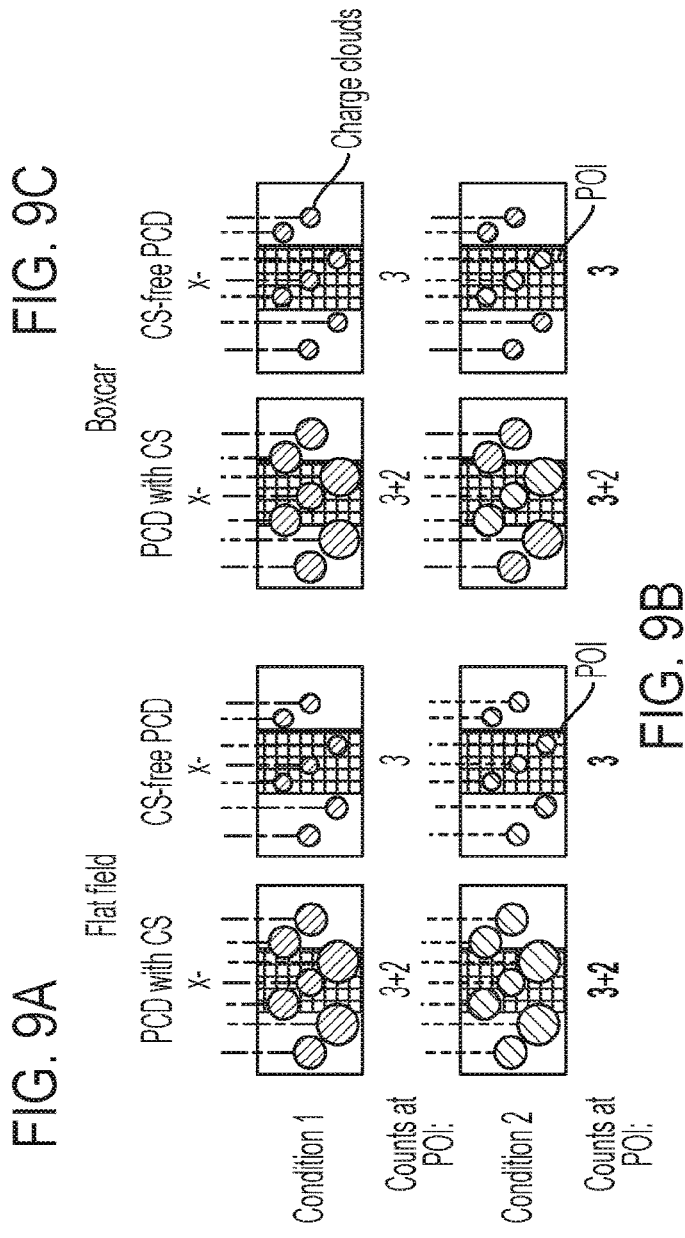
FIG. 9A
FIG. 9B
FIG. 9C

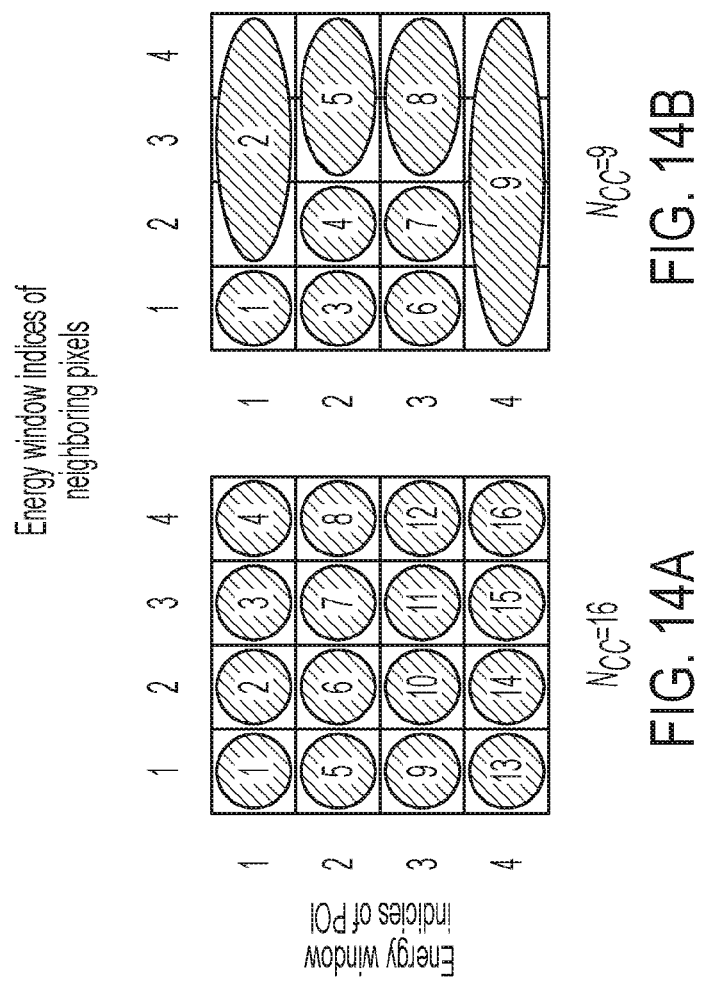

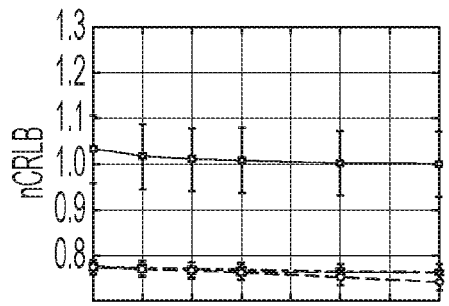
FIG. 15A
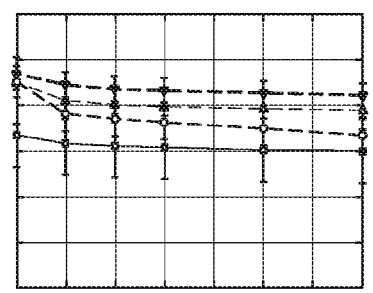
FIG. 15B
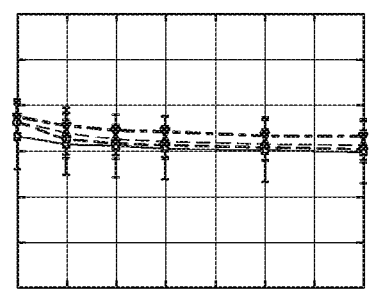
FIG. 15C
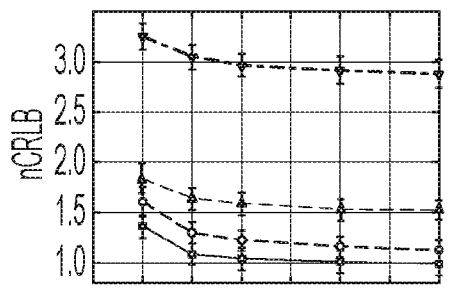
FIG. 15D
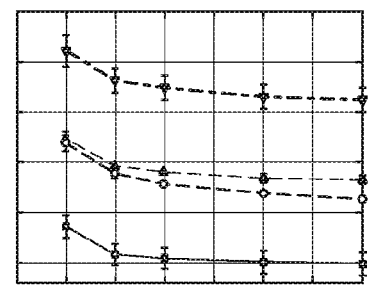
FIG. 15E
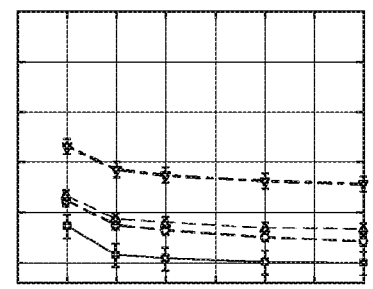
FIG. 15F
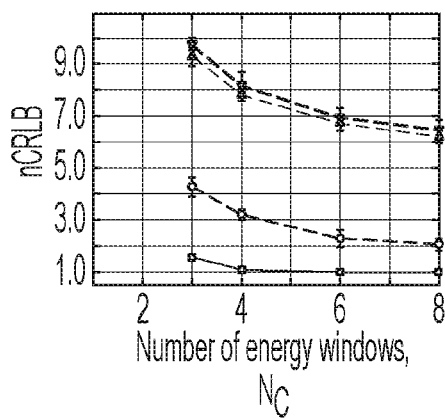
FIG. 15G
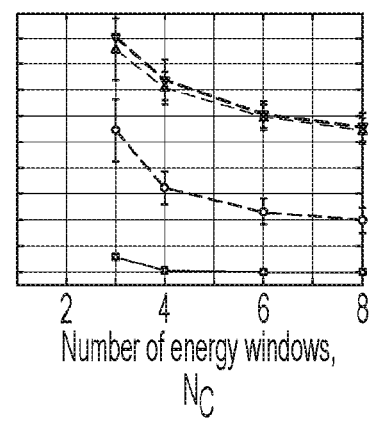
FIG. 15H
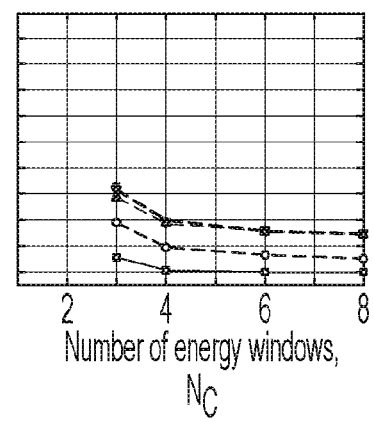
FIG. 15I

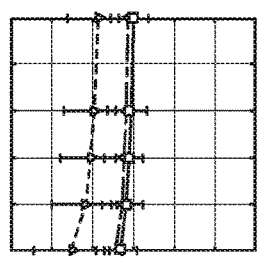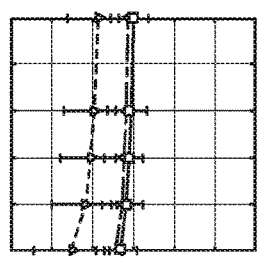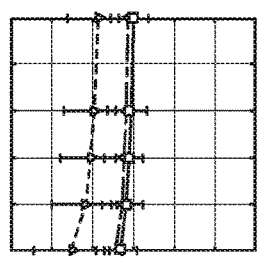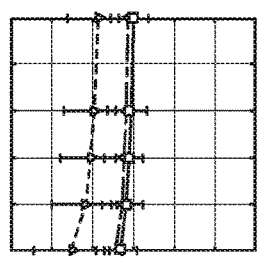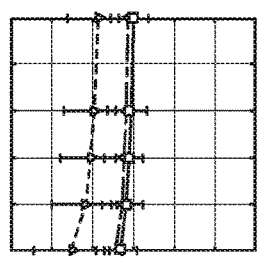
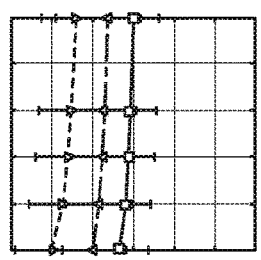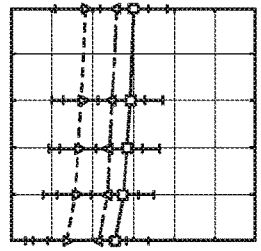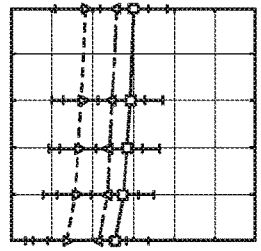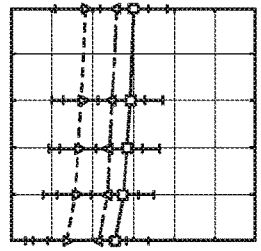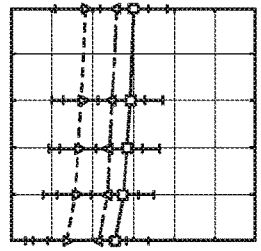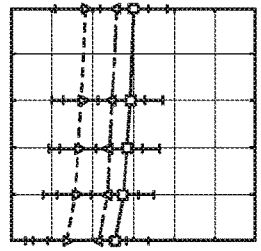
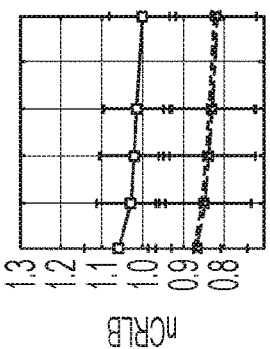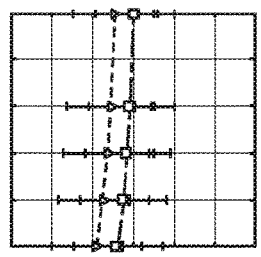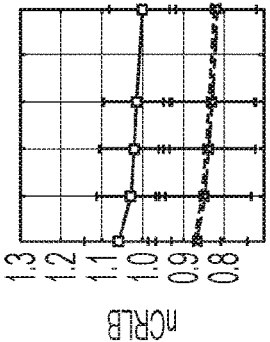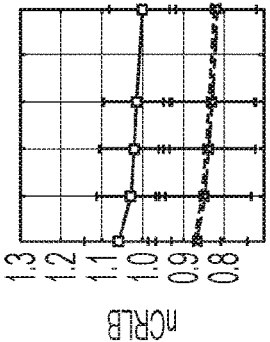
FIG. 17A – FIG. 17O $E_{thr}$ = 20, 45, 70, 95 keV
$E_0$ = 0, 40, 0, 40 keV = 80 keV
Eff = 32.5, 57.5, 82.5, 107.5
ACS = 80 -> bin 3
DCS = 1+1 -> 32.5*2 = 65 -> bin $E_{thr}$ = 20, 50, 80, 110 keV
$E_0$ = 10, 70, 10, 30 keV ACS processing scheme

| 1 | 2 | 3 |
|---|---|---|
| 4 | 5 | 6 |
| 7 | 8 | 9 |

(A)

| 0 | 38 | 0 |
|---|----|---|
| 0 | 42 | 0 |
| 0 | 0  | 0 |

(B)

k=1, k=2, k=3, k=4

| 0 | 38 | 0 |
|---|----|---|
| 0 | 42 | 0 |
| 0 | 0  | 0 |

(C)

Winner pixel = 5
Winner super-pixel

| 0 | 38 | 0 |
|---|----|---|
| 0 | 42 | 0 |
| 0 | 0  | 0 |

(D)

Winner window = 3

$E_{thr}$ = 20, 50, 80, 110 keV
$E_0$ = 10, 70, 10, 30 keV

DCS processing scheme

| 1 | 2 | 3 |
|---|---|---|
| 4 | 5 | 6 |
| 7 | 8 | 9 |

(E)

| - | C | - |
|---|---|---|
| - | C | - |
| - | - | - |

(F)

k=1, k=2, k=3, k=4

| - | C | - |
|---|---|---|
| - | C | - |
| - | - | - |

(G)

Winner pixel = 2
Winner super-pixel

| - | C1 | - |
|---|----|---|
| - | C1 | - |
| - | -  | - |

(H)

Winner window = 2

FIG. 20

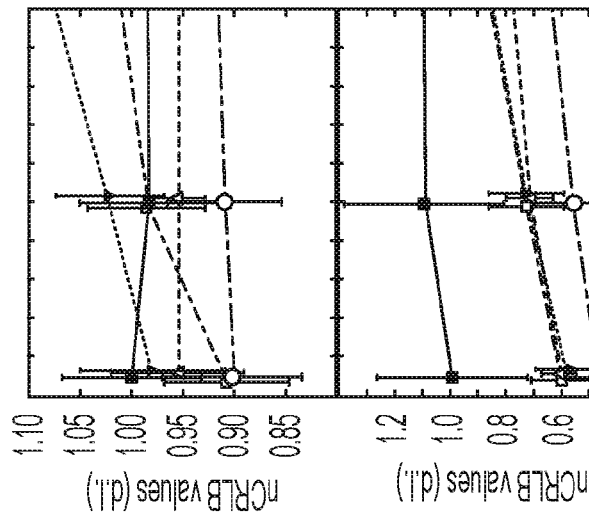
FIG. 24A
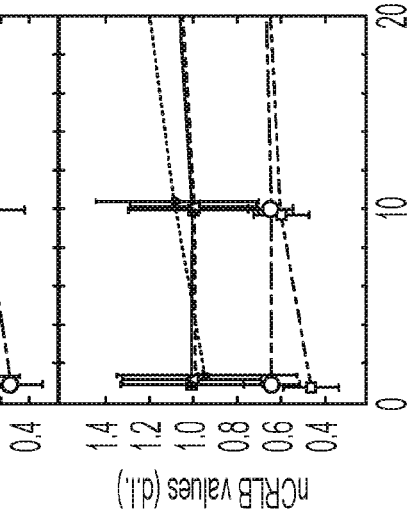
FIG. 24B
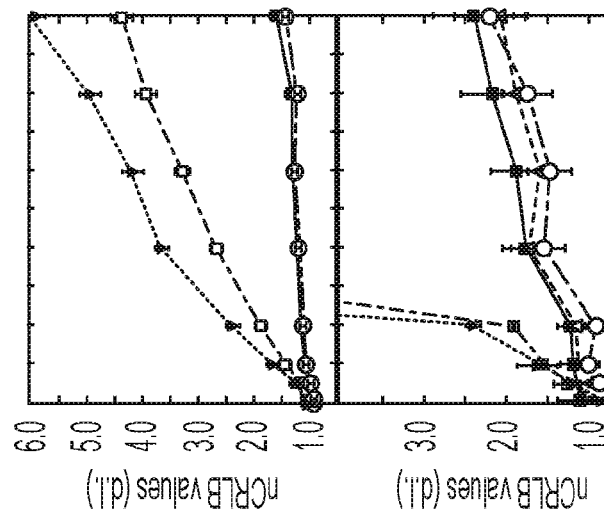
FIG. 24C
FIG. 24E
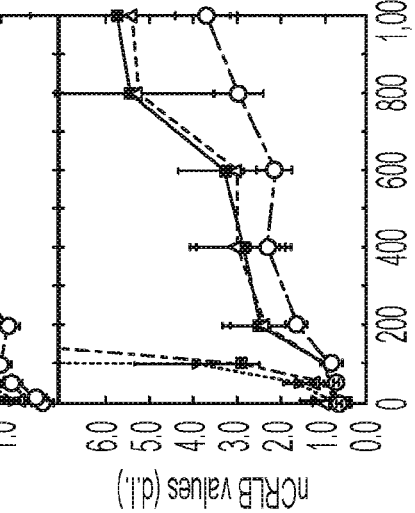
FIG. 24D
FIG. 24F
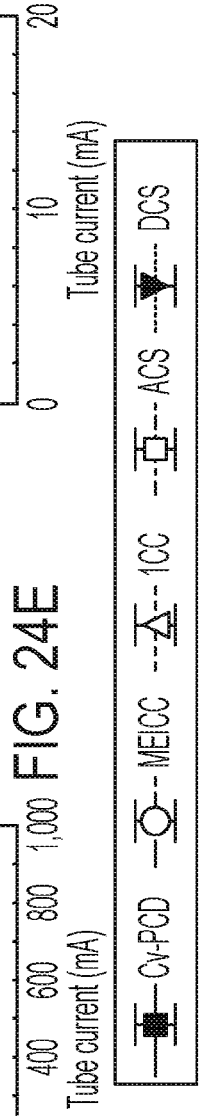

PHOTON COUNTING DETECTOR

CROSS-REFERENCE TO RELATED APPLICATIONS

This application is a national stage entry from International Application No. PCT/US2021/015288, filed on Jan. 27, 2021, published as International Publication No. WO 2021/154851 A1 on Aug. 5, 2021, and claims priority to U.S. Provisional Patent Application 62/966,463, which was filed on Jan. 27, 2020, all of which are incorporated herein by reference in their entireties.

FIELD

This disclosure relates to photon counting detectors, and more particularly about systems, devices, and methods for multi-energy inter-pixel coincidence counters for charge sharing correction and compensation in photon counting detectors.

BACKGROUND

Photon counting detector-based x-ray computed tomography (PCD-CT) is a technique used to develop and produce CT images and enable a variety of clinical applications. Examples for using PCD-CT systems may include obtaining images with higher spatial resolution, improved soft tissue contrast, stronger contrast agent enhancement, obtaining quantitative CT imaging and biomarkers, more accurate soft tissue material characterization, K-edge imaging, and simultaneous multi-contrast agent imaging, as well as reducing the dose of radiation. However, due to "charge sharing" issues images produced by PCD-CT are susceptible to undesirable errors, degraded quality, etc. As described herein, "charge sharing" may occur in a situation in which a photon in an x-ray system is detected by multiple anodes used to detect the photon. Thus, when charge sharing occurs, the photon counts are inaccurate, thereby leading to the aforementioned problems.

PCDs with charge sharing correction and compensation schemes can be categorized into two groups based on whether the scheme aims at (1a/1b) an event-based real-time charge sharing correction/rejection or (2) a reading-based post-acquisition correction/compensation. (1a) PCDs with event-based real-time charge sharing correction: Some PCD designs aim at event-based real-time processing that corrects for the charge sharing for each event. The technology is a sophisticated inter-pixel communication to identify coincident events and correct charge sharing for each event in real time.

An analog version of the scheme functions as follows: when a pixel detects an event, it holds onto the analog signal, communicates with neighboring pixels, and if one or more coincident events are detected by the neighboring pixels, it sums the analog signals from the neighboring pixels, identifies the primary incident pixel, and increments a counter of the incident pixel for an energy window that corresponds to the total (corrected) energy. Despite the complexity of the circuitry design, it works exceptionally well when count rates are low. A major challenge is that it needs to keep analog signals (split energies) until the correction process for the event-of-interest is completed. The process takes time and if a new photon arrives at the detector during the process, it may be mistreated as charge sharing. As a consequence, the use of the analog charge sharing correction scheme makes PCDs ~10 times slower for some circuitries.

A digital version of the scheme functions as follows: when a pixel detects an event, it digitizes the charge (i.e., to a candidate count for a candidate energy window), communicates with neighboring pixels, and if one or more coincident candidate counts are found in the neighboring pixels, it identifies the primary incident pixel and an energy window, and increment a counter of the incident pixel for the energy window. The energy window is determined based on the candidate energy windows of the candidate counts in the neighboring pixels. The digital version is easier to implement than the analog counterpart, as signals are digitized at an early phase and digital signals are easier to handle. The accuracy may be somewhat degraded when energy window widths are large, because the charge is digitized early and the circuitry essentially migrates counts from one energy window to another. With both analog and digital versions, the event-based real-time charge sharing correction process is inherently and intricately integrated with the primary counting process, and there is a concern that it would degrade PCD's counting capability at high count rates.

(1b) PCDs with event-based real-time charge sharing rejection: These PCDs reject charge shared events by separating them from non-charge shared events. Some PCDs throw away charge shared events, while others store charge shared events to designated counters. Coincidence rejection schemes have fewer processes than charge sharing correction schemes, and therefore, can be more efficient; however, by setting aside any coincidence events, this approach may exclude too many photons including spill-out charge sharing.

(2) PCDs with reading-based post-acquisition charge sharing correction: Schemes for reading-based post-acquisition correction/compensation simply record additional information and are independent of the primary counting process, and therefore are expected to be as fast as detectors without the scheme.

Recently, it has been proposed to add one coincidence counter per pixel to the standard PCD in order to count the number of double-counting events with four neighboring pixels. With no energy resolution in the coincidence counter, however, it cannot tell how many events were spill-in and how many were spill-out, nor can it tell how many counts went into each energy window. Therefore, its ability to correct for charge sharing is of interest and the performance of this approach is accessed and compared with the method disclosed herein.

List-mode acquisition: The list-mode acquisition for x-rays, which records all of the events with the energy and time stamp. Once data are acquired, software can find coincident events and recover the energy. The problems of employing the list-mode acquisition for x-ray CT are a large amount of list-mode data and the lack of tiling ability. One CT scan may contain as many as $10^{12}$ events [from $10^7$ events/s/mm$^2$×$10^{-4}$ s/reading×$10^3$ readings/rotation×5 rotations× ($10^3$ mm×300 mm) detector area] and it would be challenging to transfer data from a rotating gantry to a stationary one in real-time and perform a charge sharing correction.

A software solution has also been proposed that is a model-based compensation algorithm. Such algorithms can address the bias using a charge sharing model; however, they cannot eliminate the noise added by charge sharing, because it is impossible to estimate (and subtract) counts of each random noise realization. Thus, the signal-to-noise ratio of the processed data is expected to be worse than what would be achieved by PCDs without charge sharing.

Accordingly, systems and/or methods to compensate and/or correct for such instances in which charge sharing occurs between multiple anodes are needed.

SUMMARY

In accordance with examples of the present disclosure, a method for photon detection is disclosed. The method comprises receiving, by a plurality of anodes, a photon via one or more of the plurality of anodes; measuring respective voltages of the photon at each of the plurality of anodes; counting incidents in which the photon is detected by more than one of the plurality of anodes based on the measuring; and outputting information regarding a counted number of incidents in which the photon is detected by more than one of the plurality of anodes, wherein the information regarding the counted number of incidents in which the photon is detected by more than one of the plurality of anodes is used as part of a production of an image associated with the received photon.

In accordance with examples of the present disclosure, a computer program product is disclosed that comprises a computer readable storage medium having program instructions embodied therewith, the program instructions executable by a computing device to cause the computing device to perform operations comprising: receiving, by a plurality of anodes, a photon via one or more of the plurality of anodes; measuring respective voltages of the photon at each of the plurality of anodes; counting incidents in which the photon is detected by more than one of the plurality of anodes based on the measuring; and outputting information regarding a counted number of incidents in which the photon is detected by more than one of the plurality of anodes, wherein the information regarding the counted number of incidents in which the photon is detected by more than one of the plurality of anodes is used as part of a production of an image associated with the received photon.

In accordance with examples of the present disclosure, a system is disclosed that comprises a processor, a computer readable memory, a non-transitory computer readable storage medium associated with a computing device, and program instructions executable by the computing device to cause the computing device to perform operations comprising: receiving, by a computing device coupled to a plurality of anodes, a photon via one or more of the plurality of anodes; measuring, by the computing device, respective voltages of the photon at each of the plurality of anodes; counting, by the computing device, incidents in which the photon is detected by more than one of the plurality of anodes based on the measuring; and outputting, by the computing device, information regarding a counted number of incidents in which the photon is detected by more than one of the plurality of anodes, wherein the information regarding the counted number of incidents in which the photon is detected by more than one of the plurality of anodes is used as part of a production of an image associated with the received photon.

Various additional features can be included in the method, the computer program product, and/or the system including one or more of the following. The counting is based on one or more primary counters and more than one coincidence counters, wherein each primary counter comprises more than one sub-counters. The one or more primary counters are configured to operate using direct windowing or thresholding. The one or more primary counters are configured to incremented for an event within a corresponding two-sided energy window. The one or more primary counters are configured to incremented for an event about a corresponding one-sided energy threshold. In some examples, a number of coincidence counters is equal to or less than a square of the number of primary counters. The counting is based on information without spatial information with different number of neighbor pixels. In some examples, an output of 8-neighbor pixels is treated as one input. In some examples, an output of 4-neighbor pixels is treated as one input. In some examples, an output of N-neighbor pixels with N≠4 and N≠8 are treated as one input. In some examples, an output comprises outputs from the one or more primary counters and outputs from the coincidence counters. The output further comprises an additional charge sharing correction/compensation component that takes the one or more primary counters and the coincidence counters data and outputs a corrected/compensated data. In some examples, a number of the output is equal to $N_C$. In some examples, a number of the output is greater than $N_C$. In some examples, a number of the output is less than $N_C$. The output comprises spatial information with different number of neighbor pixels. The spatial information is with pair-wise connected pixel-specific coincidence counters and provides information for identifying incident locations based on the primary counters and the coincidence counters. The counting is based on three different energy levels. The three different energy levels comprise a first energy range of about 20 keV to about 50 keV, a second energy range of about 50 keV to about 80 keV, and a third energy range of about equal to or greater than 80 keV. The counting further comprises counting a number of spill-in and spill-out incidents with respect to a pixel of interest. A spill-in incident includes an incident in which a voltage measurement of the photon for a pixel neighboring the pixel of interest is greater than a voltage measurement of the photon for the pixel of interest. A spill-out incident includes an incident in which a voltage measurement of the photon for a pixel neighboring the pixel of interest is less than a voltage measurement of the photon for the pixel of interest. The photon originates as part of operation of a photon counting detector-based x-ray computed tomography (PCD-CT) system.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 6A shows a diagram connection for the arrangement of FIG. 3.

FIG. 6B shows a diagram connection for the arrangement of FIG. 4.

FIG. 6C shows a diagram connection for the arrangement of FIG. 5.

FIG. 7 shows a diagram for pair-wise MEICC for sub-pixel resolution, where there is a coincidence counter for each of the neighbor pixels, e.g., POI and pixel N, POI and pixel S, etc. and no charge sharing at the POI indicates that the photon was incident onto region 3, while charge sharing with pixel N means the photon hit region 1.

FIG. 9A shows views from the top. Flat-field signals change x-ray spectrum and intensity incident onto all of the pixels from condition 1 to condition 2, while boxcar signals changes x-rays onto the pixel-of-interest (POI) only. Condition 1 refers to the baseline spectrum and condition 2 refers to the target spectrum. FIG. 9B shows side views. The lines and spheres are x-rays and electronic charge clouds; those in blue and red are generated with conditions 1 and 2, respectively. Numbers are the number of counts produced at the POI. With the flat-field scheme, the POI of PCD with charge sharing (CS) counts five events with condition 2 including two additional events via spill-in charge sharing from neighboring pixels, which is more than the CS-free PCD counts (i.e., three events). In contrast, with the boxcar scheme, the PCD with charge sharing counts three events with condition 2, which is the same as CS-free PCD does. The additional two events with condition 1 come into the POI via spill-in and degrade the signal-to-noise ratio of data. FIG. 9C shows a square hole grid pattern, which could be used to measure the DQE at the Nyquist frequency of the PCD, includes the boxcar signal pattern.

FIG. 14A and FIG. 14B show coincidence counter indices with $N_C$=4 showing how each of sixteen (FIG. 14A) and nine (FIG. 14B) coincidence counters was energetically connected to four energy windows of neighboring pixels and four windows of the POI. Multiple energy windows are bundled and treated as one wide energy window in (FIG. 14B). For example, coincidence counter #2 in (FIG. 14B) will add a count if energy window 1 of the POI produces a count and at least one of energy windows 2-4 of at least one of the neighboring pixels generates a count.

FIG. 15A, FIG. 15B, FIG. 15C, FIG. 15D, FIG. 15E, FIG. 15F, FIG. 15G, FIG. 15H, and FIG. 15I show the results of single-pixel measurements. The nCRLB values for line integral estimation for conventional CT imaging (FIG. 15A-FIG. 15C), water thickness estimation for water-bone material decomposition (FIG. 15D-FIG. 15F), and gold thickness estimation for K-edge imaging (FIG. 15G-FIG. 15I). The results are with flat-field signals with 225-µm pixels (FIG. 15A, FIG. 15D, and FIG. 15G), spatially modulated boxcar signals with 225-µm pixels (FIG. 15B, FIG. 15E, and FIG. 15H), and boxcar signals with 450-µm pixels (FIG. 15C, FIG. 15F, and FIG. 15I). Error bars indicate standard deviations of nCRLB over three sets of 1,000 noise realizations. nCRLB=Cramer-Rao lower bound normalized by that of CS-free PCD with $N_C$=8; PCD=photon counting detector; CS=charge sharing; 1CC=PCD with one coincidence counter; MEICC=the proposed, multi-energy inter-pixel coincidence counter.

FIG. 17A, FIG. 17B, FIG. 17C, FIG. 17D, FIG. 17E, FIG. 17F, FIG. 17G, FIG. 17H, FIG. 17I, FIG. 17J, FIG. 17K, FIG. 17L, FIG. 17M, FIG. 17N, and FIG. 17O shows plots of the results of N×N super-pixel measurements with flat-field signals. The nCRLB values for line integral estimation for conventional CT imaging (FIG. 17A-FIG. 17E), water thickness estimation for water-bone material decomposition (FIG. 17F-FIG. 17J), and gold thickness estimation for K-edge imaging (FIG. 17K-FIG. 17O). Error bars indicate standard deviations of nCRLB over six sets of 500 noise realizations. nCRLB=Cramer-Rao lower bound normalized by that of the CS-free PCD with $N_C$=6; PCD=photon counting detector; CS=charge sharing; 1CC=PCD with one coincidence counter; $N_C$=The number of energy windows.

FIG. 20A, FIG. 20B, FIG. 20C, FIG. 20D, FIG. 20E, FIG. 20F, FIG. 20G, and FIG. 20H show the event processing schemes for ACS (FIG. 20A-FIG. 20D) and DCS (FIG. 20E-FIG. 20H). In this example, the PCD had four energy thresholds at 20, 45, 70, and 95 keV, which made the effective energies for four windows 32.5, 57.5, 82.5, and 107.5 keV. An incident photon carrying 80 keV was incident on the boundary of pixels 2 and 5. For ACS, the largest energy recorded above the lowest threshold 20 keV during the event processing time $T_A$ was 38 keV at pixel 2 and 42 keV at pixel 5 (FIG. 20B). The 2×2 super-pixel energy was 80 keV for both k=1 and 2, 42 keV for both k=3 and 4 (FIG. 20C). The winner super-pixel was k=1, the winner pixel was pixel 5, and the winner window was 3 that corresponded to the energy of super-pixel k=1, 80 keV (FIG. 20D). For DCS, the energy window that gained a count during the event processing time $T_D$ was window 2 at both pixel 2 and pixel 5 (FIG. 20F). The 2×2 super-pixel energy was 65 keV (=32.5+32.5 keV) for both k=1 and 2, 32.5 keV for both k=3 and 4 (FIG. 20G). The winner super-pixel was k=1, the winner pixel was pixel 2 (instead of pixel 5), and the winner window was window 2 (instead of window 3) that corresponded to the energy of super-pixel k=1, 65 keV (FIG. 20H). A random number was used for a tie-breaker.

(FIG. 22A) ACS with various $T_A$'s at 1 mA; (FIG. 22B) DCS with various $T_D$'s at 1 mA; (FIG. 22C-FIG. 22E) ACS with $T_A$=20 ns, DCS with $T_D$=20 ns, and the conventional PCD at 1 mA (FIG. 22C), 10 mA (FIG. 22D), and 100 mA (FIG. 22E).

FIG. 24A, FIG. 24B, FIG. 24C, FIG. 24D, FIG. 24E, and FIG. 24F show plots of the nCRLBs for the conventional CT imaging (FIG. 24A and FIG. 24B), the water-bone material decomposition (FIG. 24C and FIG. 24D), and K-edge imaging (FIG. 24E and FIG. 24F), plotted over a larger range (FIG. 24A, FIG. 24C, FIG. 24E) or a narrower range (FIG. 24B, FIG. 24D, FIG. 24F) of tube current values. For (FIG. 24B, FIG. 24D, FIG. 24F), markers were placed at slightly horizontally shifted locations for better visibility. Error bars indicate the standard deviations over 2,000 Bootstrap re-samples. "Cv-PCD"=Conventional PCD.

DESCRIPTION OF THE EMBODIMENTS

Figure 1A:
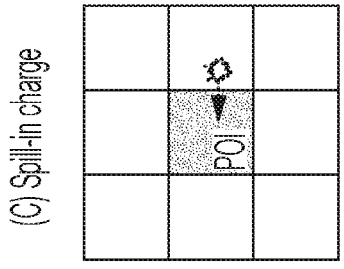
FIG. 1A, FIG. 1B, and FIG. 1C show a top view along the x-ray path of 3×3 pixels

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention; it is to be understood that other embodiments may be utilized and that changes may be made without departing from the scope of the invention. The following description is, therefore, merely exemplary.

Smaller pixel sizes of x-ray photon counting detectors (PCDs) are advantageous for count rate capabilities but disadvantageous for charge sharing. With charge sharing, the energy of an x-ray photon may be split and one photon may produce two or more counts at adjacent pixels, both at lower energies than the incident energy. This "double-counting" increases noise variance and degrades the spectral response. Overall, it has a significantly negative impact on the performance of PCD-based computed tomography (CT). Charge sharing is induced by the detection physics and occurs regardless of count rates; thus, it is impossible to avoid. As disclosed herein is a method that has a potential to address both noise and bias added by charge sharing.

As described herein, a method is disclosed that applies a multi-energy inter-pixel coincidence counter (MEICC) technique, which uses energy-dependent coincidence counters, keeps the book of charge sharing events during data acquisition, and provides the exact number of charge sharing occurrences, which can be used to either correct or compensate for them after the acquisition is completed. MEICC does not interfere with the primary counting process; therefore, PCDs with MEICC will remain as fast as those without MEICC. MEICC can be implemented using current electronics technology because its inter-pixel coincidence counters used to handle digital data are rather simple. A Cramer-Rao lower bound (CRLB) of PCDs is evaluated with and without MEICC using a Monte Carlo simulation.

When the number of energy windows was 4 or larger and eight neighboring pixels were used, the CRLBs of 225-µm PCD with MEICC normalized by those of the current PCD with the same number of windows were 0.361-0.383 for water density images of two basis functions, which was only 5.7-16.4% worse than those of a PCD without charge sharing (which were at 0.329-0.358). In contrast, the normalized CRLBs of the PCD with one coincidence counter were 0.466-0.499, which were 37.3-45.6% worse than the PCD without charge sharing. The use of eight neighboring pixels provided ~10% better CRLB values than four neighboring pixels for MEICC. With four energy windows, decreasing the number of coincidence counters from 16 to 9 only slightly increased the CRLB from 0.255 to 0.269 (which corresponded to as little as a 5.5% change). The normalized CRLBs of MEICC for K-edge imaging (gold) were 0.295-0.426, while those of the one coincidence counter were 0.926-0.959 and the ideal PCDs were 0.126-0.146.

Figures 2A, 2B:
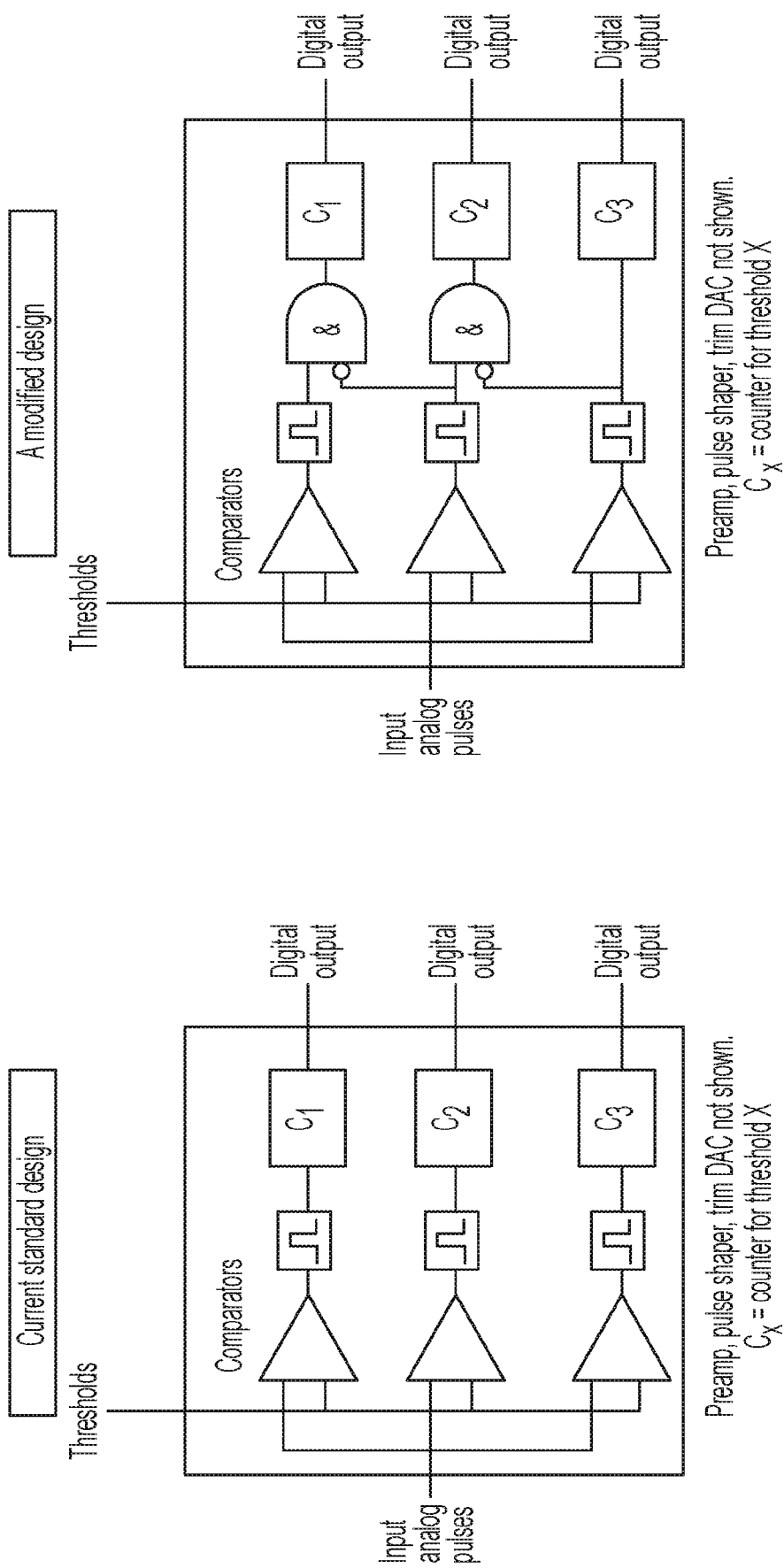
FIG. 2A and FIG. 2B show diagrams of conventional pulse height analyzer without (FIG. 2A) and with (FIG. 2B) direct windowing.

The disclosed MEICC provides spectral information that can be used to address charge sharing problems in PCDs and is expected to satisfy the requirements for clinical x-ray CT. MEICC is very effective especially for K-edge imaging, which requires accurate spectral information. Note that a loose definition of charge sharing is used in this disclosure, including fluorescence x-ray emission and its reabsorption, which splits the energy of an incident x-ray photon into multiple charge clouds onto different pixels. Every time an x-ray photon hits a detector pixel, a PCD free from charge sharing adds one count to an energy window that corresponds to the photon's energy (FIG. 2A). In most cases with the prototype PCDs, however, the energy of the x-ray photon is split between two adjacent pixels, which produce two counts at lower energies. For example, a 90-keV photon may produce one count at 60 keV at one pixel and another count at 30 keV at a neighboring pixel (FIG. 2B and FIG. 2C). This is called double-counting and it increases noise variance, degrades the spatial resolution, and degrades the energy response, which consequently weakens the strength of spectral signals. Overall, it has a significantly negative impact on the performance of PCD-CT. Charge sharing is impossible to avoid because it is inherent to the detection physics, and a probability of charge sharing is ~70% with a pixel size of 225 µm. Larger pixels such as 1 mm (with a larger area for non-boundaries) could decrease the probability and mitigate charge sharing. However, larger pixels increase the x-ray photon's incoming rate per pixel and also exacerbates the problem of "pulse pileup." Given the current detector speed and x-ray intensity for clinical CT, the pixel size probably needs to be smaller than 500 µm, and consequently, charge sharing needs to be addressed.

According to examples of the present disclosure, a reading-based post-acquisition correction/compensation method is described to address both noise and bias added by charge sharing. The disclosed method is able to keep spectral information in charge sharing while one coincidence counter records intensity.

Figure 1B:
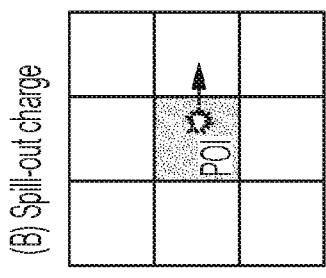
Figure 1C:
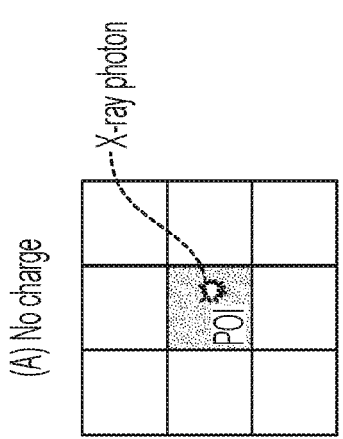
Figure 1D:
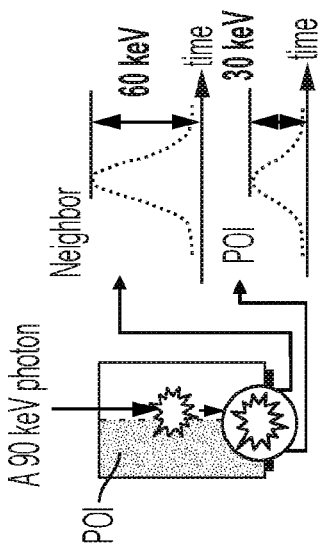
FIG. 1D, FIG. 1E, and FIG. 1F show a side view with (FIG. 1A) no charge sharing (no cross-talk), (FIG. 1B) spill-out charge sharing, and (FIG. 1C) spill-in charge sharing. Eight neighbor pixels of a pixel-of-interest (POI) are considered as one neighboring area. Subscripts indicate one of 3 energy windows, L, M, or H for 20-50 keV, 50-80 keV, or ≥80 keV, respectively. $C_X$ and $CC_{XY}$ are counters and coincidence counters, respectively, for POI and $\underline{C_X}$ and $\underline{CC_{XY}}$ with underlines are those for one of neighboring pixels.
Figure 1E:
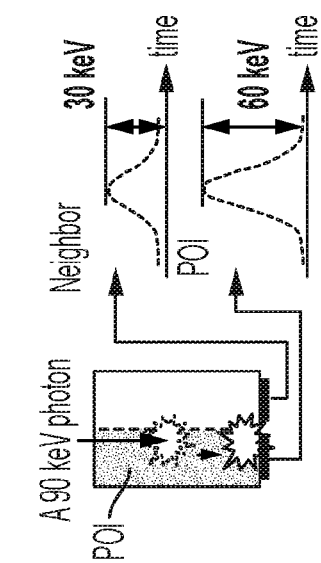
Figure 1F:
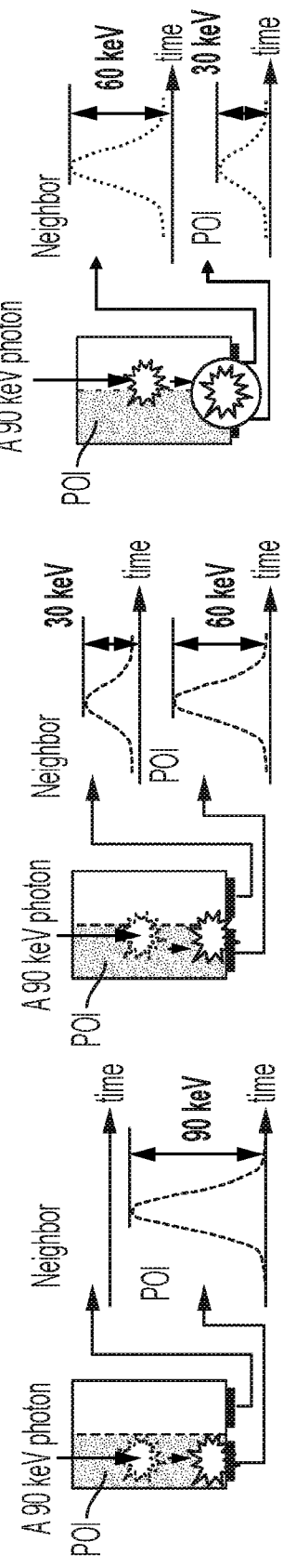

FIG. 1A, FIG. 1B, and FIG. 1C show a top view along the x-ray path of 3×3 pixels and FIG. 1D, FIG. 1E, and FIG. 1F show a side view with (FIG. 1A) no charge sharing (no cross-talk), (FIG. 1B) spill-out charge sharing, and (FIG. 1C) spill-in charge sharing. Eight neighbor pixels of a pixel-of-interest (POI) are considered as one neighboring area. Subscripts indicate one of 3 energy windows, L, M, or H for 20-50 keV, 50-80 keV, or ≥80 keV, respectively. $C_X$ and $CC_{XY}$ are counters and coincidence counters, respectively, for POI and hand $C_X$ and $CC_{XY}$ with underlines are those for one of neighboring pixels.

FIG. 2A show a diagram of a conventional pulse height analyzer without direct windowing. FIG. 2B shows a diagram of another conventional pulse-height analyzer with direct windowing. The conventional analyzer of FIG. 2A has an individual channel with N energy thresholds in the ASIC. In the conventional arrangement of FIG. 2B, each photon that is incident on a detector will generate a pulse whose height is associated with the photon energy. Quasi-coincident incident photons within a detector deadtime τ are counted as 1 event with different energies from the originals due to pulse pileup effects. The conventional design as shown in FIG. 2A will result in lost counts and the latter in a distorted recorded energy spectrum.

Figure 3:
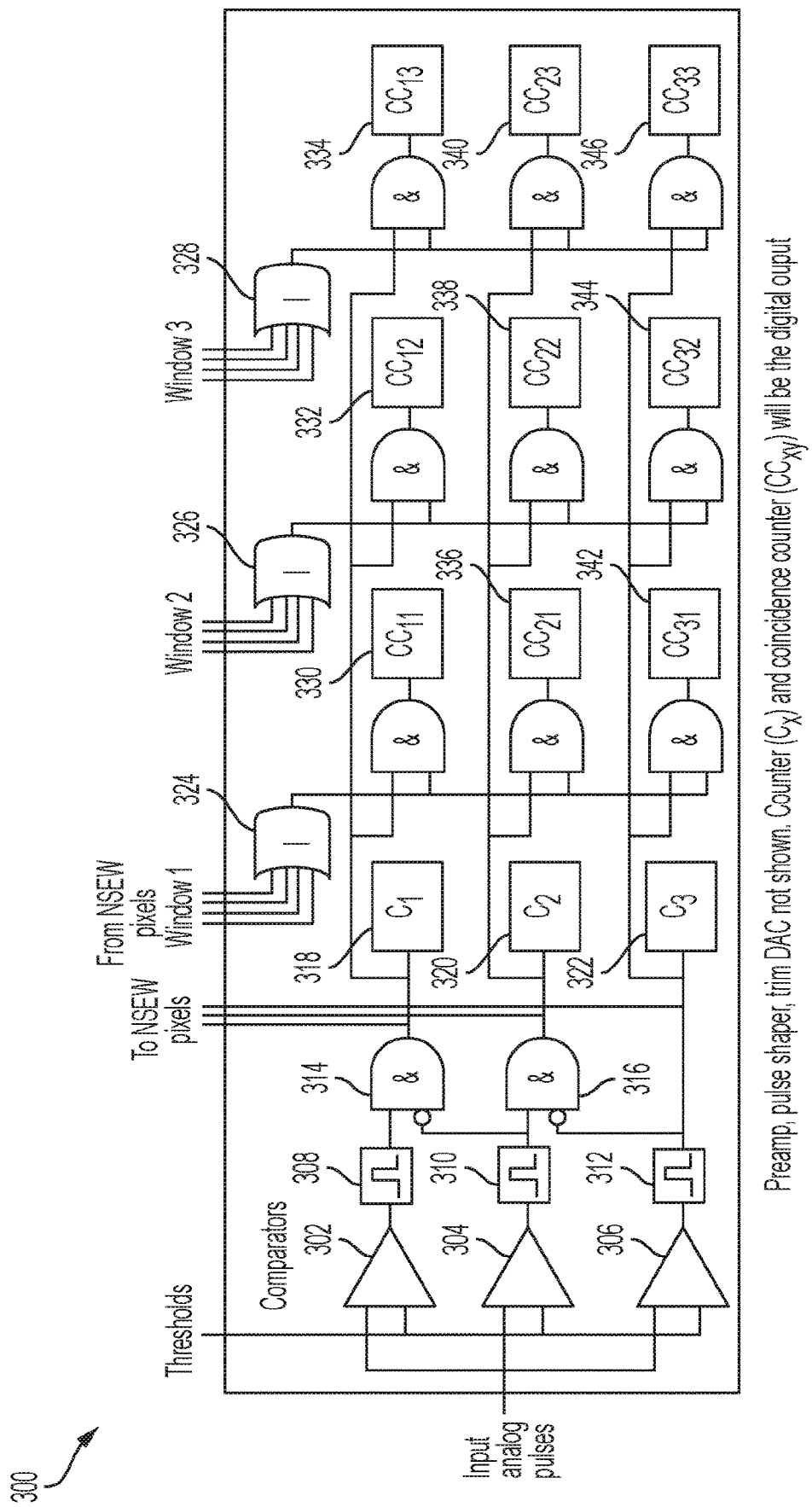
FIG. 3 shows a diagram of multi-energy inter-pixel coincidence counter (MEICC) with direct windowing for both $C_X$ and $CC_{XY}$, according to examples of the present teachings.

FIG. 3 shows a diagram of multi-energy inter-pixel coincidence counter (MEICC) with direct windowing for both $C_X$ and $CC_{XY}$ 300 according to examples of the present teachings. Comparators 302, 304, 306 receive threshold signals a system controller and input analog signals from an anode of each pixel and provides respective outputs to a respective analog-to-digital converters (now shown) and to pulse shaping elements 308, 310, 312. AND gate element 314 couples the output from pulse shaping elements 308 and 310 and AND gate element 316 couples the outputs from pulse shaping elements 310 and 312. Outputs from AND gate element 314 and AND gate element 316 are provided to adjacent pixels and to counters $C_1$, 318 $C_2$ 320, $C_3$ 322, where counts are incremented if they meet or exceed predetermined energy thresholds. Digital signals from adjacent pixels are received by OR gate element 324 for window 1, OR gate element 326 for window 2, and OR gate element 328 for window 3 based on energy level. Coincidence counters $CC_{11}$ 330, $CC_{12}$ 332, $CC_{13}$ 334, $CC_{21}$ 336, $CC_{22}$ 338, $CC_{23}$ 340, $CC_{31}$ 342, $CC_{32}$ 344, and $CC_{33}$ 346 are incremented if both counters from the pixel and the neighboring pixels are both 1.

As shown in FIG. 3, the architecture of a PCD pixel with MEICC is shown with the number of thresholds $N_C$=3 as an example with subscripts L, M, H refer to low, middle, and high energy window, respectively. The neighboring pixels are treated as one area: one or more counts at any of the neighbor pixels will produce the same input to the AND logics. $C_X$ and $CC_{XY}$ are counters and coincidence counters, respectively, for a pixel-of-interest (POI), and hand $C_X$ and $CC_{XY}$ with underlines are those for one of neighboring pixels. Notice that a counter is associated with a two-sided energy window (not a one-sided threshold window) in this study. An underline indicates that it belongs to neighboring pixels. When a count is added coincidently to counter $C_X$ of the POI and counter $C_Y$ of one of neighboring pixels, a count is also added to $CC_{XY}$ of the POI. In this case, a count is also added to a coincidence counter of the corresponding neighbor pixel, $CC_{XY}$, as the circuitry for MEICC in each pixel processes coincidences with its own neighboring pixels independently and in parallel.

Figure 4:
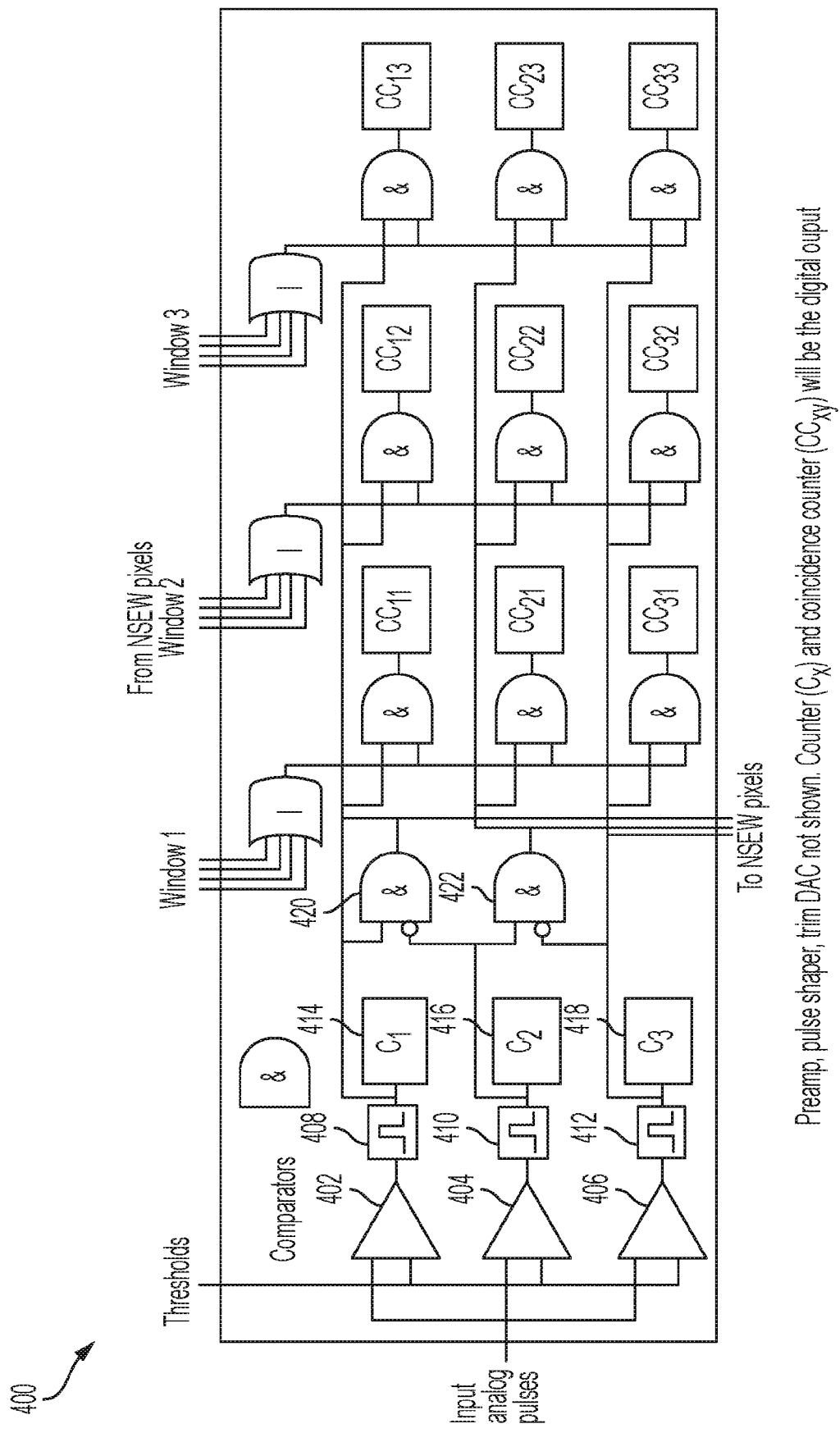
FIG. 4 shows a diagram of multi-energy inter-pixel coincidence counter (MEICC) with standard thresholding for $C_X$, direct windowing only for $CC_{XY}$, according to examples of the present teachings.

FIG. 4 shows a diagram of multi-energy inter-pixel coincidence counter (MEICC) with standard thresholding for $C_x$, direct windowing only for $CC_{xy}$, according to examples of the present teachings. FIG. 4 is similar to FIG. 3 with the difference being the way comparators $C_1$ and $C_2$ store thresholded counts (with one-sided energy windows) in FIG. 4, whereas comparators store windowed counts (with two-sided energy windows) in FIG. 3. Comparators 402, 404, 406 receive threshold signals from a system controller and input analog signals from an anode of each pixel and provides respective outputs to a respective analog-to-digital converters (now shown) and to pulse shaping elements 408, 410, 412. If the pulses reach a predetermined energy threshold, counters $C_1$, 414 $C_2$ 416, $C_3$ 418 are incremented and AND gate element 420 that is coupled to (a) the output from a comparator that is connected to C1414 and (b) the output from a comparator that is connected to $C_2$ 416 and AND gate element 422 that is coupled to the outputs from comparators that are connected to counters $C_2$ 416 and $C_3$ 418, respectively. Outputs from AND gate element 420 and AND gate element 422 is provided to adjacent pixels.

Figure 5:
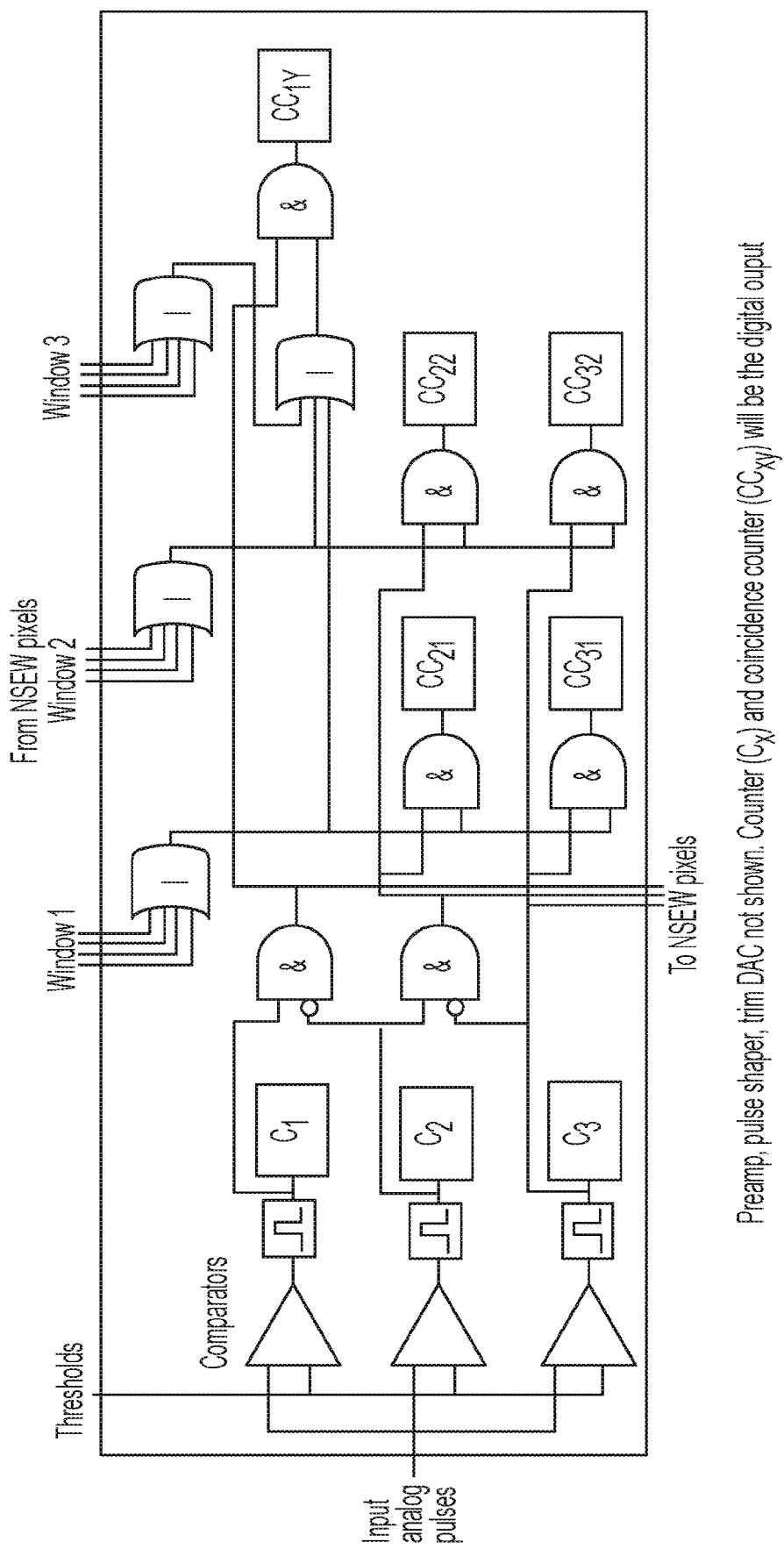
FIG. 5 shows a diagram of multi-energy inter-pixel coincidence counter (MEICC) with a smaller number of $CC_{XY}$, according to examples of the present teachings.

FIG. 5 shows a diagram of multi-energy inter-pixel coincidence counter (MEICC) with a smaller number of $CC_{XY}$, according to examples of the present teachings. FIG. 5 is similar to FIG. 3 and FIG. 4, but with a smaller number of $CC_{XY}$. With $N_C$=4, eight neighbors, and the optimal threshold energies studied, the number of coincidence counters $N_{CC}$ for MEICC can be reduced from 16 to 9 by combining energy windows of neighboring pixels for coincidence counters as shown in FIGS. 14A and 14B. Multiple energy windows of neighboring pixels were bundled and treated as one wider energy window (see FIG. 14B). The designed can be chosen based on some energy windows either having very small counts or seem to provide minimal effects on the material decomposition for the POI. For example, when a count is registered at energy window 1 of the POI via spill-in charge sharing, it does not seem critical to know exactly which energy window of the neighboring pixels a count is also registered; hence, coincidence counter 2 covers energy windows 2-4 of neighboring pixels. The CRLB increased slightly from 0.255 for $N_{CC}$=16 to 0.269 for $N_{CC}$=9, which corresponds to as little as a 5.5% change. In comparison, the CRLB with four neighbors was 0.284 for $N_{CC}$=16 and 0.297 for $N_{CC}$=9, which were 11.4% and 10.5% worse, respectively. The number of neighboring pixels had a larger impact on CRLBs than the number of coincidence counters in this case.

FIG. 6A shows a diagram connection for the arrangement of FIG. 3. FIG. 6B shows a diagram connection for the arrangement of FIG. 4. FIG. 6C shows a diagram connection for the arrangement of FIG. 5.

The use of the multi-energy inter-pixel coincidence counter (MEICC) is now discussed. A multi-energy inter-pixel coincidence counter (MEICC), as shown in FIG. 3, for example, is used in the method to address charge sharing. MEICC uses energy-dependent coincidence counters, keeps the book of charge sharing events during the data acquisition, and outputs the exact number of the occurrences that can be used to correct them after the acquisition is completed. MEICC does not interfere with the primary counting process; therefore, PCDs with MEICC will remain as fast as those without it. MEICC does not require complex inter-pixel analog communication and is expected to be implemented using today's electronics technology. The post-processing correction algorithm can be very simple and fast, although it is not within the scope of this paper.

The workings of the MEICC are described using an example: a PCD with three energy windows, L, M, and H for 20-50 keV, 50-80 keV, and ≥80 keV, respectively, and three counters, $C_L$, $C_M$, and $C_H$, respectively (see FIG. 3). Either eight or four neighboring pixels are considered for each pixel. The central pixel is denoted as a pixel-of-interest (POI). MEICC has 3×3=9 coincidence counters ($CC_{XY}$), each of which concerns coincident events between window X of POI and window Y of the neighboring pixels. (The underline indicates that it belongs to the neighboring pixels.) When a count is added coincidently to counter $C_x$ and counter $C_y$, a count is also added to $CC_{XY}$ of the POI. (In this case, a count will also be added to a coincidence counter of the neighbor pixel.)

When a 90-keV photon (that corresponds to energy window H) is incident onto the POI and detected with no charge sharing, it generates a count at counter $C_H$ accurately (FIG. 1A). With charge sharing (FIG. 1B), however, the photon may deposit 60 keV at the POI and 30 keV at one of the neighboring pixels, e.g., pixel E, generating a count at $C_M$ of the POI and another count at $C_L$ of pixel E. Coincidence counter $CC_{ML}$ will then add one count as a trace of the "spill-out" charge sharing. On the other hand, when a 90-keV photon hits one of the neighboring pixels, e.g., pixel E, and causes charge sharing (FIG. 1C), it may deposit 30 keV at the POI and 60 keV at pixel E. It produces a count at $C_L$ of the POI and another count at $C_M$ of pixel E. In this case, coincidence counter $CC_{LM}$ of the POI will also add one count as a trace of the "spill-in" charge sharing. When data are read out after one projection (e.g., 200 μs), both of the charge sharing types can be corrected using counts stored in coincidence counters. Coincidence counter $CC_{ML}$ outputs the number of spill-out charge sharing events that are likely to have migrated from window H to window M during the acquisition. Coincidence counter $CC_{LM}$ provides the exact number of spill-in charge sharing events that were added to window L. MEICC keeps the book of the number of charge sharing events in both of the directions, separated from the number of no-charge sharing events.

PCDs with MEICC are expected to be as fast as those without MEICC because MEICC does not interfere with the primary counting process. In contrast, the event-based real-time analog charge summing schemes slow down PCDs because the scheme is integrated with the primary counting process, using inter-pixel communication for the identification and recovery of energy on the fly. MEICC processes coincidence, after the primary counting process is completed and the counters become active for the next photon. The digital coincidence processing requires only a few ASIC clocks (e.g., 10 ns, as opposed to ~1,000 ns for the charge summing scheme) and is much faster than the pulse processing/shaping time (20-100 ns). The quality of the information from coincidence counters may degrade at very high count rates; however, control of how to use the coincidence counter data is provided. In contrast, such a control will not be available with event-based real-time charge sharing correction schemes.

A simple scenario was used above to outline why MEICC may be effective. In reality, the original photon energy as well as how the energy is split is stochastic. An assessment of how effective MEICC can be using MC simulations is discussed. The MEICC parameters are as follows: (1) the number of counters ($N_C$), (2) the threshold energies, (3) the number of coincidence counters ($N_{CC}$), (4) the number of neighboring pixels (eight or four), and (5) how energy windows of the POI and those of neighboring pixels are connected with coincidence counters.

Monte Carlo (MC) simulations. The performance of three imaging tasks is accessed, which require spectral information with different levels of accuracy, with two acquisition schemes. The three imaging tasks were density images of two basis functions (water and bone), mono-energetic CT imaging at 60 keV, and K-edge imaging with gold. The acquisition schemes were a single-pixel acquisition and a super-pixel acquisition. A single-pixel scheme focused on the output of one pixel, which is the highest possible spatial frequency, while the super-pixel scheme assessed the zero-frequency detective quantum efficiency (DQE) or cases when the output of neighboring pixels were summed. The assessment method is presented in greater detail in the is the discussion below.

An MC simulation program is developed by cascading the following processes: (1) photon generations with randomized energies and time intervals for a Poisson distribution, (2) charge sharing based on a randomized location and interaction and detection processes, (3) pulse train generations with electronic noise, (4) comparator signal generation by pulse height analyzers with set energy thresholds, and (5) counting and coincidence processing. For the single-pixel measurements, photons were randomly incident onto 3×3 PCD pixels, and these processes were performed for each of the 3×3 pixels in parallel. The MC program output the counts saved at counters $C_X$, X=1, 2, . . . , $N_C$, and coincidence counters $CC_{XY}$, X=1, 2, . . . , $N_C$ and Y=1, 2, . . . , $N_C$ for the POI. Pulse pileups were ignored using an impulse pulse shape in (3) in this study. For the super-pixel measurements, photons were incident onto the central pixel (POI) only, while the above processes were performed for all of the 3×3 pixels in parallel. Then the counts saved at counters $C_X$ and coincidence counters $CC_{XY}$, respectively, of 3×3 pixels were added. With absence of pulse pileup and the symmetry, this scheme accurately simulates super-pixel data with flat field irradiation including the effect of double-counting.

For step (2), a look-up table is created for relative charge energies deposited at each of the 3×3 pixels given a location and a type of interaction using Photon Counting Toolkit (PcTK), which was developed by the inventor previously and had excellent agreement with another MC simulation program. Triple- and quadruple-counting were also included, although the probability is very low. The probability of primary charge locations was set to be uniform, the probability of interaction types followed x-ray physics, and the probability of the secondary charge location (due to a fluorescence x-ray) relative to the primary charge was computed using the probability of attenuation with Beer's law and uniform probability of emission angles. The interaction types were either no detection or the photoelectric effect, and the sub-interaction types for the photoelectric effect were total absorption, K-escape, and fluorescence x-ray emission followed by its reabsorption. Neither Compton scattering nor Rayleigh scattering was included, and the number of interactions is limited to one, in the current version of PcTK because the probability was low for diagnostic energies. The agreement between PcTK and the MC program was validated.

Three sets of 5,000 noise realizations were performed (thus, 15,000 noise realizations in total) of 1 ms acquisition with x-rays at 140 kVp and 450 mA and an object of 10 cm water and 1 cm bone for the baseline spectrum, resulting in ~4,100 incident photons per pixel per noise realization on average. The simulated cadmium telluride PCD had a pixel size of $(225~\mu m)^2$, a thickness of 1.6 mm, and electronic noise with a standard deviation of 2.0 keV added to a pulse train (not to threshold energies).

The effect of the five parameters was studied and evaluated a PCD with no charge sharing for comparison, which is called the "ideal PCD" in this study, although the detector had other degradation factors such as electronic noise, K-escape, and non-perfect detection efficiency. The number of energy windows ($N_C$) was 2, 3, 4, 6, 8, and 12 and threshold energies were set by dividing the energy range of 20-140 keV uniformly, unless otherwise noted. For example, thresholds were set at 20, 50, 80, and 110 keV with a 30-keV increment for $N_C$=4 and at 20, 40, 60, 80, 100, and 120 keV with a 20-keV increment for $N_C$=6. The effect of threshold energies was studied by changing energies with $N_C$=4. The number of coincidence counters ($N_{CC}$) was 0, 1, or $N_C^2$ with either eight- or four-neighbors.

The changes in the mean values were estimated by adding a small amount of either water, bone, or gold. The Fisher information matrix was then computed numerically with two assumptions: (1) measured counts were multivariate Gaussian distributed with a set of basis material thicknesses as parameters; and (2) covariance remained unchanged with an additional small amount of attenuator. According to this study, Assumption (1) can be justified as most of the mean counts were larger than 30 with energy window widths of 10-60 keV (i.e., with $N_C$=2-12). Assumption (2) might have resulted in an over-estimation of CRLB but it was necessary to make the computation stable. The size of the Fisher information matrix was 3×3 for K-edge imaging and 2×2 for the other imaging tasks.

The inverse of the Fisher information matrix was calculated. The CRLB of the variance of each basis material was the corresponding diagonal element of the inverse matrix. The CRLB of the mono-energetic CT images was computed from the CRLBs of water and bone estimates. An unbiased sample standard deviation of CRLB values over the three sets of 5,000 noise realizations was computed.

Density images of two basis functions, single-pixel measurements are now discussed. The results of the single-pixel acquisitions for density images of two basis functions are discussed in this section. The number of counters ($N_C$) and the number of coincidence counters ($N_{CC}$) (part 1): FIG. 4 and Tables 1-2 show the normalized CRLB of water thicknesses with different $N_C$ and $N_{CC}$ with either eight or four neighbor pixels; the CRLBs with the ideal PCD are also presented. CRLBs were normalized by the CRLB of the current dual-energy PCD ($N_C$=2 and $N_{CC}$=0) for FIG. 4A, and Table 1, while normalized by those of the current PCD (i.e., $N_{CC}$=0) with the corresponding $N_C$ for FIG. 4B, and Table 2. The CRLBs of bone thickness estimation were similar to those of water estimation, hence, not presented.

Table 1 shows the mean CRLB of water estimates normalized by that of the current dual-energy PCD ($N_C$=2 and $N_{cc}$=0).

|  | Neighbors | Single-pixel measurements, $N_C$ | | | | | | Super-pixel measurements, $N_C$ | | | | | |
|---|---|---|---|---|---|---|---|---|---|---|---|---|---|
|  |  | 2 | 3 | 4 | 6 | 8 | 12 | 2 | 3 | 4 | 6 | 8 | 12 |
| $N_{CC}$ = 0 (current PCD) | — | 1.000 | 0.723 | 0.766 | 0.677 | 0.645 | 0.640 | 1.000 | 0.735 | 0.780 | 0.685 | 0.675 | 0.654 |
| Ideal PCD | — | 0.397 | 0.271 | 0.252 | 0.242 | 0.223 | 0.219 | 0.406 | 0.277 | 0.257 | 0.247 | 0.228 | 0.224 |
| $N_{CC} = N_C^2$ (MEICC) | 8 | 0.507 | 0.323 | 0.293 | 0.259 | 0.245 | 0.231 | 0.618 | 0.401 | 0.371 | 0.328 | 0.312 | 0.294 |
| $N_{CC} = N_C^2$ (MEICC) | 4 | 0.529 | 0.348 | 0.325 | 0.288 | 0.272 | 0.256 | 0.649 | 0.441 | 0.424 | 0.377 | 0.357 | 0.339 |
| $N_{CC}$ = 1 | 8 | 0.546 | 0.373 | 0.357 | 0.333 | 0.322 | 0.318 | 0.631 | 0.409 | 0.381 | 0.344 | 0.333 | 0.324 |
| $N_{CC}$ = 1 | 4 | 0.563 | 0.392 | 0.384 | 0.358 | 0.346 | 0.342 | 0.661 | 0.446 | 0.434 | 0.397 | 0.390 | 0.382 |

Table 2 shows the mean CRLB of water estimates normalized by the corresponding CRLB of the current PCD ($N_{CC}=0$) with the same $N_C$.

were 0.2548 at $(E_1, E_2, E_3, E_4)=$(20 keV, 30 keV, 45 keV, 65 keV) for MEICC ($N_{CC}=N_c^2$), 0.2243 at (20 keV, 50 keV, 60 keV, 75 keV) for the ideal PCD, 0.6500 at (20 keV, 60 keV,

|  |  | Single-pixel measurements, $N_C$ | | | | | | Super-pixel measurements, $N_C$ | | | | | |
| --- | --- | --- | --- | --- | --- | --- | --- | --- | --- | --- | --- | --- | --- |
|  | Neighbors | 2 | 3 | 4 | 6 | 8 | 12 | 2 | 3 | 4 | 6 | 8 | 12 |
| $N_{CC}=0$ (current PCD) | — | 1.000 | 1.000 | 1.000 | 1.000 | 1.000 | 1.000 | 1.000 | 1.000 | 1.000 | 1.000 | 1.000 | 1.000 |
| Ideal PCD | — | 0.397 | 0.375 | 0.329 | 0.358 | 0.346 | 0.342 | 0.406 | 0.377 | 0.330 | 0.361 | 0.338 | 0.343 |
| $N_{CC}=N_c^2$ (MEICC) | 8 | 0.507 | 0.447 | 0.383 | 0.383 | 0.379 | 0.361 | 0.618 | 0.546 | 0.476 | 0.479 | 0.462 | 0.450 |
| $N_{CC}=N_c^2$ (MEICC) | 4 | 0.529 | 0.481 | 0.425 | 0.426 | 0.421 | 0.400 | 0.649 | 0.600 | 0.544 | 0.550 | 0.529 | 0.518 |
| $N_{CC}=1$ | 8 | 0.546 | 0.516 | 0.466 | 0.492 | 0.499 | 0.497 | 0.631 | 0.557 | 0.489 | 0.502 | 0.493 | 0.495 |
| $N_{CC}=1$ | 4 | 0.563 | 0.543 | 0.501 | 0.528 | 0.537 | 0.535 | 0.661 | 0.607 | 0.556 | 0.580 | 0.578 | 0.584 |

Figure 11:
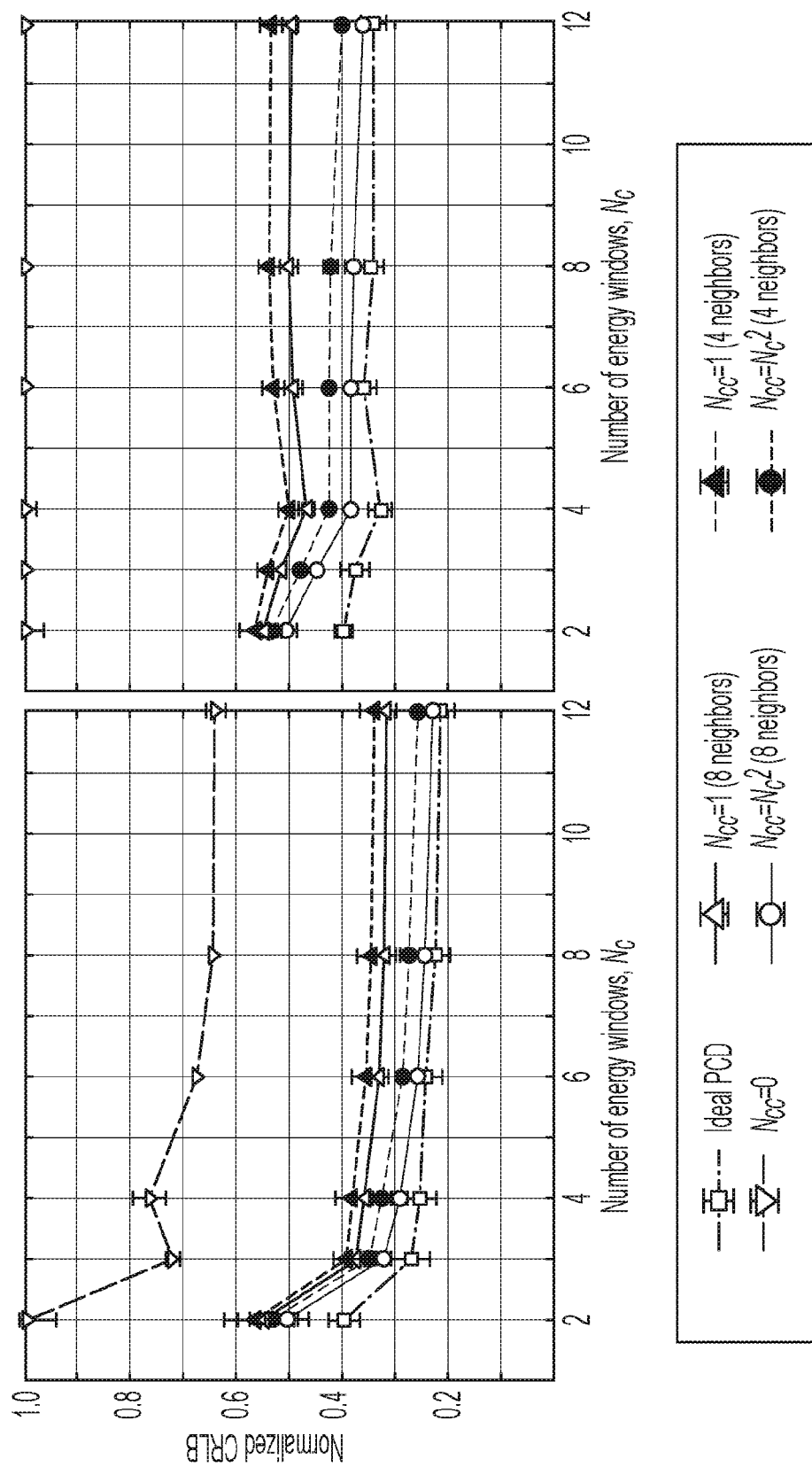
FIG. 11 shows plots of the CRLB of water thicknesses with different numbers of energy windows $N_C$ with single-pixel measurements. The CRLBs were normalized by that of the current dual-energy PCD (i.e., $N_C$=2 with no coincidence counter, $N_{CC}$=0) (left) or by those of $N_{CC}$=0 for the corresponding $N_C$ (right). PCD types are the ideal PCD, PCDs with $N_{CC}$=0, 1, and $N_C^2$. Results with both 8 neighbors and 4 neighbors are presented. Error bars indicate standard deviations.

FIG. 11 shows plots of the CRLB of water thicknesses with different numbers of energy windows $N_C$ with single-pixel measurements. The CRLBs were normalized by that of the current dual-energy PCD (i.e., $N_C=2$ with no coincidence counter, $N_{CC}=0$) (left) or by those of $N_{CC}=0$ for the corresponding $N_C$ (right). PCD types are the ideal PCD, PCDs with $N_{CC}=0$, 1, and $N_c^2$. Results with both 8 neighbors and 4 neighbors are presented. Error bars indicate standard deviations.

It can be seen in left plot of FIG. 11 that the CRLB of the ideal PCD improved (i.e., decreased) from $N_C=2$ to $N_C=4$, then stayed relatively constant while increasing $N_C$. With $N_{CC}=0$, the CRLBs improved as increasing $N_C$ in general, although changes became smaller with larger $N_C$ and the CRLB of $N_C=4$ was worse (larger) than that of $N_C=3$ (FIG. 4 (left)). The second finding may be attributed to either threshold energies or charge sharing or both, although the exact mechanism is not clear at this moment. MEICC ($N_{CC}=N_c^2$) improved the CRLB, e.g., down to 0.361-0.383 for water thicknesses when $N_C=4-12$ (FIG. 11 (right), and Table 2). This is only 5.7-16.4% worse than those of the ideal PCD, which is at 0.329-0.358 levels. In comparison, the CRLB of one coincidence counter ($N_{CC}=1$) was 0.466-0.499 (FIG. 4 (right), and Table 2), which were 37.3-45.6% worse than the ideal PCD.

The number of neighboring pixels (eight or four): Compared to four neighbors, when $N_C \geq 4$, eight neighbors provided ~10% better CRLB values for $N_{CC}=N_c^2$ and ~7% better for $N_{CC}=1$.

As seen in FIG. 4A and FIG. 4B, standard deviations of CRLB values were quite small. Therefore, all of the 15,000 noise realizations were used to compute one CRLB value for each setting in the following.

The threshold energies: The CRLBs with various threshold energies were studied with PCDs with $N_C=4$ and eight neighbors. Among the four thresholds, $E_1$ was fixed at 20 key; $E_2$ was set at either 30, 40, 50, or 60 key; and $E_3$ and $E_4$ were swept through while satisfying a condition: $E_2 < E_3 < E_4 < 140$ keV. Note that $N_C=4$ with a uniform window width (used for FIG. 4A and FIG. 4B) corresponds to $E_1=20$ keV, $E_2=50$ keV, $E_3=80$ keV, and $E_4=110$ keV. All of the CRLBs were normalized by the CRLB of the current dual-energy PCD.

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L show the normalized CRLBs of water thickness with $N_C=4$ and different threshold energies with single-pixel measurements, respectively. $E_1$ was set at 20 keV. Cross markers indicate the minimum CRLB for each PCD, which 65 keV, 85 keV) for the current PCD ($N_{CC}=0$), and 0.3278 at (20 keV, 50 keV, 65 keV, 85 keV) for one coincidence counter ($N_{CC}=1$). The minimum CRLB for the current PCD is not presented as it was obtained with $E_2=60$ keV. Contour lines for $N_{CC}=0$ were presented with larger increments as the CRLB values changed quickly with $E_3$ and $E_4$.

Figure 12A:
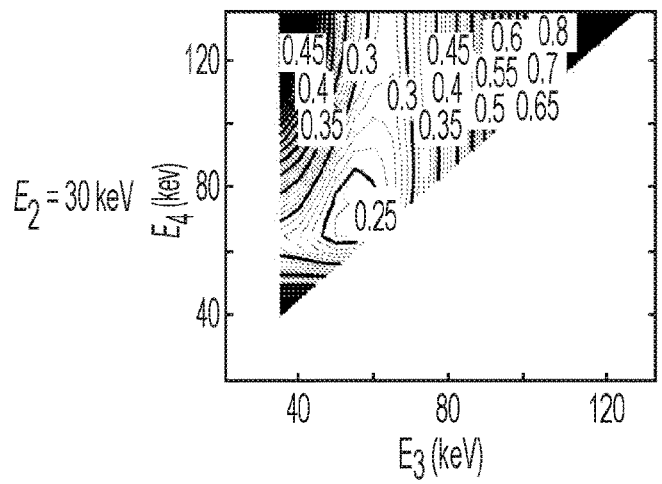
FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L show the normalized CRLBs of water thickness with $N_C$=4 and different threshold energies with single-pixel measurements, respectively. $E_1$ was set at 20 keV. Cross markers indicate the minimum CRLB for each PCD, which were 0.2548 at $(E_1, E_2, E_3, E_4)$=(20 keV, 30 keV, 45 keV, 65 keV) for MEICC ($N_{CC}$=$N_C^2$), 0.2243 at (20 keV, 50 keV, 60 keV, 75 keV) for the ideal PCD, 0.6500 at (20 keV, 60 keV, 65 keV, 85 keV) for the current PCD ($N_{CC}$=0), and 0.3278 at (20 keV, 50 keV, 65 keV, 85 keV) for one coincidence counter ($N_{CC}$=1). The minimum CRLB for the current PCD is not presented as it was obtained with $E_2$=60 keV. Contour lines for $N_{CC}$=0 were presented with larger increments as the CRLB values changed quickly with $E_3$ and $E_4$.
Figure 12D:
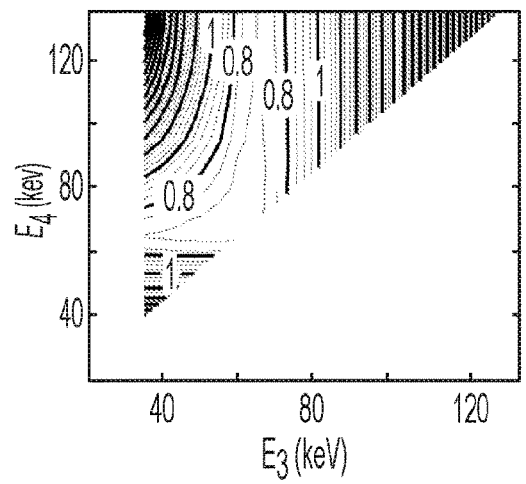
Figure 12B:
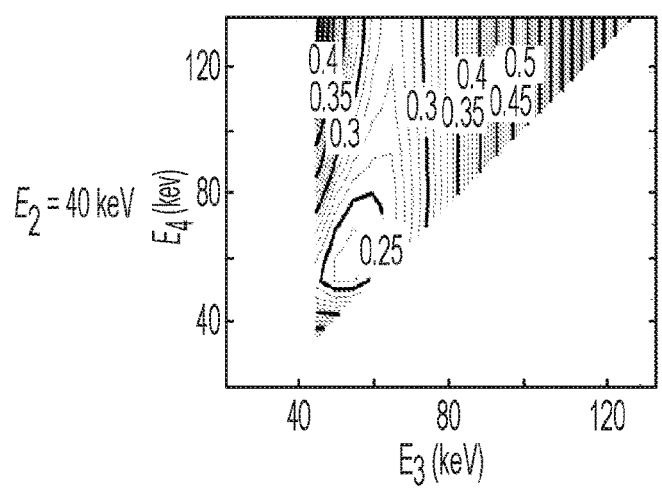
Figure 12E:
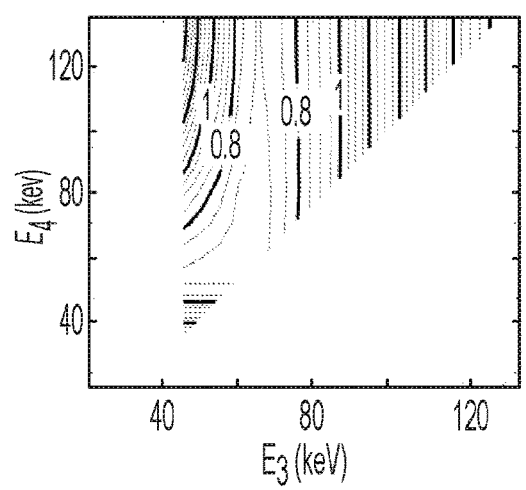
Figure 12C:
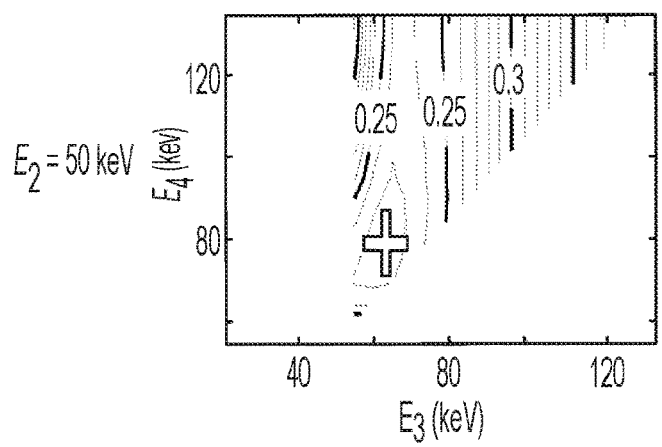
Figure 12F:
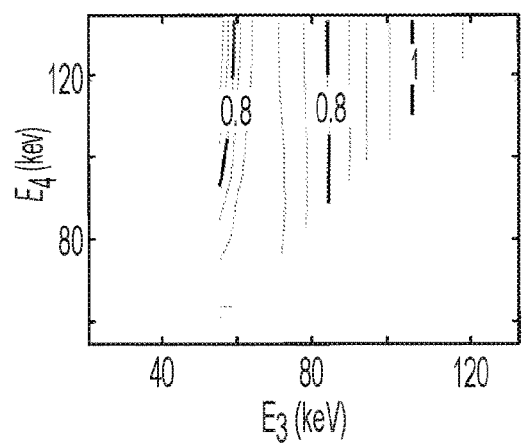
Figure 12G:
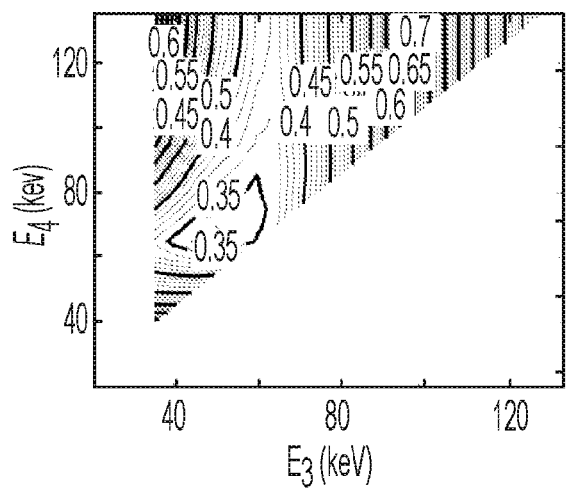
Figure 12J:
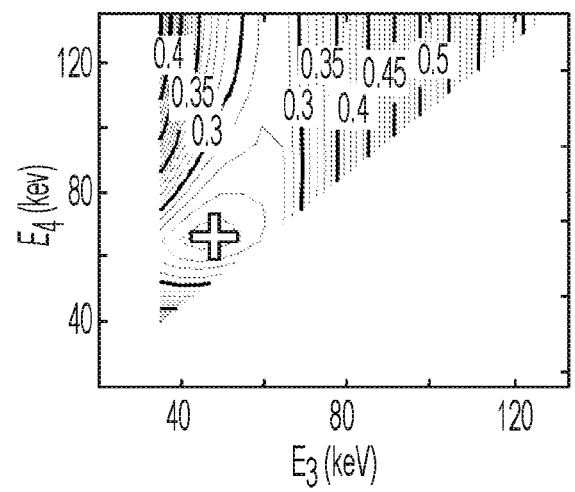
Figure 12H:
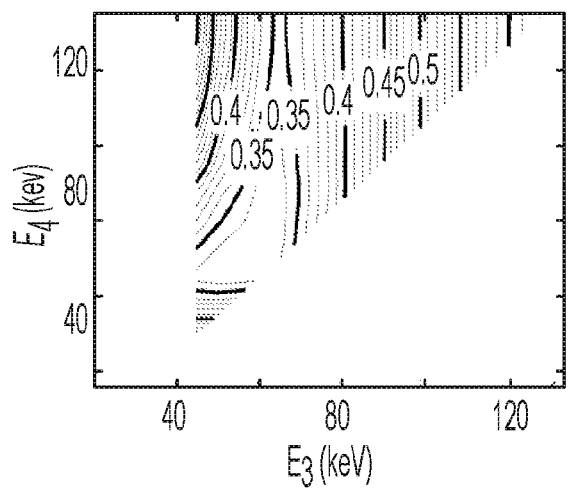
Figure 12K:
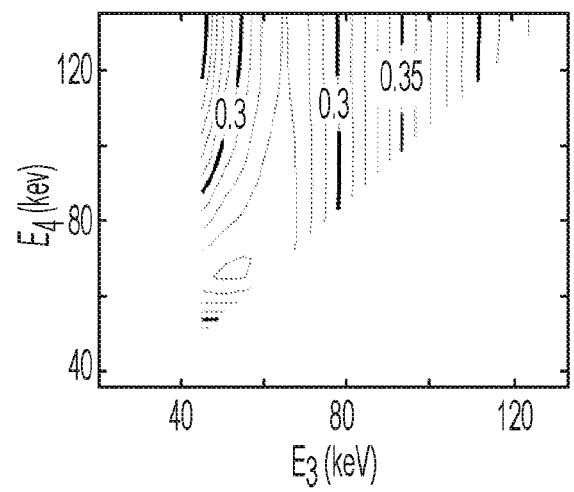
Figure 12I:
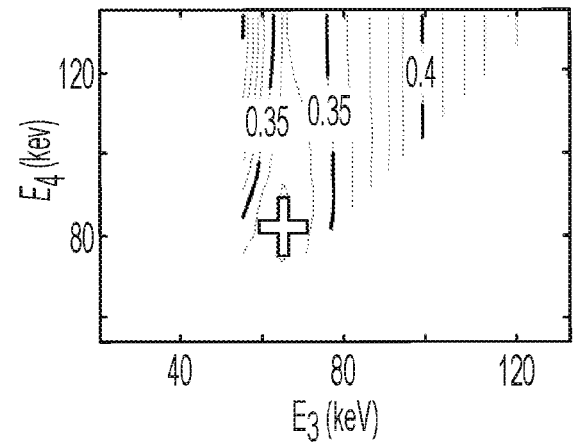
Figure 12L:
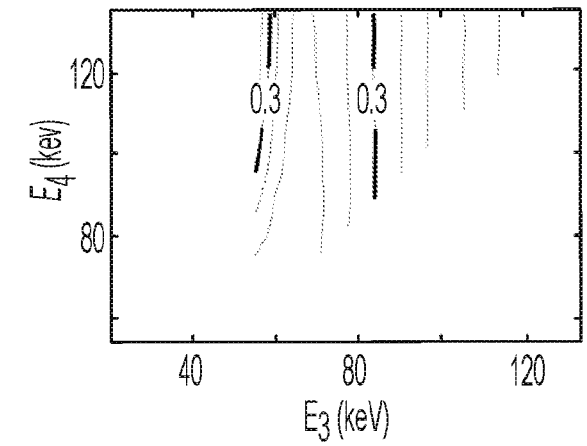

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L present the CRLB of the ideal PCD, $N_{CC}=0$, 1, and $N_c^2$. Relative changes of CRLBs were qualitatively similar among all of the PCDs, although absolute values were different and MEICC ($N_{CC}=N_c^2$) was the least sensitive to threshold energies (FIGS. 12J-12L). The best CRLBs (indicated by cross markers in FIGS. 12A-12L) were 0.224 for the ideal PCD, 0.255 for MEICC, 0.650 for the current dual-energy PCD, and 0.328 for one coincidence counter ($N_{CC}=1$), all of which were better than the corresponding CRLBs with $N_C=6$ with a uniform energy window width (0.242 for the ideal PCD, 0.259 for MEICC, 0.677 for $N_{CC}=0$, and 0.333 for $N_{CC}=1$; see Table 1). The minimum CRLB for MEICC was found when three of the four threshold energies were at or below 45 keV (FIG. 5J), while the minimum for the other PCDs was obtained when three out of four threshold energies were set at or above 50 keV. It appeared that MEICC used the information obtained by lower threshold energies differently from the other PCDs, especially with coincidence counters. The spectral information of charge sharing recorded by MEICC was effective in decreasing variance: The number of coincidence counters with >30 counts (i.e., a reasonable statistical power) was 15 out of 16 with the optimal energy thresholds, while it was only 10 out of 16 with the uniform energy window width (see Table 3).

Figures 13A, 13B:
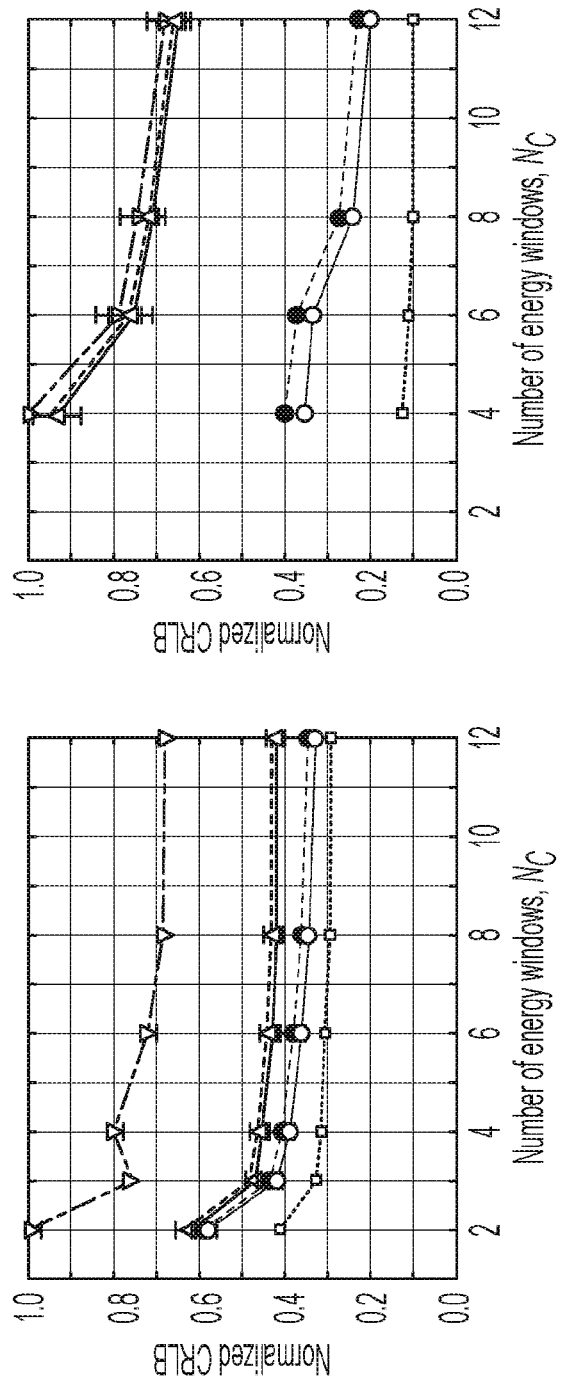
FIG. 13A and FIG. 13B show the CRLB of line integrals in mono-energetic CT imaging (FIG. 13A) and gold thicknesses in K-edge imaging (FIG. 13B) with different numbers of energy windows $N_C$ with single-pixel measurements. The CRLBs were normalized by that of the current PCD ($N_{CC}$=0) with two and four energy windows for (FIG. 13A) and (FIG. 13B), respectively. Error bars indicate standard deviations.

FIG. 13A and FIG. 13B show the CRLB of line integrals in mono-energetic CT imaging (FIG. 13A) and gold thicknesses in K-edge imaging (FIG. 13B) with different numbers of energy windows $N_C$ with single-pixel measurements. The CRLBs were normalized by that of the current PCD ($N_{CC}=0$) with two and four energy windows for (FIG. 13A) and (FIG. 13B), respectively. Error bars indicate standard deviations.

Table 3 shows the mean counts for counters $C_x$ and coincidence counters $CC_{XY}$ for PCDs with four energy windows, 8-neighbors, and single-pixel measurements. Threshold energies were (20, 50, 80, 110) keV for the uniform width and (20, 30, 45, 65) keV for the optimal setting for MEICC.

| | Ideal PCD | Non-ideal PCD Uniform energy window width | | | | Non-ideal PCD Optimal threshold energies | | | | |
|---|---|---|---|---|---|---|---|---|---|---|
| X | $C_X$ | $C_X$ | $CC_{X1}$ | $CC_{X2}$ | $CC_{X3}$ | $CC_{X4}$ | $C_X$ | $CC_{X1}$ | $CC_{X2}$ | $CC_{X3}$ | $CC_{X4}$ |
| 1 | 381.4 | 2,247.8 | 1,170.0 | 383.0 | 98.8 | 6.6 | 984.8 | 220.1 | 293.2 | 210.2 | 172.1 |
| 2 | 1,850.1 | 1,581.7 | 375.0 | 60.1 | 9.7 | 2.4 | 960.2 | 288.6 | 160.9 | 112.7 | 66.7 |
| 3 | 1,054.6 | 636.5 | 95.9 | 9.6 | 3.8 | 0.9 | 1,256.1 | 204.7 | 111.7 | 71.3 | 31.0 |
| 4 | 332.3 | 134.4 | 6.0 | 2.3 | 0.9 | 0.2 | 1,399.4 | 167.2 | 65.1 | 30.5 | 19.1 |

FIG. 14A and FIG. 14B show coincidence counter indices with $N_C=4$ showing how each of sixteen (FIG. 14A) and nine (FIG. 14B) coincidence counters was energetically connected to four energy windows of neighboring pixels and four windows of the POI. Multiple energy windows are bundled and treated as one wide energy window in (FIG. 14B). For example, coincidence counter #2 in (FIG. 14B) will add a count if energy window 1 of the POI produces a count and at least one of energy windows 2-4 of at least one of the neighboring pixels generates a count.

The number of coincidence counters ($N_{CC}$) (part 2): With $N_C=4$, eight neighbors, and the optimal threshold energies studied above, the number of coincidence counters $N_{CC}$ for MEICC was reduced from 16 to 9 by combining energy windows of neighboring pixels for coincidence counters as shown in FIG. 14A and FIG. 14B. Multiple energy windows of neighboring pixels were bundled and treated as one wider energy window (see FIG. 14B). This design was chosen because some energy windows either had very small counts or seemed to provide minimal effects on the material decomposition for the POI. For example, when a count is registered at energy window 1 of the POI via spill-in charge sharing, it does not seem critical to know exactly which energy window of the neighboring pixels a count is also registered; hence, coincidence counter 2 covers energy windows 2-4 of neighboring pixels. The CRLB increased slightly from 0.255 for $N_{CC}=16$ to 0.269 for $N_{CC}=9$, which corresponds to as little as a 5.5% change. In comparison, the CRLB with four neighbors was 0.284 for $N_{CC}=16$ and 0.297 for $N_{CC}=9$, which were 11.4% and 10.5% worse, respectively. The number of neighboring pixels had a larger impact on CRLBs than the number of coincidence counters in this case.

Mono-energetic CT imaging, single-pixel measurements. FIG. 13A and Table 4 show the CRLB of mono-energetic CT images at 60 keV with the single-pixel measurements normalized by the CRLB of the current dual-energy PCD ($N_C=2$ and $N_{CC}=0$); Table 5 shows the CRLB normalized by the corresponding CRLB of the current PCD with the same $N_C$. The differences in CRLBs for mono-energetic CT imaging among different PCD types were smaller than the differences for density images of the two basis functions. The CRLBs of MEICC ($N_{CC}=N_C^2$) were as large as 0.485-0.502 when $N_C=4$-12 (Table 5), while they were 0.361-0.383 for water thicknesses (Table 2). For the ideal PCD, it was 0.307-0.334 in contrast to 0.329-0.358. It is because mono-energetic CT imaging is a less demanding spectral task compared to basis material density imaging. Negatively correlated noise in water and bone densities tended to suppress noise when mono-energetic CT images were synthesized (see the discussion below for more detail).

Table 4 shows the mean CRLB of mono-energetic CT images normalized by that of the current dual-energy PCD ($N_C=2$ and $N_{cc}=0$).

| | | Single-pixel measurements, $N_C$ | | | | | | Super-pixel measurements, $N_C$ | | | | | |
|---|---|---|---|---|---|---|---|---|---|---|---|---|---|
| | Neighbors | 2 | 3 | 4 | 6 | 8 | 12 | 2 | 3 | 4 | 6 | 8 | 12 |
| $N_{CC}=0$ (current PCD) | — | 1.000 | 0.762 | 0.797 | 0.719 | 0.689 | 0.669 | 1.000 | 0.827 | 0.870 | 0.778 | 0.767 | 0.746 |
| Ideal PCD | — | 0.414 | 0.327 | 0.316 | 0.307 | 0.295 | 0.292 | 0.364 | 0.288 | 0.279 | 0.271 | 0.260 | 0.257 |
| $N_{CC}=N_C^2$ (MEICC) | 8 | 0.582 | 0.419 | 0.390 | 0.361 | 0.346 | 0.331 | 0.531 | 0.396 | 0.375 | 0.345 | 0.332 | 0.315 |
| $N_{CC}=N_C^2$ (MEICC) | 4 | 0.591 | 0.433 | 0.410 | 0.380 | 0.363 | 0.347 | 0.579 | 0.452 | 0.441 | 0.402 | 0.386 | 0.366 |
| $N_{CC}=1$ | 8 | 0.618 | 0.468 | 0.453 | 0.432 | 0.421 | 0.417 | 0.538 | 0.400 | 0.382 | 0.358 | 0.350 | 0.344 |
| $N_{CC}=1$ | 4 | 0.621 | 0.475 | 0.466 | 0.444 | 0.432 | 0.428 | 0.586 | 0.455 | 0.450 | 0.425 | 0.421 | 0.415 |

Table 5 shows the mean CRLB of mono-energetic CT images normalized by the corresponding CRLB of the current PCD (Ncc=0) with the same $N_c$.

| | | Single-pixel measurements, $N_C$ | | | | | | Super-pixel measurements, $N_C$ | | | | | |
|---|---|---|---|---|---|---|---|---|---|---|---|---|---|
| | Neighbors | 2 | 3 | 4 | 6 | 8 | 12 | 2 | 3 | 4 | 6 | 8 | 12 |
| $N_{CC}=0$ (current PCD) | — | 1.000 | 1.000 | 1.000 | 1.000 | 1.000 | 1.000 | 1.000 | 1.000 | 1.000 | 1.000 | 1.000 | 1.000 |
| Ideal PCD | — | 0.414 | 0.430 | 0.397 | 0.428 | 0.429 | 0.428 | 0.364 | 0.348 | 0.321 | 0.348 | 0.339 | 0.345 |
| $N_{CC}=N_C^2$ (MEICC) | 8 | 0.582 | 0.549 | 0.489 | 0.502 | 0.502 | 0.485 | 0.531 | 0.479 | 0.431 | 0.443 | 0.432 | 0.420 |
| $N_{CC}=N_C^2$ (MEICC) | 4 | 0.591 | 0.568 | 0.515 | 0.528 | 0.527 | 0.508 | 0.579 | 0.547 | 0.507 | 0.517 | 0.501 | 0.492 |

-continued

|  | Neighbors | Single-pixel measurements, $N_C$ | | | | | | Super-pixel measurements, $N_C$ | | | | | |
| --- | --- | --- | --- | --- | --- | --- | --- | --- | --- | --- | --- | --- | --- |
|  |  | 2 | 3 | 4 | 6 | 8 | 12 | 2 | 3 | 4 | 6 | 8 | 12 |
| $N_{CC} = 1$ | 8 | 0.618 | 0.614 | 0.568 | 0.601 | 0.611 | 0.611 | 0.538 | 0.484 | 0.439 | 0.460 | 0.456 | 0.461 |
| $N_{CC} = 1$ | 4 | 0.621 | 0.623 | 0.585 | 0.627 | 0.626 | 0.626 | 0.586 | 0.550 | 0.517 | 0.546 | 0.549 | 0.556 |

K-edge imaging, single-pixel measurements are now discussed. FIG. 7B and Table 6 present the CRLB of gold thickness with the single-pixel measurements normalized by the CRLB of the current PCD with four energy windows ($N_C$=4 and $N_{CC}$=0); Table 7 shows the CRLB normalized by the corresponding CRLB of the current PCD with the same $N_C$. The threshold energies include one at the K-edge of gold (80 keV) when the number of energy windows ($N_C$) was 4, 6, 8, or 12. Among the three imaging tasks, K-edge imaging had the largest difference between the current PCD and the ideal PCD, because K-edge imaging is the most demanding spectral task among the three. Notice that MEICC had the CRLB much closer to the ideal PCD (0.295-0.426 versus 0.126-0.145; see Table 7), while one coincidence counter had CRLB values very close to the current PCD (0.926-0.959). It demonstrated that the spectral information on the charge sharing recorded by MEICC may be valuable for spectral tasks.

Super-pixel measurements are now discussed. Tables 1-2 present the CRLB of water thickness estimation with super-pixel measurements. Compared with single-pixel measurements in Table 1, the CRLB values of both MEICC ($N_{CC}=N_C^2$) and one coincidence counter ($N_{CC}$=1) were worse, the difference between 8 neighbors and 4 neighbors was larger, and the difference between MEICC and one coincidence counter was smaller. The CRLB of the ideal PCD and the current dual-energy PCD ($N_C$=2 and $N_{CC}$=0) with super-pixel measurements were comparable to the corresponding CRLB with single-pixel measurements.

Tables 4-5 present the CRLB of mono-energetic CT images with super-pixel measurements. Compared with single-pixel measurements in Table 3, the CRLB values of the ideal PCD and 8 neighbors with both MEICC and one coincidence counter were better, the CRLB of the current dual-energy CT and 4 neighbors were worse, and the difference between MEICC and one coincidence counter was smaller.

Tables 6-7 present the CRLB of K-edge imaging with super-pixel measurements. It can be seen in Table 6 that the CRLB values of the ideal PCD and the current dual-energy CT remained comparable to single-pixel measurements, while those of MEICC was worse and those of one coincidence counter were better than single-pixel measurements.

Table 6 shows the mean CRLB of K-edge images normalized by that of the current four-energy PCD ($N_c$=4 and $N_{cc}$=0).

|  | Neighbors | Single-pixel measurements, $N_C$ | | | | Super-pixel measurements, $N_C$ | | | |
| --- | --- | --- | --- | --- | --- | --- | --- | --- | --- |
|  |  | 4 | 6 | 8 | 12 | 4 | 6 | 8 | 12 |
| $N_{CC} = 0$ (current PCD) | — | 1.000 | 0.790 | 0.742 | 0.684 | 1.000 | 0.789 | 0.720 | 0.652 |
| Ideal PCD | — | 0.126 | 0.112 | 0.101 | 0.099 | 0.123 | 0.110 | 0.099 | 0.098 |
| $N_{CC} = N_C^2$ (MEICC) | 8 | 0.355 | 0.336 | 0.244 | 0.204 | 0.395 | 0.369 | 0.285 | 0.244 |
| $N_{CC} = N_C^2$ (MEICC) | 4 | 0.403 | 0.372 | 0.275 | 0.230 | 0.458 | 0.418 | 0.328 | 0.283 |
| $N_{CC} = 1$ | 8 | 0.926 | 0.757 | 0.712 | 0.653 | 0.916 | 0.745 | 0.678 | 0.614 |
| $N_{CC} = 1$ | 4 | 0.943 | 0.767 | 0.721 | 0.662 | 0.934 | 0.757 | 0.690 | 0.626 |

Table 7 shows the mean CRLB of K-edge images normalized by the corresponding CRLB of the current PCD ($N_{cc}$=0) with the same $N_c$.

|  | Neighbors | Single-pixel measurements, $N_C$ | | | | Super-pixel measurements, $N_C$ | | | |
| --- | --- | --- | --- | --- | --- | --- | --- | --- | --- |
|  |  | 4 | 6 | 8 | 12 | 4 | 6 | 8 | 12 |
| $N_{CC} = 0$ (current PCD) | — | 1.000 | 1.000 | 1.000 | 1.000 | 1.000 | 1.000 | 1.000 | 1.000 |
| Ideal PCD | — | 0.126 | 0.142 | 0.136 | 0.145 | 0.123 | 0.139 | 0.138 | 0.150 |
| $N_{CC} = N_C^2$ (MEICC) | 8 | 0.355 | 0.426 | 0.329 | 0.295 | 0.395 | 0.468 | 0.396 | 0.374 |
| $N_{CC} = N_C^2$ (MEICC) | 4 | 0.403 | 0.472 | 0.371 | 0.337 | 0.458 | 0.530 | 0.456 | 0.434 |
| $N_{CC} = 1$ | 8 | 0.926 | 0.959 | 0.959 | 0.955 | 0.916 | 0.944 | 0.942 | 0.942 |
| $N_{CC} = 1$ | 4 | 0.943 | 0.971 | 0.971 | 0.968 | 0.934 | 0.959 | 0.958 | 0.960 |

The reasons for the above discussed differences from single-pixel measurements and the different degrees of changes among PCDs are not clear at this moment; however, it is speculated that the difference in optimal threshold energies among PCDs, similar to what is presented in FIGS. 5A-5L, might have played some roles.

Discussion and Conclusions. MEICC, which acquires coincidence data caused by charge sharing, is used in order to address charge sharing problems with PCD. Design and operating parameters of MEICC are the number of energy windows ($N_C$), the number of coincidence counters ($N_{CC}$), threshold energies, how energy windows were connected if $N_{CC}$ is not $N_C^2$, and the number of neighboring pixels (8 or 4). The MC study showed that the performance of MEICC is promising. For two-basis material decomposition with four or more energy windows, the CRLB of MEICC were 36-38% of the current PCD with the same number of energy windows and were very close to those of the ideal PCD (at 33-36% levels). The study also showed the following results: The threshold energies significantly affected the CRLB; the best CRLB for MEICC was achieved when most of the thresholds were set at lower energies, which was the opposite of the other PCDs; presence of eight neighbors was ~10% better than 4 neighbors; and the number of coincidence counters might be reduced to about a half of $N_C^2$ with a limited impact on the CRLB. This study merely tested one way to bundle and connect energy windows of the POI and neighboring pixels; studying effective connections and evaluating the performance systematically will be of interest. MEICC performed well for K-edge imaging with CRLBs at 30-43% of the current PCD with the same number of energy windows. K-edge imaging requires more accurate spectral information than two-basis material decomposition; and therefore, the spectral charge sharing information MEICC provides was more effective.

In general, one coincidence counter was more effective than originally expected with the CRLB being 47-50% of the current PCD for two-basis material decomposition. The performance was degraded significantly for K-edge imaging and the CRLB was 93-96% of the current PCD; the difference from MEICC (30-43%) shows the difference between the intensity information of charge sharing one coincidence counter records and the spectral information MEICC captures. Note that the spatial resolution of non-ideal PCDs is worse than the resolution for the ideal PCD because spill-in charge sharing makes the effective pixel size bigger, especially at lower energies.

Hsieh, et al., studied an event-based real-time digital charge sharing correction scheme and concluded that the digital charge/count summing scheme with two energy windows exhibited 100% greater dose efficiency compared to the uncorrected one. Their result was approximately the same as the present result—the CRLB of MEICC with two energy windows is about 50% of the current detector-despite different simulation settings such as pixel size and spectrum. It might imply that MEICC maintains the spectral information related to charge sharing accurately enough that post-acquisition correction could achieve performance close to a digital event-based real-time correction. If this is proven to be true, MEICC could be a good alternative method for effectively combating charge sharing.

All of the technological components in the MEICC design are currently available. While one may be concerned with heat, power consumption, and space needed for MEICC, it is believed that those factors are manageable. Logic functions such as AND logics and OR logics as well as counters are small and light components. The components that consume major power are for the primary counting process, they include such items as a preamplifier, a pulse shaper, a baseline holder, and comparators, and they need delicate treatment since they handle analog signals. Once a comparator outputs a count, signals become digital, which significantly lessens the technical challenges.

In this study, threshold energies were not optimized, and they have to be done for each clinical task. The number of coincidence counters ($N_{CC}$) may be decreased to, for example, $2N_C$ or $(N_C-1)^2$, and the way to bundle and connect energy windows was not studied systematically. Other conditions such as x-ray spectra, pixel sizes, and electronic noise levels would affect the CRLB and the effectiveness of MEICC. As discussed above, the effect of the spatial resolution was not taken into account. This study focused on charge sharing; pulse pileup was not included. It is expected that PCDs without MEICC would have a tradeoff between charge sharing and pulse pileups as pixel sizes change, and the best performance may be obtained by a mid-size pixel when both of the factors are moderate and balanced. In contrast, PCDs with MEICC may perform best with smaller pixel sizes when charge sharing is addressed by MEICC and pulse pileup is negligible.

The analysis method is now outlined in detail and the assumptions in computing the Fisher information matrix are discussed. First, the incident spectrum is computed with a vector of basis function thicknesses $\theta=(\theta_1, \theta_2, \theta_3)^T$, where $\theta_1, \theta_2, \theta_3$ were thicknesses of water, bone, and gold, respectively, and the superscript T denotes a transpose of a vector or a matrix. The baseline spectrum was computed with 10 cm of water and 1 cm of bone, and two notes on the setting are discussed.

On the baseline spectrum: One may think that the object that consists of water and bone is too simple and wonder if there were other non-K-edge materials such as fat. In fact, any non-K-edge materials such as fat, muscle, liver, spleen, pancreas, brain, blood, skin, skull, spine and any combinations of these materials are covered by this object. For example, using the material decomposition, the attenuation with fat is practically equivalent to a weighted summation of water and bone as $\mu_{fat}(E) \approx 1.010\mu_{water}(E) - 0.044\mu_{bone}(E)$, where E is the energy. Thus, the object with 10 cm of water and 1 cm of bone is nearly equivalent to a combination of $x_f$ cm of fat, $(10-1.010\, x_f)$ cm of water, and $(1+0.044\, x_f)$ cm of bone.

On the additional material: A small amount of either water, bone, or gold was added and the measurements were repeated to assess the CRLB for accurately estimating the added thickness. The three materials were chosen to represent soft tissue, hard tissue, and K-edge materials. One could use a different material for soft tissue such as fat instead of water. The difference is considered minimal and water is a good material to represent soft tissue materials.

Photon energies were sampled randomly from the x-ray spectrum computed with $\theta$ and photons were randomly incident onto 3×3 PCD pixels. The MC program output the counts at counters and coincidence counters for the central 1 pixel for each noise realization. The output of the regular counters and coincidence counters are denoted, respectively, for noise realization k by $C_{X,k}$, X=1, 2, ..., $N_C$, k=1, 2, ..., $N_k$ and $CC_{XY,k}$, X=1, 2, ..., $N_C$ and Y=1, 2, ..., $N_C$, where $N_C$ is the number of energy windows and $N_k$=5,000 is the number of noise realizations. (For efficient computation, data was generated using 24 5-keV-width energy windows and synthesized data for $N_C \leq 12$ by adding multiple energy windows.) Therefore, a data vector, $d_{z,k}$, for noise realization k for PCD type z consisted of the following elements.

$d_{z,k}=(C_{1,k}, \ldots, C_{N_C,k})^T$ if z=1, 2 (The ideal PCD or the current PCD), $d_{z,k}=(C_{1,k}, \ldots, C_{N_C,k}, \Sigma_{X,Y} CC_{XY,k})^T$ if z=3 (PCD with one coincidence counter), $d_{z,k}=(C_{1,k}, \ldots, C_{N_C,k}, CC_{11,k}, \ldots, C_{1N_C,k}, \ldots, C_{N_C 1,k}, \ldots, C_{N_C N_C,k})^T$ if z=4 (PCD with MEICC).

where $\Sigma_{X,Y} CC_{XY}$ was a summation of $CC_{XY}$ for all of X and Y. The number of entries for the data vector per noise realization k was $N_C$ for both the ideal and the current PCDs, $N_C+1$ for the PCD with one coincidence counter, and $N_C+N_C^2$ for MEICC.

The mean vector, $\mu_z$, and the covariance matrix, $\Sigma_z$, for each PCD type z over noise realizations were computed from datasets $d_{z,k}$, k=1, 2, ..., $N_k$. The number of entries for $\mu_z$ was the same as that for the data vector and the size of the covariance matrix $\Sigma_z$ was $N_C \times N_C$ for both the ideal and the current PCDs, $(N_C+1)\times(N_C+1)$ for the PCD with one coincidence counter, and $(N_C+N_C^2)\times(N_C+N_C^2)$ for MEICC.

The Fisher information matrix was computed with two assumptions: (1) measured counts were multivariate Gaussian, distributed with a set of basis material thicknesses as parameters; and (2) the covariance remained unchanged with an additional small amount of attenuator. The element i,j of the Fisher information matrix for PCD type z, $F_{z,i,j}$, was computed by $$F_{z,i,j} = \left(\frac{\partial \mu_z}{\partial \theta_i}\right)^T \Sigma_z^{-1} \left(\frac{\partial \mu_z}{\partial \theta_j}\right) + \frac{1}{2} tr\left(\Sigma_z^{-1}\left(\frac{\partial \Sigma_z}{\partial \theta_i}\right)\Sigma_z^{-1}\left(\frac{\partial \Sigma_z}{\partial \theta_j}\right)\right) \approx \left(\frac{\partial \mu_z}{\partial \theta_i}\right)^T \Sigma_z^{-1} \left(\frac{\partial \mu_z}{\partial \theta_j}\right),$$

where the element index i and j was 1 for water, 2 for bone, and 3 for gold and the partial derivative $\partial \mu_z/\partial \theta_i$ was numerically computed by adding a small amount of basis function i and repeating the measurements. The second term of the above equation vanished due to Assumption 2. The Fisher information matrix size was 3×3 for K-edge imaging and 2×2 for the other imaging tasks.

On Assumption 1: Table 9 shows the mean counts of counters for the ideal PCD; Table A2 presents those of counters and one coincidence counter for non-ideal PCDs with the single-pixel measurement; and Table 3 shows the mean counts of coincidence counters with four energy windows ($N_C$=4) and 8 neighbors for MEICC. Mean counts were >30 for all of the regular counters except two, the one coincidence counter, 6 of the 16 multi-energy coincidence counters with a uniform energy window width, and 15 of the 16 coincidence counters with the optimal threshold energy setting. The assumption of counts being multivariate Gaussian distributed can be justified.

Table 8 shows the mean counts for counters $C_x$ for the ideal PCD with a uniform energy window width.

| $C_X$ | $N_C$ | | | | | |
|---|---|---|---|---|---|---|
| | 2 | 3 | 4 | 6 | 8 | 12 |
| $C_1$ | 2,231.5 | 983.7 | 381.4 | 143.1 | 77.0 | 36.9 |
| $C_2$ | 1,386.8 | 2,030.2 | 1,850.1 | 840.6 | 304.4 | 106.2 |
| $C_3$ | | 604.5 | 1,054.6 | 1,247.8 | 999.0 | 238.3 |
| $C_4$ | | | 332.3 | 782.4 | 851.1 | 602.3 |
| $C_5$ | | | | 457.8 | 616.4 | 757.8 |
| $C_6$ | | | | 146.6 | 438.2 | 490.0 |
| $C_7$ | | | | | 248.4 | 429.6 |
| $C_8$ | | | | | 83.9 | 352.8 |
| $C_9$ | | | | | | 272.2 |
| $C_{10}$ | | | | | | 185.7 |
| $C_{11}$ | | | | | | 106.7 |
| $C_{12}$ | | | | | | 39.9 |

Table 9 shows the mean counts for counters $C_x$ and a sum of all of coincidence counters $CC_{all}$ for non-ideal PCDs with a uniform energy window width and single-pixel measurements.

| $C_X$ or $CC_{all}$ | $N_C$ | | | | | |
|---|---|---|---|---|---|---|
| | 2 | 3 | 4 | 6 | 8 | 12 |
| $C_1$ | 3,829.5 | 2,903.1 | 2,247.8 | 1,637.6 | 1,318.0 | 984.8 |
| $C_2$ | 771.0 | 1,423.4 | 1,581.7 | 1,265.5 | 929.8 | 652.8 |
| $C_3$ | | 274.0 | 636.5 | 926.4 | 953.3 | 610.2 |
| $C_4$ | | | 134.4 | 497.0 | 628.4 | 655.3 |
| $C_5$ | | | | 221.0 | 401.9 | 553.5 |
| $C_6$ | | | | 53.0 | 234.6 | 372.9 |
| $C_7$ | | | | | 105.6 | 288.6 |
| $C_8$ | | | | | 28.6 | 208.3 |
| $C_9$ | | | | | | 139.6 |
| $C_{10}$ | | | | | | 81.5 |
| $C_{11}$ | | | | | | 39.8 |
| $C_{12}$ | | | | | | 13.1 |
| $CC_{all}$, 8 neighbors | 2,224.9 | 2,224.9 | 2,224.9 | 2,224.9 | 2,224.9 | 2,224.9 |
| $CC_{all}$, 4 neighbors | 1,853.7 | 1,853.7 | 1,853.7 | 1,853.7 | 1,853.7 | 1,853.7 |

On Assumption 2: The covariance was set to be unchanged with an additional small amount of basis function because it made the computation stable. It would have required a larger number of noise realizations to accurately estimate a small change of covariance. The entries of the Fisher information matrix might be somewhat underestimated (which in turn might over-estimate the CRLB).

The inverse of the Fisher information matrix, $F_z^{-1}$, was calculated. The CRLB of basis function i for PCD type z, $CRLB_{z,i}$, was the corresponding diagonal element of the inverse matrix, $[F_z^{-1}]_{ii}$. Mono-energetic CT images would be synthesized by a weighted summation of water and bone density images, and the variance of a weighted summation of two random variables $\varphi_1$ and $\varphi_2$ can be computed as $Var(w_1\varphi_1+w_2\varphi_2)=w_1^2 Var(\varphi_1)+w_2^2 Var(\varphi_2)+2w_1 w_2 Cov(\varphi_1,\varphi_2)$.

Therefore, the CRLB of mono-energetic CT images at energy $E_{mono}$, $CRLB_{z,mono}(E_{mono})$, was computed by $CRLB_{z,mono}(E_{mono})=w_1^2[F_z^{-1}]_{11}+w_2^2[F_z^{-1}]_{22}+2w_1 w_2 [F_z^{-1}]_{12}$.

where $w_1$ and $w_2$ were the linear attenuation coefficients of water and bone, respectively, at $E_{mono}$. Whenever one estimates multiple parameters from the same data, the noise is negatively correlated. Therefore, the noise in water and bone density estimates was negatively correlated (i.e., the covariance was negative), and therefore, the third term decreased the CRLB of the synthesized mono-energetic CT images.

An assessment of multi-energy inter-pixel coincidence counter for photon counting detectors at the presence of charge sharing and pulse pileup is now presented. As discussed above, when a 90-keV photon is incident onto the POI and spill-out charge sharing occurs (FIG. 1B), the photon may leave 60 keV at the POI and 30 keV at one of the neighboring pixels. One count each will then be added to counter CM of the POI and counter CL of the neighboring pixel. With MEICC, a count will also be added to the coincidence counter of the POI, CCML, that are associated to CM and CL. Underlines indicate that it belongs to neighboring pixels. When spill-in charge sharing happens (FIG. 1C), a count each will be added to CL, CM, and CCLM.

FIG. 7 shows a diagram for pair-wise MEICC for sub-pixel resolution, where there is a coincidence counter for each of the neighbor pixels, e.g., POI and pixel N, POI and pixel S, etc. and no charge sharing at the POI indicates that the photon was incident onto region 3, while charge sharing with pixel N means the photon hit region 1.

Figure 8:
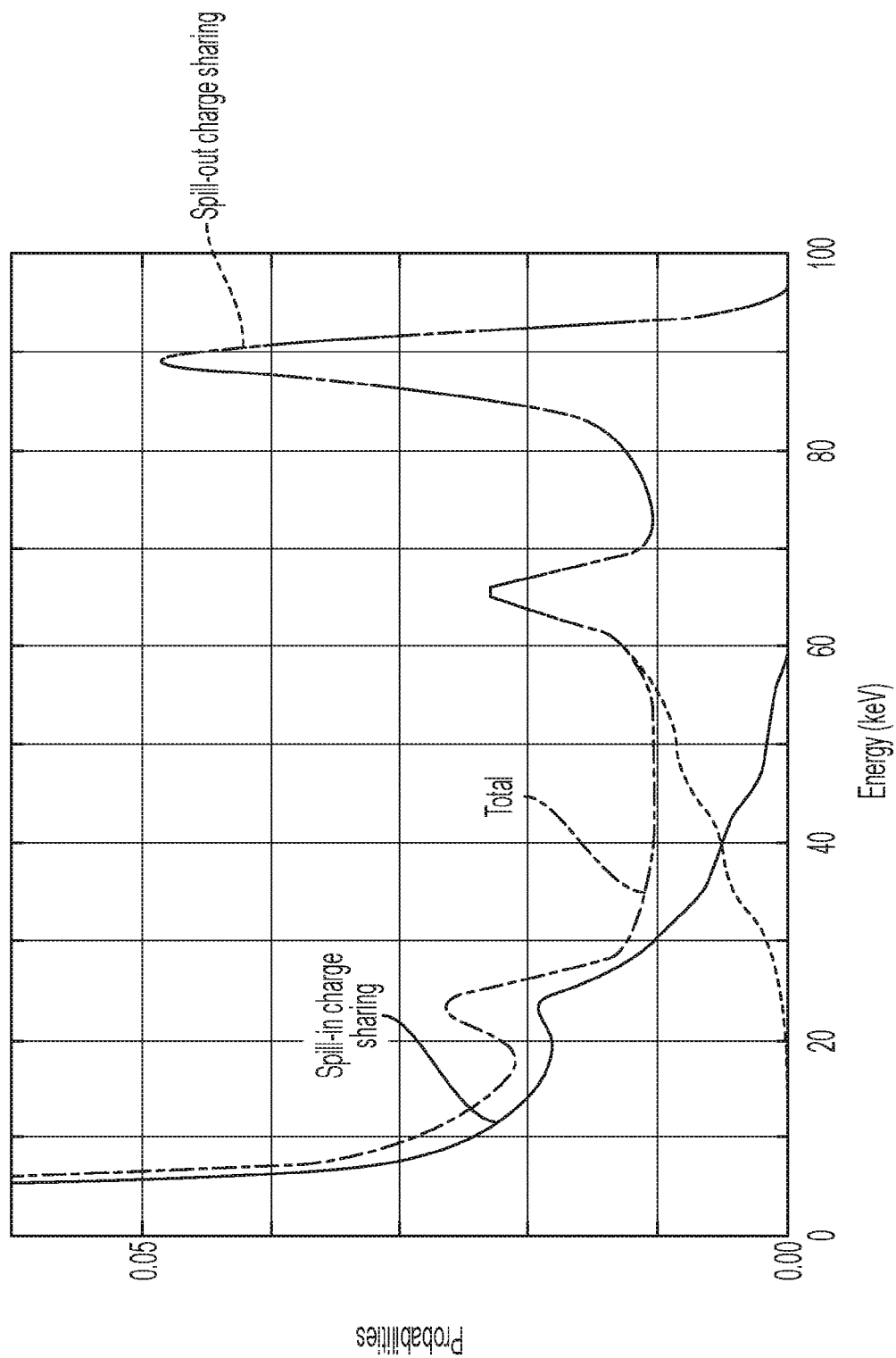
FIG. 8 shows plots of probabilities of recorded energy with a 90-keV photon. Previous studies on the spatio-energetic cross-talk showed that, with charge sharing, a photon is likely to deposit a higher energy at the incident pixel and a lower energy at its neighboring pixel(s).

FIG. 8 shows plots of probabilities of recorded energy with a 90-keV photon. Previous studies on the spatio-energetic cross-talk showed that, with charge sharing, a photon is likely to deposit a higher energy at the incident pixel and a lower energy at its neighboring pixel(s). Notice that a higher energy is deposited at the incident pixel with charge sharing in most cases (FIG. 8), and therefore, the spectral coincidence counter provides the information on the direction of charge sharing (i.e., if the event was spill-out or spill-in). After the acquisition is completed, the number of events recorded in the standard counters and coincidence counters will be read-out. A post-acquisition algorithm will then be able to either correct or compensate for charge sharing effect using the exact number of charge sharing occurrences recorded in coincidence counters for each pair of energy windows. For example, compensation can be achieved by maximizing the likelihood function and estimating line integrals of basis functions, which is similar to the maximum likelihood (ML) method and the maximum-likelihood with a non-negativity constraint (ML+) except that coincidence data for MEICC will be included.

Note that the coincidence counters in MEICC do not interfere with the primary counting process with the standard counters; therefore, PCDs with MEICC is expected to be as fast as those without MEICC. In contrast, event-based real-time charge sharing correction schemes discussed above do not have two separate sets of counters like MEICC. A set of counters is located after the anti-coincidence logics, and one of the counters will be incremented only after coincidence detection and processing is completed.

Boxcar versus flat-field Signals are now discussed. Flat-field signals-x-rays with the same expected intensity and spectrum are incident onto a group of PCD pixels (FIG. 9A, left) —have been used in many studies when the performance of PCDs is evaluated. The CRLB is computed with tiny changes being applied to x-rays for all of the PCD pixels. When charge sharing between neighboring pixels are present, a POI receives more photons that reflect the signals to be detected via spill-in charge sharing than a PCD with no charge sharing (FIG. 9B, left). In other words, charge sharing increases the effective area of PCD pixels. This leads to unphysical, counter-intuitive results when the flat-field scheme is used to assess the performance of one pixel. The flat-field scheme must be used to assess low spatial frequency imaging tasks or the zero-frequency detection quantum efficiency (DQE) of the PCD, and it must be used with N'N super-pixels.

Spatially contained boxcar signals were used, where x-rays incident onto the POI only change from the baseline spectrum to the target spectrum, while x-rays incident onto other pixels remain unchanged at the baseline spectrum (FIG. 9A, right). Regardless of the presence or absence of charge sharing, the CRLB is computed with the same amount of signals using this scheme (see FIG. 9B, right). It is believed that this is a better scheme to be used to assess the performance of PCDs for high spatial resolution imaging tasks. In fact, the boxcar signal is a part of a square hole grid pattern (FIG. 9C), which can be used to measure the DQE at the Nyquist frequency of the PCD. It is not suitable to combine an N'N super-pixel with boxcar signals because an N'N super-pixel (discussed later) is a low spatial resolution measurement scheme and boxcar signals are designed for high spatial resolution assessments.

FIG. 9A shows views from the top. Flat-field signals change x-ray spectrum and intensity incident onto all of the pixels from condition 1 to condition 2, while boxcar signals changes x-rays onto the pixel-of-interest (POI) only. Condition 1 refers to the baseline spectrum and condition 2 refers to the target spectrum. FIG. 9B shows side views. The lines and spheres are x-rays and electronic charge clouds; those in blue and red are generated with conditions 1 and 2, respectively. Numbers are the number of counts produced at the POI. With the flat-field scheme, the POI of PCD with charge sharing (CS) counts five events with condition 2 including two additional events via spill-in charge sharing from neighboring pixels, which is more than the CS-free PCD counts (i.e., three events). In contrast, with the boxcar scheme, the PCD with charge sharing counts three events with condition 2, which is the same as CS-free PCD does. The additional two events with condition 1 come into the POI via spill-in and degrade the signal-to-noise ratio of data. FIG. 9C shows a square hole grid pattern, which could be used to measure the DQE at the Nyquist frequency of the PCD, includes the boxcar signal pattern.

Single-Pixels and N'N Super-Pixels are now discussed. The output of the POI is evaluated (which is also called a single-pixel in this paper) as well as an N'N super-pixel with N=2, 3, 4, 5, where the output of N'N pixels were added to create the output of one large pixel. Given that super-pixels would not be used for high resolution imaging tasks, the flat-field scheme was used to assess the performance of super-pixels.

The following three different physics tasks with different dimensionality that are relevant to three clinical applications in this study were used: the line integral estimation of water for the conventional CT imaging, water thickness estimation for water-bone material density imaging, and gold thickness estimation for K-edge imaging with water-bone-gold material decomposition. Note that the conventional CT imaging is a 1-dimensional estimation problem and is different from monochromatic CT imaging that is a 2-dimensional estimation problem followed by a weighted summation of the estimated two parameters to synthesize a line integral at a desirable energy.

Monte Carlo (MC) simulations for single-pixel measurements are now discussed. The MC, as discussed above, was modified to allow for the use of boxcar signals. This MC program cascades the following processes and is essentially a stochastic version of Photon Counting Toolkit (PcTK) with pre-computed look-up tables, which had excellent agreement with another MC simulation and a PCD: (1) photon generations with randomized energies and time intervals for a Poisson distribution, (2) charge sharing based on a randomized location and interaction and detection processes, (3) pulse train generations with electronic noise, (4) comparator signal generation by pulse height analyzers with set energy thresholds, and (5) counting and coincidence processing. Out of 5'5 pixels, photons were randomly incident onto only the central 3'3 pixels and the above processes were performed for each pixel in parallel. The MC program outputs the counts saved at counters and coincident counters for the POI. For step (2), the interaction types were either no detection, the photoelectric effect with total absorption, the photoelectric effect with K-escape, or the photoelectric effect with re-absorption of fluorescence x-ray. Triple- and quadruple-counting were also included. Neither Compton scattering nor Rayleigh scattering was included and the number of interactions was limited to one, because the probability was low for diagnostic energies. An impulse pulse was used in step (3) and no pulse pileup was included in this study.

X-rays were operated at 140 kVp and 50 mA and a time duration per reading was 45 ms. Three sets of 1,000 noise realizations (thus, 3,000 noise realizations in total) were acquired for a given spectrum and a PCD type. The baseline spectrum was set with the attenuation by 10 cm water and 1 cm bone, resulting in ~21,000 incident photons per pixel per reading on average; three target spectra were set by adding a tiny amount of either water, bone, or gold to the baseline.

Cadmium telluride PCD was simulated with a pixel size of either (225 µm)2 or (450 µm)2, a thickness of 1.6 mm, and electronic noise with a standard deviation of 2.0 keV added to a pulse train (not to threshold energies). The following four PCD types were assessed: (1) The current PCD with no additional schemes to address charge sharing; (2) a PCD with 1CC; (3) a PCD with MEICC; and (4) the "charge sharing(CS)-free PCD" with no charge sharing but all of the other factors such as electronic noise, K-escape through either front or back side of the PCD, and non-perfect detection efficiency. The CS-free PCD is similar to a PCD with a very large pixel. The number of energy windows ($N_C$) was 2, 3, 4, 6, and 8; the number of coincidence counters for MEICC ($N_{CC}$) was $N_C$ 2; all of the eight neighbors were used for MEICC and 1CC; and the optimal threshold energies with the lowest CRLB for a given setting were found by performing an exhaustive search with a 5-keV increment from 20 keV to 135 keV. The number of entries for the data vector per noise realization was $N_C$ for both the CS-free and the current PCDs, $N_C$+1 for 1CC, and $N_C$+$N_C$2 for MEICC. The output data from the POI only was used for single-pixel measurements; no data from the neighboring pixels were used.

Data processing for single-pixel measurements is now discussed. The following procedure was used for data processing, which is the same as the previous study. The mean and covariance of PCD data over 1,000 noise realizations were calculated. The Fisher information matrix was computed numerically with two assumptions: (1) counts were multivariate normally distributed; and (2) covariance remained unchanged with an additional tiny amount of attenuator. It is believed that assumption (1) can be justified as most of energy windows had the mean counts larger than 100 counts. Assumption (2) stabilized the computation at the expense of a possible overestimation of CRLB. The size of Fisher information matrix was 1'1 for the conventional CT imaging, 2'2 for water-bone material decomposition, and 3'3 for K-edge imaging. The inverse of Fisher information matrix was computed. The CRLB of the variance of each basis material was the corresponding diagonal element of the inverse matrix. An unbiased sample standard deviation of CRLB values over the three sets of 1,000 noise realizations was computed. All of the CRLB values were then normalized by the mean CRLB of the CS-free PCD with 8 energy windows, which were denoted by nCRLB. One comment on the conventional CT imaging setting in noted. Even though water and bone were used to attenuate the original spectrum and synthesize the baseline spectrum, the use of two basis materials is nothing to do with the dimensionality of the estimation problem. The target spectrum for the conventional CT imaging was synthesized by adding water only to the baseline condition. The problem setting was to compute the minimum noise variance in estimating the added water thickness without biases, and thus, it is a 1-dimensional estimation problem and there is neither model error nor model-data mismatch. Thus, there exists an unbiased estimator, and therefore, the use of CRLB is justified.

Monte Carlo simulations and data processing for super-pixel measurements are now discussed. The MC simulation settings and the data processing scheme were the same as those used for single-pixel measurements except for the following few changes. There were 9'9 pixels, out of which photons were randomly incident onto the central 7'7 pixels. The pixel size with (225 µm)2 only was used. The time duration per reading was 0.2 ms and six sets of 500 noise realizations (thus, 3,000 noise realizations in total) were acquired for a given spectrum and a PCD type. The shorter acquisition time was necessary to make the computation time manageable. The number of energy windows (NC) was 2, 3, 4, and 6. Neither MEICC with any NC nor NC=8 with any PCD types was used because the mean counts for some primary counters and many coincidence counters were less than 30 counts. The outputs of the central N'N pixels with N=1, 2, 3, 4, and 5 were added to create the output of one N'N super-pixel per reading. The number of entries for the super-pixel data vector per noise realization was the same as that of the single-pixel measurements. The CRLB values were normalized by that of the CS-free PCD with NC=6.

Figure 10B:
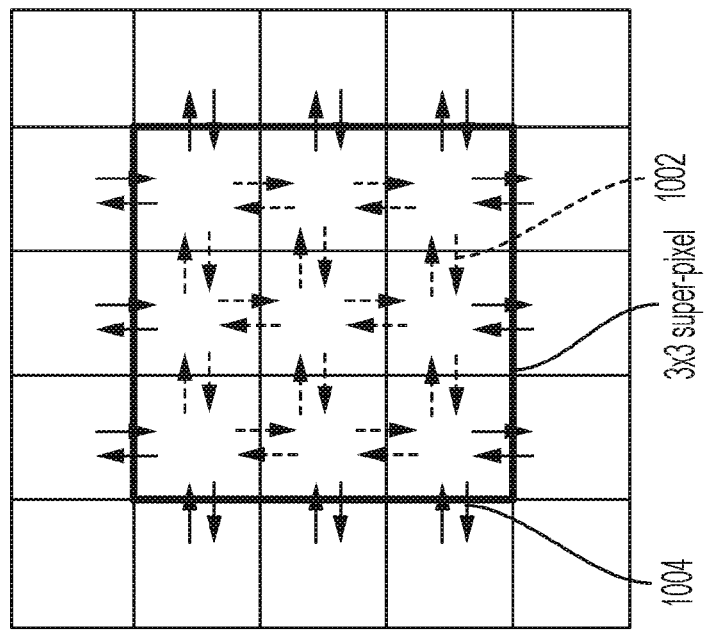
FIG. 10B shows a 3×3 super-pixel and all of the possible charge sharing events that involve the super-pixel. Arrows 1002 indicate double-counting between two pixels inside the super-pixel. In contrast, Arrows 1004 denote double-counting across the super-pixel boundary, and therefore, only one count each is registered by the super-pixel. Thus, it is a single-counting event as far as the super-pixel is concerned.
Figure 10A:
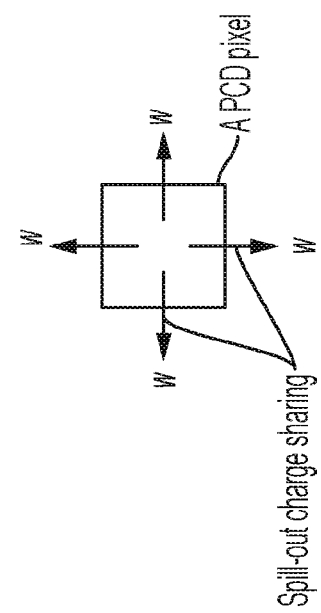
FIG. 10A shows when a photon is incident onto a PCD pixel, a probability of no charge sharing is 1-4w. Double-counting may occur between the primary pixel and one of its four neighboring pixels, each with a probability of w. Note that an arrow points from the primary pixel to the destination pixel.

A study on flat-field signals and N'N super-pixels is now discussed. FIG. 10A shows when a photon is incident onto a PCD pixel, a probability of no charge sharing is 1-4w. Double-counting may occur between the primary pixel and one of its four neighboring pixels, each with a probability of w. Note that an arrow points from the primary pixel to the destination pixel. FIG. 10B shows a 3×3 super-pixel and all of the possible charge sharing events that involve the super-pixel. Arrows 1002 indicate double-counting between two pixels inside the super-pixel. In contrast, Arrows 1004 denote double-counting across the super-pixel boundary, and therefore, only one count each is registered by the super-pixel. Thus, it is a single-counting event as far as the super-pixel is concerned.

A charge sharing counting model was used to study the signal-to-noise ratio (SNR) of N'N super-pixel measurements with flat-field signals for the conventional CT imaging task; the model took into account the effect of both "double-counting" and cross-boundary charge sharing. When one photon is counted by two pixels within the N'N pixels, it is called double-counting and increases the noise of the super-pixel data relative to the signal. Let us consider N'N super-pixels and flat-field signals with an incident rate of 1 photon per reading. Suppose that when a photon is incident onto a PCD pixel and detected, a probability of no charge sharing is 1-4w and a probability of charge sharing with one of the four neighbors is w (FIG. 10A). The expected number of events with no charge sharing (hence, single-counting events), sc1, can be computed by sc #=1-4w×N+, (1) as there are N2 pixels inside the super-pixel. The expected number of events with charge sharing between two pixels across the boundary of the super-pixel (FIG. 10B), sc2, can be calculated by sc+=2w×4N.

The probability for each pixel edge is 2w because it is a two-way cross-talk with both spill-out (from the super-pixel to its neighbors) and spill-in (from one of the neighbor pixels to the super-pixel) and there are 4N edges along the super-pixel boundary. These events are counted only once by the super-pixel; hence, they are single-counting events in this analysis. Now the expected number of charge sharing events between two of pixels within the super-pixel (FIG. 5B), dc, is dc=2w×2N N−1. The expected signal S and the variance V can be calculated by taking into account the double-counting:

$$S = sc\ \#+sc++2dc, \quad (4)$$

$$V = sc\ \#+sc++4dc. \quad (5)$$

The SNR and the SNR normalized by that of the CS-free N'N super-pixels (nSNR) with the same N can be computed as follows.

$$SNR\ N,w = S\ V, \quad (6)$$

$$nSNR\ N,w = SNR\ N,w\ SNR\ N,0. \quad (7)$$

The nSNR's at various N and were computed in this study.

Conventional CT Imaging (Single-Pixels) results are now discussed. When the flat-field signals were used with single-pixel measurements and optimal threshold energies, the nCRLBs of all of the PCDs with charge sharing were at 0.74-0.77 and better than the CS-free PCD (1.00-1.02), because the primary information necessary for the conventional CT imaging task performance was the x-ray intensities (i.e., the area-under-the-spectrum-curve); and therefore, receiving more photons outweighed the spectral distortion due to charge sharing.

FIG. 15A, FIG. 15B, FIG. 15C, FIG. 15D, FIG. 15E, FIG. 15F, FIG. 15G, FIG. 15H, and FIG. 15I show the results of single-pixel measurements. The nCRLB values for line integral estimation for conventional CT imaging (FIG. 15A-FIG. 15C), water thickness estimation for water-bone material decomposition (FIG. 15D-FIG. 15F), and gold thickness estimation for K-edge imaging (FIG. 15G-FIG. 15I). The results are with flat-field signals with 225-μm pixels (FIG. 15A, FIG. 15D, and FIG. 15G), spatially modulated boxcar signals with 225-μm pixels (FIG. 15B, FIG. 15E, and FIG. 15H), and boxcar signals with 450-μm pixels (FIG. 15C, FIG. 15F, and FIG. 15I). Error bars indicate standard deviations of nCRLB over three sets of 1,000 noise realizations. nCRLB=Cramér-Rao lower bound normalized by that of CS-free PCD with $N_C=8$; PCD=photon counting detector; CS=charge sharing; 1CC=PCD with one coincidence counter; MEICC=the proposed, multi-energy inter-pixel coincidence counter.

TABLE 10

Normalized Cramér-Rao Lower Bound Line Integral Estimation for Conventional CT Imaging

| | Flat field signals 225 μm, $N_C$ | | | | | Boxcar signals, 225 μm, $N_C$ | | | | | Boxcar signals, 450 μm, $N_C$ | | | | |
|---|---|---|---|---|---|---|---|---|---|---|---|---|---|---|---|
| | 2 | 3 | 4 | 6 | 8 | 2 | 3 | 4 | 6 | 8 | 2 | 3 | 4 | 6 | 8 |
| Current PCD | 0.77 | 0.77 | 0.77 | 0.76 | 0.76 | 1.15 | 1.14 | 1.13 | 1.13 | 1.09 | 1.06 | 1.05 | 1.04 | 1.04 | 1.03 |
| 1CC | 0.77 | 0.77 | 0.77 | 0.76 | 0.76 | 1.11 | 1.10 | 1.10 | 1.09 | 1.09 | 1.04 | 1.03 | 1.02 | 1.02 | 1.01 |
| MEICC | 0.77 | 0.77 | 0.76 | 0.75 | 0.74 | 1.08 | 1.07 | 1.06 | 1.05 | 1.03 | 1.03 | 1.02 | 1.01 | 1.01 | 1.00 |
| CS-free PCD | 1.02 | 1.01 | 1.01 | 1.00 | 1.00 | 1.02 | 1.01 | 1.01 | 1.00 | 1.00 | 1.02 | 1.01 | 1.01 | 1.00 | 1.00 |

TABLE 11

Normalized Cramér-Rao Lower Bound for Water Thickness Estimation for Water-Bone Material Density Imaging

| | Flat field signals 225 μm, $N_C$ | | | | | Boxcar signals, 225 μm, $N_C$ | | | | | Boxcar signals, 450 μm, $N_C$ | | | | |
|---|---|---|---|---|---|---|---|---|---|---|---|---|---|---|---|
| | 2 | 3 | 4 | 6 | 8 | 2 | 3 | 4 | 6 | 8 | 2 | 3 | 4 | 6 | 8 |
| Current PCD | 2.55 | 2.41 | 2.36 | 2.32 | 2.30 | 3.06 | 2.87 | 2.73 | 2.66 | 2.63 | 1.93 | 1.80 | 1.72 | 1.67 | 1.65 |
| 1CC | 1.64 | 1.50 | 1.48 | 1.45 | 1.44 | 2.04 | 1.91 | 1.87 | 1.83 | 1.81 | 1.46 | 1.36 | 1.32 | 1.28 | 1.27 |
| MEICC | 1.50 | 1.31 | 1.26 | 1.22 | 1.19 | 1.97 | 1.82 | 1.74 | 1.67 | 1.63 | 1.40 | 1.29 | 1.24 | 1.19 | 1.17 |
| CS-free PCD | 1.19 | 1.06 | 1.03 | 1.01 | 1.00 | 1.19 | 1.06 | 1.03 | 1.01 | 1.00 | 1.19 | 1.06 | 1.03 | 1.01 | 1.00 |

TABLE 12

Normalized Cramér-Rao Lower Bound for Gold Thickness Estimation for K-Edge Imaging

| | Flat field signals 225 μm, $N_C$ | | | | | Boxcar signals, 225 μm, $N_C$ | | | | | Boxcar signals, 450 μm, $N_C$ | | | | |
|---|---|---|---|---|---|---|---|---|---|---|---|---|---|---|---|
| | 2 | 3 | 4 | 6 | 8 | 2 | 3 | 4 | 6 | 8 | 2 | 3 | 4 | 6 | 8 |
| Current PCD | 3.25 | 3.05 | 2.96 | 2.91 | 2.88 | 3.11 | 2.81 | 2.74 | 2.65 | 2.62 | 2.16 | 1.93 | 1.87 | 1.81 | 1.78 |
| 1CC | 1.83 | 1.64 | 1.59 | 1.59 | 1.52 | 2.23 | 1.96 | 1.90 | 1.84 | 1.83 | 1.67 | 1.45 | 1.40 | 1.35 | 1.34 |
| MEICC | 1.61 | 1.30 | 1.23 | 0.76 | 0.76 | 2.19 | 1.89 | 1.78 | 1.69 | 1.64 | 1.62 | 1.39 | 1.32 | 1.26 | 1.22 |
| CS-free PCD | 1.36 | 1.09 | 1.05 | 1.01 | 1.00 | 1.36 | 1.09 | 1.05 | 1.01 | 1.00 | 1.36 | 1.09 | 1.05 | 1.01 | 1.00 |

FIG. 15B shows the nCRLB with 225-μm PCD single-pixels measured using the boxcar signals. The nCRLBs of PCDs with charge sharing were higher than the CS-free PCD; for example, the nCRLB with NC=6 was 1.05 for MEICC, 1.09 for 1CC, 1.13 for the current PCD, and 1.00 for the CS-free PCD. The MEICC decreased the noise variance by 7% [=(1−1.05/1.13)' 100%] from the current PCD and was more effective than 1CC, which decreased the noise by 4%. It showed that the spectral information of charge sharing MEICC captured was somewhat valuable even for a non-spectral task. The nCRLB was almost constant over NC.

FIG. 15C presents the nCRLBs with 450-μm PCD single-pixels measured using the spatially modulated boxcar signals. Qualitative observations were similar to those with 225-μm pixel, although all of the PCDs with charge sharing had nCRLB values that were very close to the CS-free PCD because the 450-μm pixel had less charge sharing than the 225-μm pixel did.

Water-bone material density imaging (single-pixels) is now discussed. FIG. 15E and Table 11 show the nCRLB of water thickness estimation for water-bone material density imaging with 225-μm PCD single-pixels, the boxcar signals, and the optimal threshold energies. Results of bone thickness estimation was very similar to water, thus, not presented. With all of PCDs, then CRLB improved with increasing NC and the largest improvement was obtained when NC was increased from two to three: the relative improvements were 14% [=(2.19−1.89)/2.19' 100%] for MEICC, 12% for 1CC, 10% for the current PCD, and 20% for the CS-free PCD. For a given NC with the boxcar signals, both MEICC and 1CC were at about a halfway between the current PCD and the CS-free PCD (with MEICC being slightly better than 1CC). With the flat-field signals (FIG. 15D), the nCRLBs of both MEICC and 1CC were much closer to that of the CS-free PCD than with the boxcar signals (FIG. 15E), simply because the effective pixel area of PCDs with charge sharing was larger due to charge sharing.

FIG. 15F shows the nCRLB with 450-μm PCD pixels. Again, qualitative observations were similar to those with 225-μm pixel; however, all of the PCDs with charge sharing with 450-μm pixels had much better nCRLB values, closer to the CS-free PCD. The nCRLBs with 225-μm pixel MEICC were 1.64-2.19 and comparable to those with 450-μm pixel with the current PCD (1.78-2.16).

K-edge imaging (single-pixels) is now discussed. FIG. 15H and Table 12 show the nCRLB of gold thickness estimation for K-edge imaging with 225-μm PCD single-pixels, the boxcar signals, and the optimal threshold energies. With all of PCDs, the nCRLB improved with increasing NC more significantly than the other tasks, probably because K edge imaging demands the accuracy of the spectral information the most. The nCRLB of MEICC with the boxcar signals improved by 2.22 (=6.50-4.28) or 34% (=2.22/6.50' 100%) from 3 windows to 4 windows, and 1.00 or 23% from 4 windows to 6 windows. The improvement with the current PCD was by 1.64 (=10.07-8.43) or 16% (1.64/10.07' 100%) from 3 windows to 4 windows, and 1.32 or 16% from 4 windows to 6 windows. For a given NC with NC≥4, MEICC was at about a halfway between the current PCD and the CS-free PCD or somewhat closer to the CS-free PCD.

FIG. 15I presents the nCRLB with 450-μm pixels. Once again, qualitative trends remained the same as 225-μm pixels and all of the PCDs with charge sharing were closer to the CS-free PCD than 225-μm's counterparts. The nCRLBs with 225-μm pixel MEICC were close to those with 450-μm pixel with the current PCD: 3.03-6.50 versus 2.54-4.21.

Figure 16:
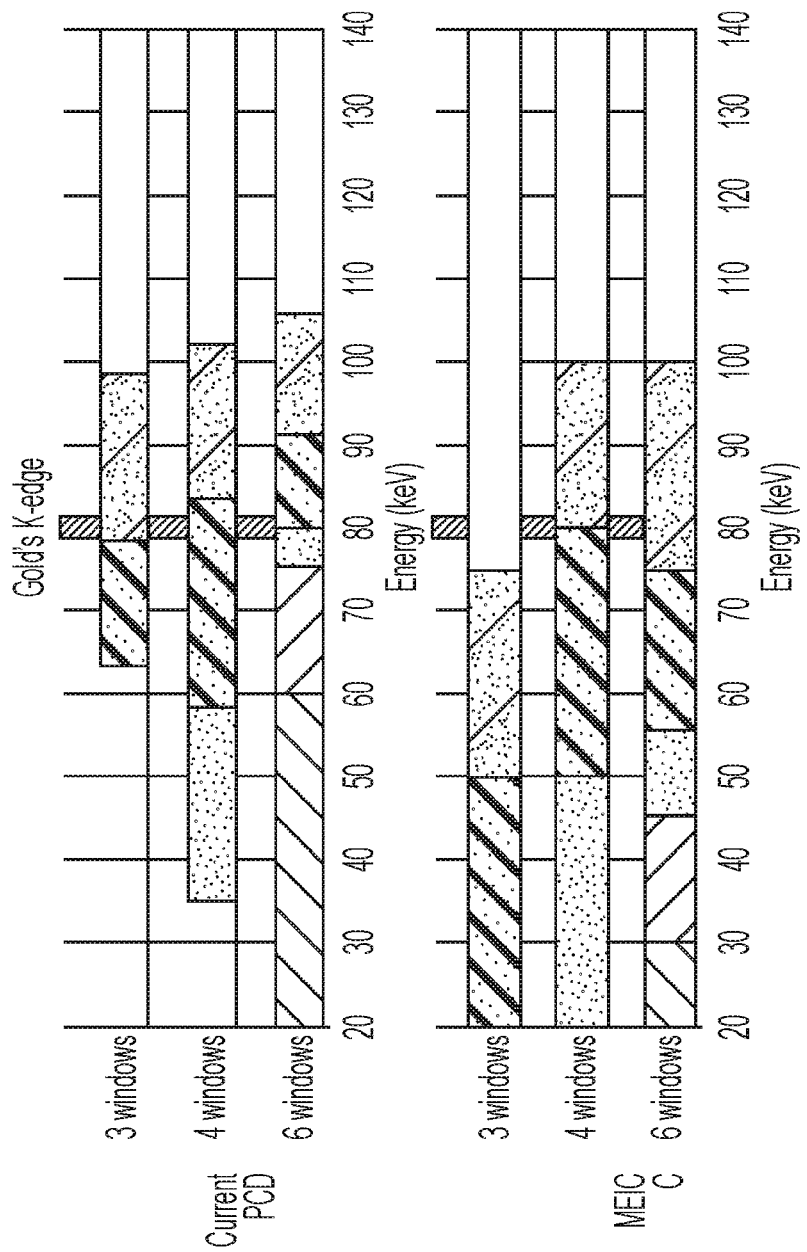
FIG. 16 shows plots of threshold energies that provided the least CRLB for the current PCD and the PCD with MEICC for K-edge imaging.

FIG. 16 shows plots of threshold energies that provided the least the MEICC and the current PCD with 225-μm pixels, averaged over 3 sets of 1,000 noise realizations and the PCD with MEICC for K-edge imaging. The current PCD with 3 windows set the lowest threshold energy at 63 keV, threw away all of the photons between 20 keV and 62 keV, and focused on acquiring photons only near the K-edge where the K-edge signals were the strongest even with spectral distortion. In contrast, MEICC with 3 windows set two windows below the K-edge and utilized all of the photons over 20-140 keV. MEICC used the spectral information of charge sharing and decreased the noise of K-edge imaging. The optimal threshold energies for 1CC were very similar to those of the current PCD. The optimal threshold energies for 450-μm pixel PCDs with charge sharing were almost identical to those for 225-μm pixel PCDs: The unique and different allocations of energy windows were consistent regardless of the amount of charge sharing.

Super-pixel measurements are now discussed. FIG. 17A, FIG. 17B, FIG. 17C, FIG. 17D, FIG. 17E, FIG. 17F, FIG. 17G, FIG. 17H, FIG. 17I, FIG. 17J, FIG. 17K, FIG. 17L, FIG. 17M, FIG. 17N, and FIG. 17O shows plots of the results of N×N super-pixel measurements with flat-field signals. The nCRLB values for line integral estimation for conventional CT imaging (FIG. 17A-FIG. 17E), water thickness estimation for water-bone material decomposition (FIG. 17F-FIG. 17J), and gold thickness estimation for K-edge imaging (FIG. 17K-FIG. 17O). Error bars indicate standard deviations of nCRLB over six sets of 500 noise realizations. nCRLB=Cramér-Rao lower bound normalized by that of the CS-free PCD with $N_C$=6; PCD=photon counting detector; CS=charge sharing; 1CC=PCD with one coincidence counter; $N_C$=The number of energy windows.

As can be seen in the results of the N'N super-pixel measurements with N=1-5, the nCRLBs of the conventional CT imaging (FIG. 17A-FIG. 17E) increased from N=1 to N=4. The nCRLBs with NC=1 were 0.87, 1.09, 1.16, 1.20, 1.13 for the current PCD and 0.86, 1.04, 1.08, 1.10, 1.03 for 1CC, both for N=1, 2, 3, 4, 5, respectively. The nCRLBs of 1CC for the K-edge imaging (FIG. 17K-FIG. 17O) showed a consistent increase with N as well: The nCRLBs with NC=3 were 4.75, 6.06, 7.13, 7.81, 8.47 for N=1, 2, 3, 4, 5, respectively.

In contrast, the nCRLBs of the water thickness estimation (FIG. 8F-FIG. 8J) increased from N=1 to N=2, then the changes between N=2 and N=5 were small and not consistent. The differences in performances between these three tasks may be attributed to the differences in how they were affected by both the noise penalty in double-counting within each energy window (negatively) and the spectral information carried by both spill-in and spill-out charge sharing events (positively).

Figure 18A:
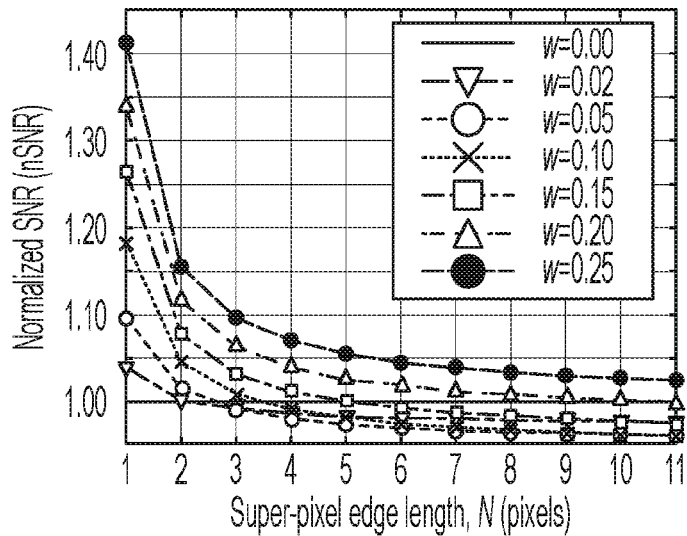
FIG. 18A and FIG. 18B shows plots of the normalized signal-to-noise ratio (nSNR) of super-pixel data with flat-field signals computed by the model. The nSNR values with N=1,000 were 1.000, 0.970, 0.949, 0.944, 0.956, 0.976, and 1.000 with w=0.00, 0.02, 0.05, 0.10, 0.15, 0.20, and 0.25, respectively.
Figure 18B:
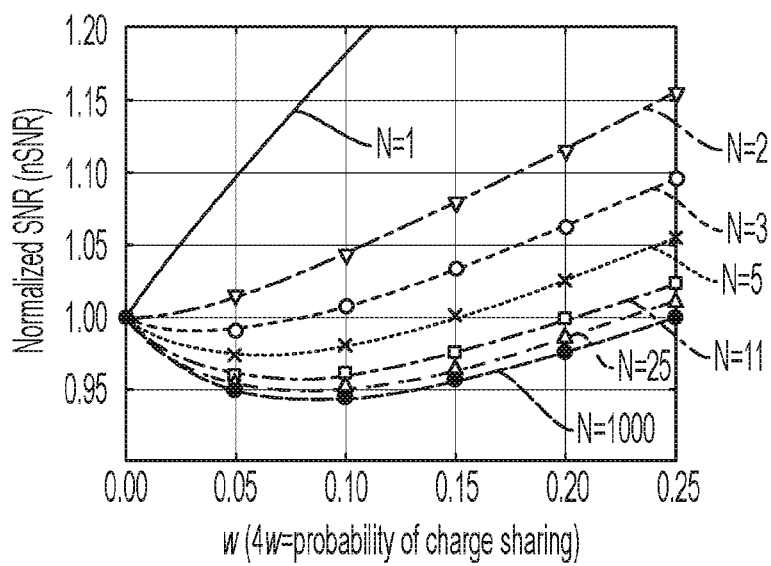

A study on flat-field signals and N'N super-pixels is now discussed. FIG. 18A and FIG. 18B shows plots of the normalized signal-to-noise ratio (nSNR) of super-pixel data with flat-field signals computed by the counting model. The nSNR values with N=1,000 were 1.000, 0.970, 0.949, 0.944, 0.956, 0.976, and 1.000 with w=0.00, 0.02, 0.05, 0.10, 0.15, 0.20, and 0.25, respectively. Four observations are noted below. First, the nSNRs with w>0 were larger and better than 1 when N=1, and then decreased monotonically with increasing N (FIG. 18A). Second, the speed of the decreasing was slow, especially with larger w, and it needed a large N for an nSNR to get close to the "converged value." If the nSNRs with N=1,000 were set to be the converged values, the minimum value of N necessary to be within 0.01 from the converged values is 12, 18, 21, 23, and 25 for w=0.05, 0.10, 0.15, 0.20, and 0.25, respectively. Third, a PCD with w=0.25, which has 100% charge sharing, provided nSNR>1, and is always better than the PCD with w=0 (the CS-free PCD). A noise penalty due to double-counting were outweighed by a large number of spill-in signals coming from outside the super-pixel boundary. Fourth, when N=1,000, the least and worst nSNR was 0.9430 at w=0.0832 (FIG. 18B), and PCDs with severer charge sharing (i.e., w>0.0832) had better nSNRs. It demonstrated an interesting balancing act of charge sharing with the negative impact with double-counting among N'N pixels and the positive impact with single-counting spill-in and spill-out across the super-pixel boundary.

The first observation outlined above agreed with the results of the super-pixel MC simulation (FIG. 17A-FIG. 17E). For N'N super-pixels of the current PCD with NC=1, the inverse square-root of the nCRLBs relative to those of the CS-free PCD were 1.10, 0.98, 0.95, 0.93, 0.95 for N=1, 2, 3, 4, 5, respectively, whereas the nSNRs of the model with w=0.05 were 1.10, 1.01, 0.99, 0.98, 0.97 for N=1, 2, 3, 4, 5, respectively. The changes with N agreed to each other: The linear correlation coefficient (R) between the current PCD and the model with w=0.05 was 0.986 (P=0.002).

PCDs with MEICC were at about a halfway between the current PCD and the CS-free PCD for a given pixel size. MEICC with 225-µm pixel was close to the current 450-µm PCD: nCRLB=1.01-1.12 for 225-µm MEICC versus 1.00-1.12 for the current 450-µm PCD for the conventional CT imaging; 1.64-2.19 versus 1.78-2.16 for water-bone material decomposition; and 3.03-6.50 versus 2.54-4.21 for K-edge imaging. The use of the boxcar signals has the following two merits. First, it allows for the assessment of the CRLB using the same amount of signals regardless of the presence or absence of charge sharing. With the boxcar signals, spill-in counts coming from the neighboring pixels are noise that disturbs signal detections. In contrast, the use of the flat-field signals underestimates the variance, because spill-in counts increase signals, which led to the counter-intuitive result with the conventional CT imaging: PCDs with charge sharing were better than the CS-free PCD. Second, it allows for the assessment of the system performance at high spatial frequencies, which is a valuable complement to the zero-frequency performance that can be assessed by using the flat-field signals and N'N super-pixels with a large N. The analysis using the simple counting model of charge sharing showed that the boundary effect of super-pixel with flat-field signals might be larger than many might have anticipated previously. It is suggested to use a large super-pixel, e.g., 25'25 pixels, to approximate the zero-frequency DQE of PCDs. The MC results with super-pixels agreed with the model analysis. The nCLRB increased with increasing N for the conventional CT imaging task and even the rank order of PCDs was not consistent with increasing N. There were differences among the three spectral tasks in how increasing N affected nCRLBs, and it may be attributed to how the spectral information critical for each task was affected by the negative and positive impacts of charge sharing, i.e., noise penalty in double-counting within energy windows and the spectral signal gain via cross-boundary spill-in charge sharing.

The nSNR computed by the charge sharing counting model is a DQE (0)-like index with a finite N'N pixels and it asymptotically approaches the DQE (0) as increasing N. The nSNR will asymptotically approach $(1+4w)/(1+12w)^{1/2}$ as N→∞, which agrees with the analytical form of the DQE (f) of PCDs developed by Stierstorfer in K. Taguchi, K. Stierstorfer, C. Polster, O. Lee, and S. Kappler, "Spatio-energetic cross-talk in photon counting detectors: N×N binning and sub-pixel masking," *Medical Physics*, vol. 45, no. 11, pp. 4822-4843, 2018, doi: doi:10.1002/mp.13146. By substituting p010=1-4w, p110=4w, p100=0, and G (0,0)= 1 for f=0 to Eq. (31) of Ref. [39], DQE (0)=$(1+4w)2/(1+12w)$ is obtained. It can also be shown by taking a derivative that the minimum value of the asymptotic nSNR can be analytically found as 2'sqrt(2)/3»0.9428 at w=1/12=0.0833, and that is very close to the minimum nSNR value and the minimum point (i.e., 0.9430 at w=0.0832) of the model with N=1,000.

The following notes are made about this study. First, no pileup was considered in this study. In the real world, there is a tradeoff between charge sharing and pileup when PCDs with different pixel sizes are assessed. Nonetheless, it is believed that this study provided valuable results with two pixel sizes, which serve as a baseline for a given pixel size operated at an extremely low-dose. Second, the study setting has eliminated false coincidences at high count rates. When count rates are high, coincidence pulses generated by two independent photons incident onto neighboring pixels may be mistreated as charge sharing and a count may be registered to a coincidence counter. This is called false coincidence and it would degrade the performance of MEICC and 1CC. Third, different baseline spectra such as kVp, filter, and attenuation may change nCRLB values, although it is expected that rank orders of PCDs will be consistent. One may wish to use other non-K-edge materials such as fat for the baseline spectrum. it is argued that any non-K-edge materials are covered by the water and bone used in this study. For example, using the material decomposition, the attenuation with fat at energy E is practically equivalent to a weighted summation of water and bone as µfat(E)»1.010

μWater(E)-0.044 μBone(E). Thus, the object with 10 cm of water and 1 cm of bone is nearly equivalent to a combination of xf cm of fat, (10-1.010 xf) cm of water, and (1+0.044 xf) cm of bone. Fourth, algorithms that use MEICC data and either correct or compensate for the charge sharing effect need to be developed and assessed.

The use of boxcar signals allows for the performance assessment of various PCDs for high spatial frequency tasks with consistent signals regardless of the presence or absence of charge sharing between adjacent PCD pixels. The spectral charge sharing information MEICC records decreases the nCRLB significantly and makes PCDs with MEICC a halfway between the current PCD and the CS-free PCD for a given pixel size. MEICC with 225-μm PCD is found either comparable to or close to the current 450-μm PCD for various spectral tasks. A combination of flat-field signals and N'N super-pixels must be used for low spatial frequency tasks; and N needs to be as large as or larger than 25 in order to approximate the zero-frequency DQE.

This section presents an assessment of the performance of PCDs with MEICC at the presence of both CS and PP using computer simulations is presented below. An in-house Monte Carlo program was modified to incorporate the following four temporal elements: (1) A pulse shape with a pulse duration of 20 ns, (2) delays of up to 10 ns in anode arrival times when photons were incident on pixel boundaries, (3) offsets proportional to a vertical separation between the primary and secondary charge clouds at the rate of ±4 ns per±100 μm, and (4) a stochastic fluctuation of anode arrival times for all of the charge clouds with a standard deviation of 2 ns. The performance of five PCDs, (a)-(f), were assessed for three spectral tasks, (A)-(C): (a) The conventional PCD, (b) a PCD with MEICC, (c) a PCD with one coincidence counter (1CC), (d) a PCD with a 3×3 analog charge summing scheme (ACS), and (e) a PCD with a 3×3 digital count summing scheme (DCS); (A) conventional CT imaging with water, (B) water-bone material decomposition, and (C) K edge imaging with tungsten. The tube current was changed from 1 mA to 1,000 mA and the nCRLB was assessed.

The recorded count rate curves were fitted by the non-paralyzable detection model with the effective deadtime parameter. The best fit was achieved by 25.8 ns for the conventional PCD, 18.6 ns for MEICC and 1CC, 140.5 ns for ACS, and 209.0 ns for DCS. The nCRLBs were strongly dependent on count rates. MEICC provided the best nCRLBs for all of the imaging tasks over the count rate range investigated except for a few conditions such as K-edge imaging at 1 mA. PP decreased the merit of MEICC over the conventional PCD in addressing CS. Nonetheless, MEICC consistently provided better nCRLBs than the conventional PCD did. For K-edge imaging, nCRLBs of MEICC were in the range of 55-82% of those of the conventional PCD. ACS provided better nCRLBs than the conventional PCD did only when the counting efficiency of ACS was higher than 0.95 (i.e., the tube current of up to 10 mA) for the conventional CT imaging, 0.84 (up to 40 mA) for the water-bone material decomposition, and 0.79 (up to 59 mA) for the K-edge imaging. Besides a few cases, MEICC provides the best nCRLBs for all of the tasks at all of the count rates. ACS and DCS provides better nCRLBs than the conventional PCD does only when count rates are very low.

MEICC: MEICC comprises two parts, as shown in FIG. 3-FIG. 5, the primary counting part with $N_C$ counters and the coincidence processing part with $N_C \times N_C$ coincidence counters. The primary counting part used a direct windowing scheme as follows (see also FIG. 19). An up-crossing of energy threshold j changed the status of the window j to 1 ($s_{wj} \rightarrow 1$) and started a timer for the window, $t_{wj}$. When the timer $t_{wj}$ reached a pre-set time $T_W$, either of the following process took place. If the upper threshold's status $s_{wj+1}$ was also 1, it reset the status to 0 and did nothing (as the pulse peak was above this energy window). If the status $s_{wj+1}$ was 0 (thus, the pulse peak belonged to this window), it added a count to the primary counter $C_j$, sent the counting signal to eight neighboring pixels, reset the status $s_{Wj}$, set the status $s_{MAj}$ to 1, and started a timer for the coincidence process for window j, $t_{MAj}$, and waited for the next counting event.

Figure 19:
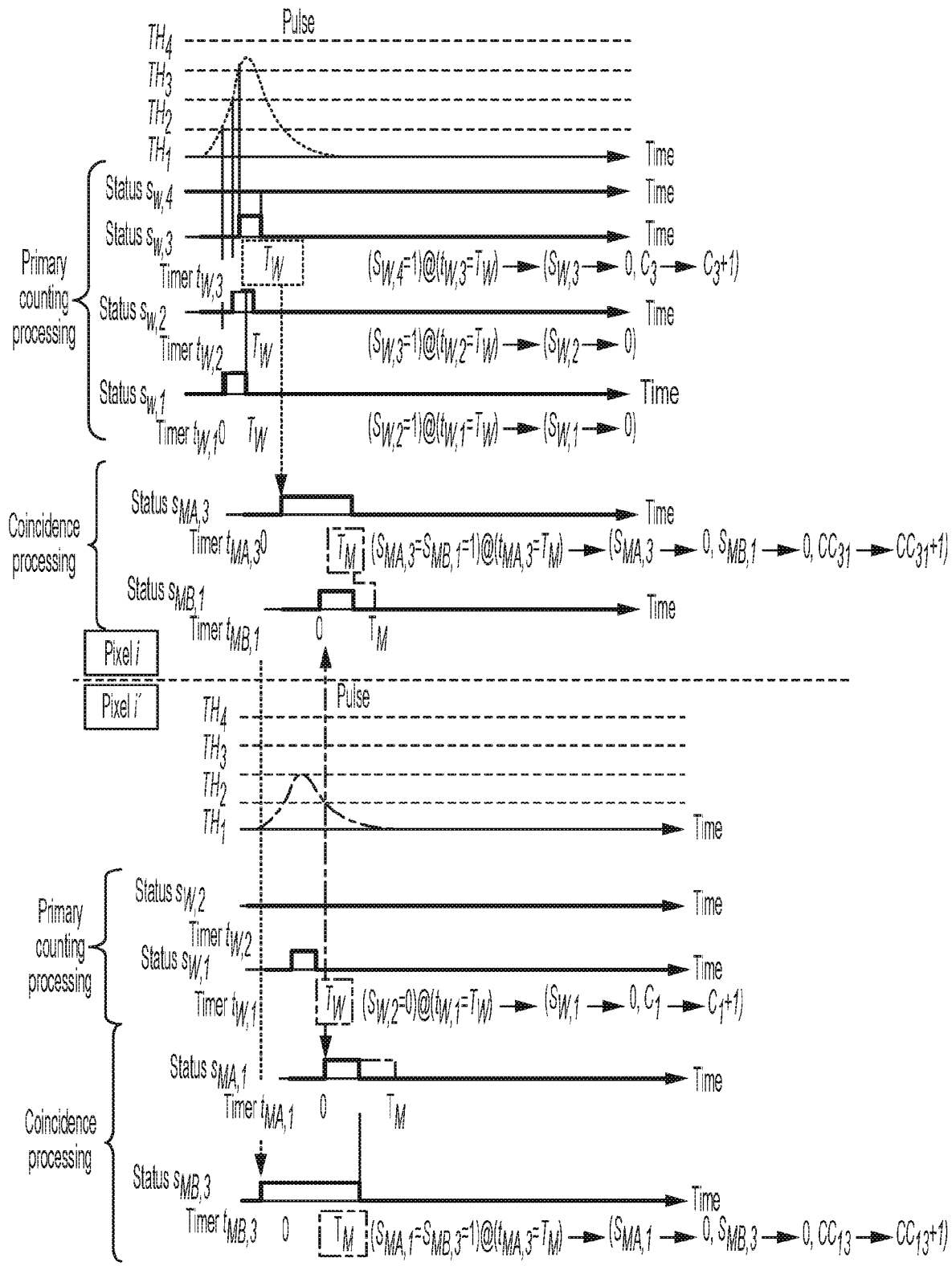
FIG. 19 shows a timing chart for the primary counting processing and coincidence processing for MEICC. In this example, pixel i adds a count at the primary counter of window 3, $C_3$, pixel i' adds a count at window 1, $C_1$, and the counting signals are sent to each other. The coincidence processing is performed at both of the pixels independently and one coincidence count each is added to a coincidence counter $CC_{31}$ at pixel i and $CC_{13}$ at pixel.

FIG. 19 shows a timing chart for the primary counting processing and coincidence processing for MEICC. In this example, pixel i adds a count at the primary counter of window 3, $C_3$, pixel i' adds a count at window 1, $C_1$, and the counting signals are sent to each other (by the arrow 1004 and arrow 1002, respectively). The coincidence processing is performed at both of the pixels independently and one coincidence count each is added to a coincidence counter $CC_{31}$ at pixel i and $CC_{13}$ at pixel.

The coincidence processing part functioned as follows (see FIG. 19). When a counting signal for energy window J came from one of eight neighbors, and if the status of the coincidence process $s_{MBj}$ was 0, it changed the status to 1 and started a timer $t_{MBJ}$. When either $t_{MAj}$ or $t_{MBJ}$ reached a preset time $T_M$, if both $s_{MAj}$ and $s_{MBJ}$ were 1, it added a count to the corresponding coincidence counter, $CC_{j,J}$, reset the status $s_{MAj}$ and $s_{MBJ}$ at the next time tick, and waited for the next coincidence event.

1CC: Similar to MEICC, 1CC comprises two parts. The primary counting part was the direct windowing with $N_C$ counters as outlined above. It sent an up-crossing signal of the lowest energy threshold to eight neighboring pixels, set the status $s_{1A}$ to 1, and started a timer for the coincidence process, $t_{1A}$, and waited for the next counting event.

The coincidence processing part with one coincidence counter functioned as follows. When an up-crossing signal (for the lowest energy threshold) came from one of eight neighbors, and if the status of the coincidence process $S_{1B}$ was 0, it changed the status to 1 and started a timer $t_{1B}$. When either $t_{1A}$ or $t_{1B}$ reached a preset time $T_1$, if both $S_{1A}$ and $S_{1B}$ were 1, it added a count to the coincidence counter, CC, reset the status $s_{1A}$ and $S_{1B}$ at the next time tick, and waited for the next coincidence event.

FIG. 20A, FIG. 20B, FIG. 20C, FIG. 20D, FIG. 20E, FIG. 20F, FIG. 20G, and FIG. 20H show the event processing schemes for ACS (FIG. 20A-FIG. 20D) and DCS (FIG. 20E-FIG. 20H). In this example, the PCD had four energy thresholds at 20, 45, 70, and 95 keV, which made the effective energies for four windows 32.5, 57.5, 82.5, and 107.5 keV. An incident photon carrying 80 keV was incident on the boundary of pixels 2 and 5. For ACS, the largest energy recorded above the lowest threshold 20 keV during the event processing time $T_A$ was 38 keV at pixel 2 and 42 keV at pixel 5 (FIG. 20B). The 2×2 super-pixel energy was 80 keV for both k=1 and 2, 42 keV for both k=3 and 4 (FIG. 20C). The winner super-pixel was k=1, the winner pixel was pixel 5, and the winner window was 3 that corresponded to the energy of super-pixel k=1, 80 keV (FIG. 20D). For DCS, the energy window that gained a count during the event processing time $T_D$ was window 2 at both pixel 2 and pixel 5 (FIG. 20F). The 2×2 super-pixel energy was 65 keV (=32.5+32.5 keV) for both k=1 and 2, 32.5 keV for both k=3 and 4 (FIG. 20G). The winner super-pixel was k=1, the winner pixel was pixel 2 (instead of pixel 5), and the winner window was window 2 (instead of window 3) that corresponded to the energy of super-pixel k=1, 65 keV (FIG. 20H). A random number was used for a tie-breaker.

ACS: A straightforward 3×3-pixel ACS scheme was used, which functioned as follows (see also FIG. 20A-FIG. 20D). An up-crossing event of the lowest threshold of a pixel i (pixel 5 in FIG. 20A) triggered the following process if its counting status, $S_{Ai}$, was 0. Up-crossing events were ignored if $S_{Ai}$=1. It changed the status of all of the 3×3 pixels centering at the pixel i to 1 and started a timer $t_{Ai}$. If pixel i' was already in the counting state ($s_{Ai}'$=1), pixel i' and the 2×2 super-pixels that included pixel i' were excluded from this event. For each of the 3×3 pixels included, it started recording the largest energy of the pulse train above the lowest threshold energy (FIG. 20B). When the timer $t_A$; reaches a preset time $T_A$, it computed a sum of the energies for each of four 2×2 super-pixels (FIG. 20C). It then selected the winner super-pixel with the largest summed energy, selected the winner pixel with the largest deposited energy (FIG. 20D), and added a count to an energy window that corresponded to the energy of the winner super-pixel. Finally, it reset the status of the counting process of all of the 3×3 pixels included and waited for the next event. In an example presented in FIG. 20A-20H, the incident energy of 80 keV was correctly reconstructed and one count was correctly added to the energy window 3 of pixel 2. A tie between super-pixels did not affect the final winners; and a tie in deposited energies did not occur because they were continuous analog signals.

DCS: A straightforward 3×3-pixel DCS scheme was used, which functioned as follows (see also FIG. 20E-FIG. 20H). Up-crossing the lowest threshold of the pixel i (pixel 5 in FIG. 20E) triggered the following process if its counting status, $s_{Di}$, was 0. Up-crossing events were ignored if $s_{Di}$=1. It changed the status of all of the 3×3 pixels centering at the pixel i to 1 and started a timer $t_{Di}$. If pixel i' was already in the counting state ($s_{Di}'$=1), pixel i' and the 2×2 super-pixels that included pixel i' were excluded from this event. For each of the 3×3 pixels included, it started recording the energy window j that gained a count with the direct windowing scheme outlined before (FIG. 20F). When the timer to; reached a preset time $T_D$, it selected the winner super-pixel which had the largest sum of the effective energies of the windows with a count, and selected the winner pixel with a count at the highest energy window among the 2×2 pixels (FIG. 20H). It then determined the winner energy window that corresponded to the sum of the effective energies, added a count, reset the status for all of the included pixels, and waited for the next event. Here, the effective energy of the window is defined as the mean of the two boundary energies. A random number was used for a tie-breaker. In an example presented in FIGS. 20A-20H, the winner pixel was pixel 2 instead of pixel 5, and a count was added to energy window 2 as the sum of the effective energies was 65 keV (=32.5+ 32.5), whereas the incident energy of 80 keV belonged to energy window 3.

The implementation methods outlined above seem the most straightforward and were chosen to study generic characteristics of the five PCDs. The present implementation of 1CC was different from Hsieh's, and it was chosen to assess the difference between 1CC and MEICC only due to the number of coincidence counters.

The Monte Carlo simulation program developed for the previous studies was used, which cascaded the following processes: (1) photon generations with randomized energies and time intervals for a Poisson distribution, (2) CS based on a randomized incident location and interaction and detection processes, (3) pulse train generations with electronic noise, (4) comparator detection signal generation with up-crossing events of energy thresholds. Photon generations and the detection processes were performed for each of 7×7 PCD pixels in parallel. The time tick of pulse trains was 1 ns.

The following four temporal elements were added for this study to the MC program and performed between processes (2) and (3) discussed above. The first element was a finite pulse shape. A slightly asymmetric monopolar pulse shape with a pulse duration of 20 ns at the full-width-at-tenth-maximum was created by connecting two normalized Gaussian functions at the peak; the Gaussian parameters (i.e., the standard deviations) were 3.84 ns for the rising part of the pulse and 5.48 ns for the falling part. The second element was a pixel boundary effect. An electric charge cloud generated near the pixel boundaries traveled a longer distance to the anode than the one generated near the pixel center did; therefore, when the two clouds were generated simultaneously, the former cloud arrived at the anode after the latter one did. This location-dependent delay of up to 10 ns at the pixel boundaries (see FIG. 4) was added to the anode arrival times. The third element was a vertical separation of two charge clouds. When a fluorescent x-ray was emitted and absorbed by a PCD pixel, the primary and secondary charge clouds arrived at the anodes at slightly offset times. The offset was proportional to the vertical separation between the two clouds at a rate of ±4 ns per ±100 μm. The fourth element was a stochastic fluctuation of anode arrival times for all of the charge clouds, which was realized by a zero-mean Gaussian distribution with a standard deviation of 2 ns.

Figure 21:
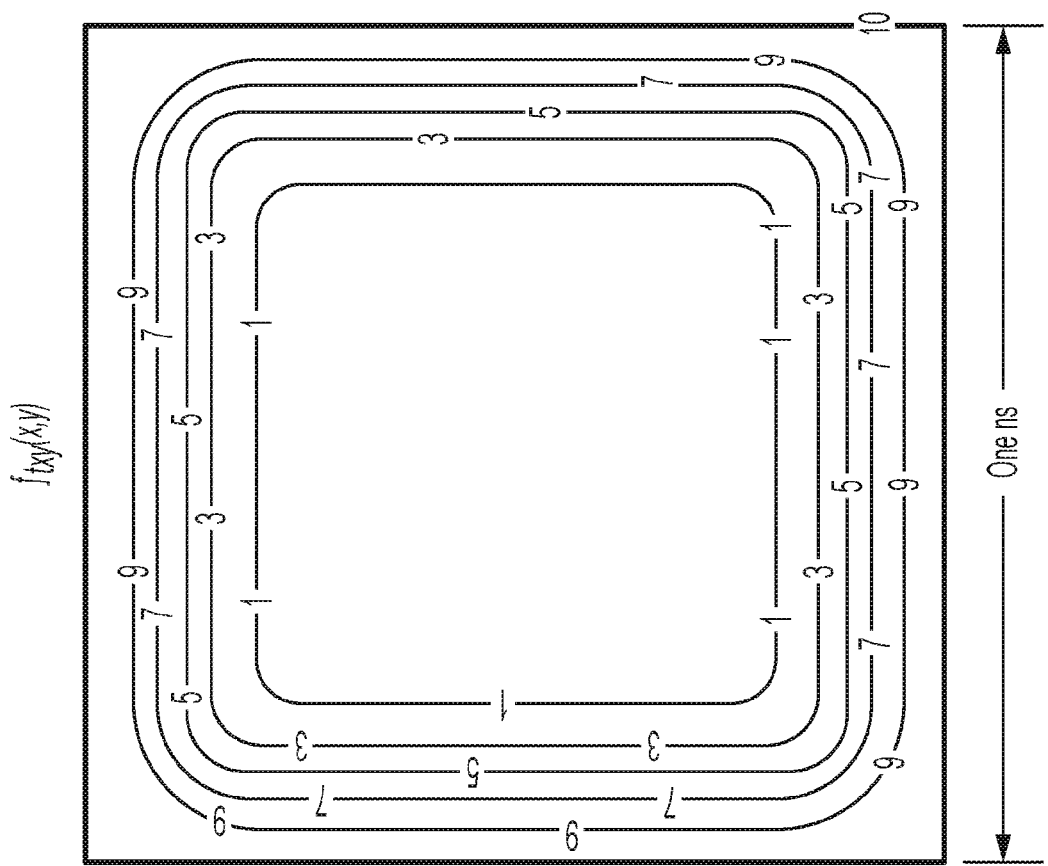
FIG. 21 shows a contour plot of the pixel boundary effect, i.e., the delay of anode arrival times (ns), up to 10 ns toward the boundaries of pixels.

FIG. 21 shows a contour plot of the pixel boundary effect, i.e., the delay of anode arrival times (ns), up to 10 ns toward the boundaries of pixels. It is believed that the parameters for these temporal elements were reasonable choices based on the experiences as explained in the following. The peaking time (which is about a half of the pulse duration) of various PCDs currently known are in the range of 8-1,000 ns; thus, the pulse duration of 20 ns is at a lower end of the available PCDs. The pixel boundary delay of PCDs may depend on various factors such as the uniformity of the electric field strengths and the variation of travel lengths, which can be summarized as the small pixel effect. The maximum delay of 10 ns was determined based on a preliminary study. When the delay parameter was larger than 10 ns, the monoenergetic x-ray responses had unusually higher K-escape peak and fluorescence peaks. It is believed that detector physicists will design the detector to minimize the pixel boundary effect and a half of the pulse duration simulated in this study might be an upper-end for well-designed PCDs. The effect of vertical separation depends on the electric field strength and the mobility of electron in detector materials; and 4 ns for 100 μm separation seemed reasonable for ~500 V/mm bias.

The following settings were used unless otherwise specified. A 140 kVp x-ray spectrum using TASMIP/spektr operated at various tube current values from 1 mA to 1,000 mA was generated, which corresponded to the incident count rates of $4.1 \times 10^4$-$4.1 \times 10^7$ cps/pixel or $9.6 \times 10^5$-$9.6 \times 10^8$ cps/mm². A cadmium telluride PCD had 7×7 pixels with a pixel size of $(225 \mu m)^2$, a thickness of 1.6 mm, and four thresholds ($N_C$=4) set at (20, 45, 70, and 95 keV). A preliminary study was conducted to confirm that they were close to the optimal threshold energies for various count rates and different tasks. A time duration per reading was varied to make the tube current-time product per reading constant at $2 \times 10^{-2}$ mAs (e.g., 200 μs for 100 mA), which made the expected number of incident photons independent of tube current values, which, in turn, resulted in consistent accuracy in the use of multivariate normal distribution for computing the Fisher information matrix. The electronic noise added to the pulse train had a standard deviation of 2.0 keV.

The time window parameters outlined were set as follows. $T_W$ for direct windowing used for MEICC, 1CC, and DCS was set at 10 ns, which was a half of the pulse duration (20 ns). The default value of $T_M$, $T_1$, $T_A$, and $T_D$ were determined by the assessment of the spectral responses and were set at 20 ns. The effect of different values for $T_M$, $T_1$, $T_A$, and $T_D$ was also assessed.

The spectral responses are now discussed. The spectral responses of ACS, DCS, and the conventional PCD were assessed using flat-field monoenergetic x-rays at 80 keV incident onto 7×7 PCD pixels. The incident x-rays were at three different count rates that were comparable to those at 1 mA, 10 mA, and 100 mA with a "baseline spectrum" (outlined in Sec. 2.E). Two hundred energy windows with a width of 2 keV were used. The measurements were repeated 100 times and the mean counts were obtained. $T_A$ and $T_D$ values examined for ACS and DCS, respectively, were 5, 10, 20, and 30 ns.

The counting capabilities are now discuss. The counting capability of PCDs was assessed by count rate curves (CRCs) using the baseline data with tube current values changing from 1 mA to 1,000 mA, which corresponded to the incident count rates of $4.1 \times 10^4$-$4.1 \times 10^7$ cps/pixel or $9.6 \times 10^5$-$9.6 \times 10^8$ cps/mm². All of the PCDs had four thresholds ($N_C$=4) at (20, 45, 70, and 95 keV) and a sum of the outputs of the four windows was computed. For both MEICC and 1CC, two total counts were computed, one for a sum of all of the primary counters outputs and the other for a sum of all of the coincidence counters output. The measurements were repeated 472-1,100 times for each tube current setting and the mean and the standard deviation of the total counts were computed. The default value of $T_M$, $T_1$, $T_A$, and $T_D$ was 20 ns, but other values, i.e., 5, 10, 30, and 100 ns, were also used for $T_M$ and $T_1$.

The imaging-task performances are now discussed. The performance of PCDs was assessed for the following three imaging-tasks: the conventional CT imaging with water thickness estimation, water thickness estimation as a part of water-bone material decomposition, and K-edge imaging with tungsten as a part of water-bone-tungsten material decomposition. Tungsten was chosen because it has the K-edge in the energy range (60-90 keV) where many x-ray photons are present. There are three elements one needs to consider when assessing the performance of PCDs: input signals, a data acquisition scheme, and a data analysis method. A combined use of boxcar signals, single-pixel measurements, and Cramer-Rao lower bound (CRLB) was chosen. The previous study[38] has shown that this combination takes into account the effect of CS and assesses a high spatial resolution performance of PCDs. Below, all of the three elements are outlined concisely, while providing more detail for the first two elements in the discussion below.

Single-pixel measurements with the boxcar signals were used to assess a high spatial resolution performance at consistent signals regardless of the presence or absence of CS. The baseline data was generated with the baseline spectrum, which was synthesized by attenuating the 140 kVp spectrum by 5 cm of water, incident onto the 7×7 PCD pixels. The target data were synthesized by changing the spectrum onto the central pixel only by attenuating the baseline spectrum further by a small amount of either water (0.1 cm), bone ($5.0 \times 10^{-2}$ cm), or tungsten ($2.0 \times 10^{-4}$ cm), whereas the spectrum onto the other pixels remained unchanged. Flat-field signals with single-pixel measurements were not used because they would provide an unfair advantage to PCDs with CS: Such PCDs would collect more signals from neighboring pixels via CS, and therefore, it would be not suitable for this study. A low spatial resolution task can be assessed by flat-field signals with N×N super-pixel measurements (i.e., a sum of N×N pixels' outputs to synthesize one large pixel); however, the previous study showed that a large number of pixels (at least 25×25 pixels in some cases) would be necessary to approximate a detective quantum efficiency at zero frequency, DQE(0). In addition, the rank order of different PCDs' performances for a low resolution task was consistent with that for a high resolution task.

PCDs had four thresholds ($N_C$=4) at (20, 45, 70, and 95 keV) and tube current values ranged from 1 mA to 1,000 mA, which corresponded to the incident count rates of $4.1 \times 10^4$-$4.1 \times 10^7$ cps/pixel or $9.6 \times 10^5$-$9.6 \times 10^8$ cps/mm². The scans were repeated 328-1,200 times for each condition. The mean and covariance of PCD data over noise realizations were calculated, and using them, the Fisher information matrix was computed numerically. It is assumed that the noise was multivariate normally distributed and that the covariance remained unchanged between the baseline and target data. It is believed that the use of the multivariate normal distribution was justified because the mean detected counts was larger than 30 in most cases and PP made the data non-Poisson-distributed. Data from different energy windows were negatively correlated and the variance of data was larger or smaller than the mean, depending on energy windows. The output of the central one pixel was analyzed. The number of entries for the mean vector was $N_C$ for the conventional PCD, ACS, and DCS, $N_C$+1 for 1CC, and $N_C+N_C^2$ for MEICC. Fisher information matrix was 1×1 for the conventional CT imaging, 2×2 for water-bone material decomposition, and 3×3 for K-edge imaging.

The inverse of the Fisher information matrix was computed and the CRLBs of the basis functions were the corresponding diagonal element of the inverse matrix. CRLBs were then normalized by that of the conventional PCD at 1 mA for each spectral task and were called nCRLBs in this study. The coincidence processing parameter values used were 5, 10, 20, 30, and 100 ns for all of $T_M$, $T_1$, $T_A$, and $T_D$ and 20, 50, 100, 150, and 200 ns for ACS. The default value was 20 ns for all of the four PCDs.

Bootstrap resampling was performed 2,000 times for each PCD data for each condition and the above process was performed for each Bootstrap resample, producing 2,000 nCRLB values. The standard deviation of nCRLB was then computed over 2,000 nCRLB values.

The spectral response results are now discussed. FIG. 22A, FIG. 22B, FIG. 22C, FIG. 22D, and FIG. 22E show spectra recorded by ACS, DCS, and the conventional PCD with 2-keV-width energy windows and the monoenergetic x-rays at 80 keV incident onto PCDs. (FIG. 22A) ACS with various $T_A$'s at 1 mA; (FIG. 22B) DCS with various $T_D$'s at 1 mA; (FIG. 22C-FIG. 22E) ACS with $T_A$=20 ns, DCS with $T_D$=20 ns, and the conventional PCD at 1 mA (FIG. 22C), 10 mA (FIG. 22D), and 100 mA (FIG. 22E).

Figure 22A:
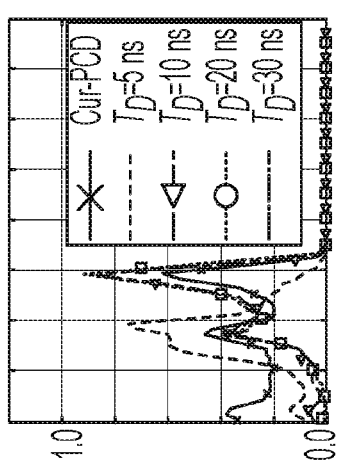
FIG. 22A, FIG. 22B, FIG. 22C, FIG. 22D, and FIG. 22E show spectra recorded by ACS, DCS, and the conventional PCD with 2-keV-width energy windows and the monoenergetic x-rays at 80 keV incident onto PCDs.
Figure 22C:
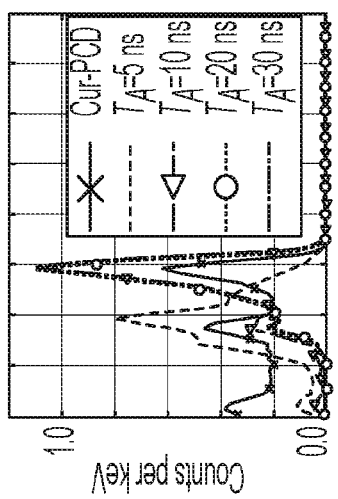
Figure 22B:
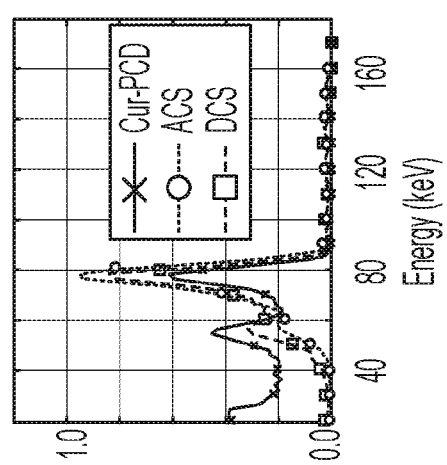
Figure 22D:
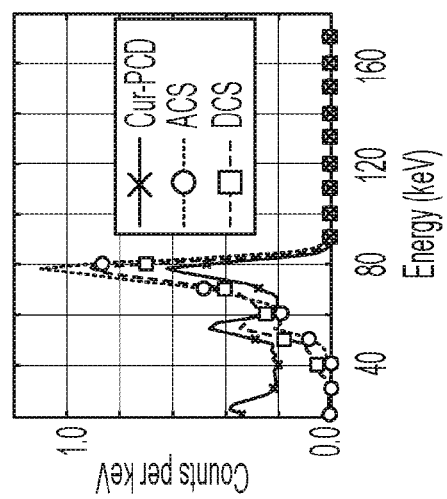
Figure 22E:
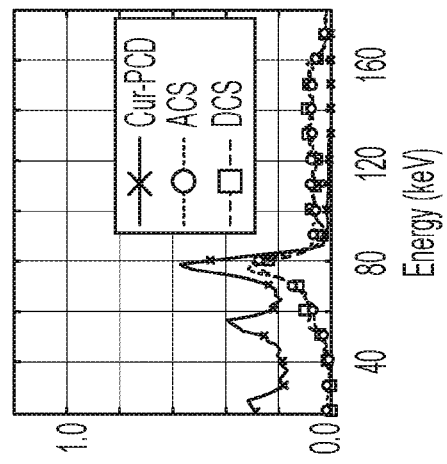

FIG. 22A and FIG. 22B show plots of spectra of ACS and DCS, respectively, at 1 mA with various $T_A$ and $T_D$ parameter values, respectively. This count rate was extremely low such that practically there was no PP. It can be seen the spectrum with $T_A$=5 ns was distorted severely, with a very high and broad K-escape peak at ~60 keV, a fluorescence peak at ≅keV, and only few counts at the photo-peak at 80 keV. It demonstrated that the coincidence processing window of $T_A=5$ ns was too narrow to re-combine multiple pulses at offset times due to the pixel boundary effect and a vertical separation between the primary and secondary charge clouds. The spectrum with $T_A=10$ ns showed the same effects as $T_A=5$ ns albeit at a reduced magnitude; the spectra with $T_A=20$ ns and 30 ns appeared identical and free from these issues, with a sharp photo-peak, a low K-escape peak, and no counts below 40 keV. The DCS spectra with various $T_D$ parameters had the same results (FIG. 22B) as ACS spectra. Therefore, it was concluded that the coincidence processing window width had to be at least 20 ns to overcome the CS with the various timing offsets simulated in this study. The default value for $T_A$ for ACS, $T_D$ for DCS, $T_M$ for MEICC, and $T_1$ for 1CC was set at 20 ns for the reminder of the study.

FIG. 22A-FIG. 22E shows plots of spectra recorded by ACS, DCS, and the conventional PCD with 2-keV-width energy windows and the monoenergetic x-rays at 80 keV incident onto PCDs. (FIG. 22A) ACS with various $T_A$'s at 1 mA; (FIG. 22B) DCS with various $T_D$'s at 1 mA; (FIG. 22C-FIG. 22E) ACS with $T_A=20$ ns, DCS with $T_D=20$ ns, and the conventional PCD at 1 mA (FIG. 22C), 10 mA (FIG. 22D), and 100 mA (FIG. 22E).

FIG. 22C presents 1 mA spectra recorded by the conventional PCD, ACS, and DCS. The spectrum of the conventional PCD was distorted due to CS with a low photo-peak, a high fluorescence peak, and a large continuum. The ACS accurately corrected for the spectral distortion caused by CS: the ACS spectrum presented a sharp photo-peak, a low K-escape peak, almost no continuum, and no fluorescence peak. The DCS spectra lay between those of ACS and the conventional PCD. If they had four energy windows with thresholds at (20, 45, 70, and 95 keV), the relative counts of the conventional PCD, ACS, and DCS were (0.33, 0.36, 0.31, 0.00), (0.00, 0.28, 0.71, 0.01) and (0.04, 0.42, 0.53, 0.01), respectively.

At 10 mA (FIG. 22D), the spectra of both ACS and DCS had slightly lower photo-peaks than at 1 mA. At 100 mA (FIG. 22E), the spectra of both ACS and DCS were severely distorted, with even lower photo-peaks and more counts for 90-160 keV. These changes were attributed to 'false coincidence,' where incidental quasi-coincident photons at neighboring pixels were falsely recognized as CS and their energies were added to produce a count at higher energies. The relative counts of the three PCDs at 100 mA were (0.30, 0.35, 0.32, 0.03) for the conventional PCD, (0.02, 0.13, 0.35, 0.50) for ACS, and (0.01, 0.17, 0.28, 0.53) for DCS. Both ACS and DCS showed the effect of significant spectral distortion, whereas the conventional PCD exhibited very little effect.

Figure 23B:
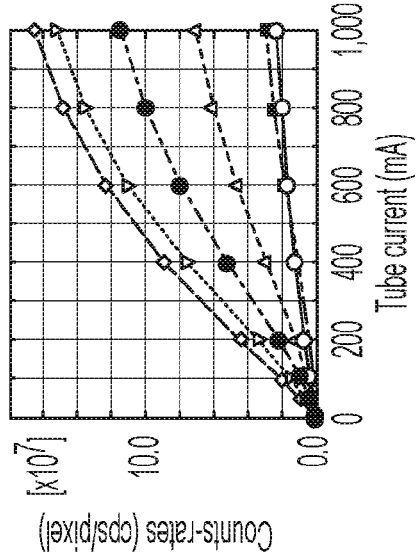
FIG. 23A, FIG. 23B, and FIG. 23C show plots of count rate curves (CRCs) of five PCDs (FIG. 23A), coincidence counters of MEICC with various coincidence processing time window parameters ($T_M$) (FIG. 23B), those of 1CC with various $T_1$'s (FIG. 23C). In (FIG. 23A), the CRC of 1CC was completely overlapped with that of MEICC.
Figure 23D:
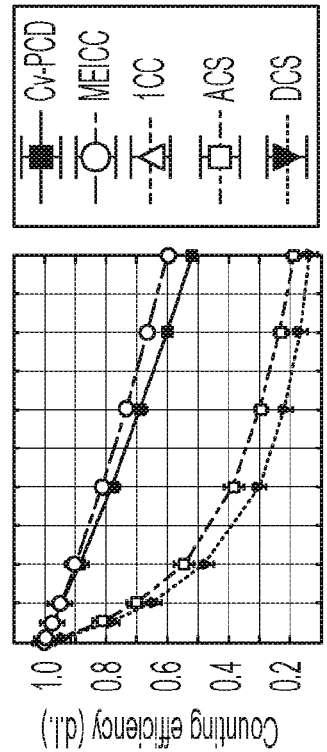
FIG. 23D shows a plot of the counting efficiency. The counting efficiency of 1CC were completely overlapped with those of MEICC. "Cv-PCD"=Conventional PCD. "Primary"=primary counters of MEICC and 1CC. Legends for (A,D) are presented in top-right; those for (FIG. 23B and FIG. 23C) in bottom-right. Error bars indicate the standard deviations over multiple noise realizations.
Figure 23A:
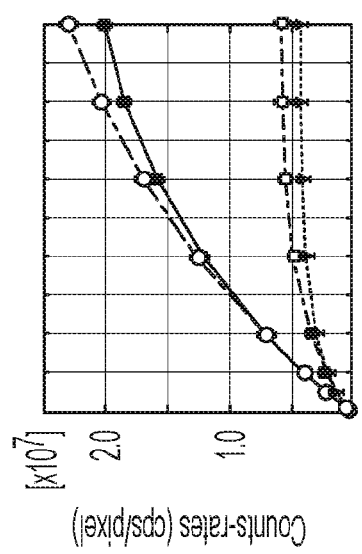
Figure 23C:
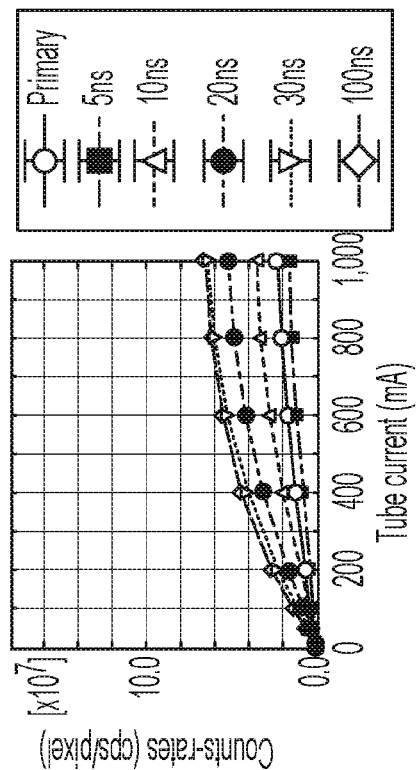

The counting capabilities are now discussed. FIG. 23A, FIG. 23B, and FIG. 23C show plots of count rate curves (CRCs) of five PCDs (FIG. 23A), coincidence counters of MEICC with various coincidence processing time window parameters ($T_M$) (FIG. 23B), those of 1CC with various $T_1$'s (FIG. 23C). In (FIG. 23A), the CRC of 1CC was completely overlapped with that of MEICC. FIG. 23D shows a plot of the counting efficiency. The counting efficiency of 1CC were completely overlapped with those of MEICC. "Cv-PCD"=Conventional PCD. "Primary"=primary counters of MEICC and 1CC. Legends for (A,D) are presented in top-right; those for (FIG. 23B and FIG. 23C) in bottom-right. Error bars indicate the standard deviations over multiple noise realizations.

At 1 mA, the total counts recorded relative to the conventional PCD were 1.00 for the primary counters of both MEICC and 1CC, 0.78 for ACS, and 0.79 for DCS. Both ACS and DCS had fewer counts than the conventional PCD because they successfully moved counts that came from neighboring pixels via CS back to the original pixels. FIG. 23A presents the CRCs of the primary counters. All of the CRCs increased monotonically with increasing the tube current values and appeared to have characteristics of the non-paralyzable detection model. The effective deadtime was estimated as 25.8 ns for the conventional PCD, 18.6 ns for both MEICC and 1CC, 140.5 ns for ACS, and 209.0 ns for DCS. The changes from the conventional PCD to ACS and DCS were a factor of 5.4 and 8.1, respectively, which must be attributed to the effective pixel area for ACS and DCS being 9 (=3×3) times as large as the original pixel area due to the 3×3-pixel coincidence processing. DCS was slower than ACS and it might be because DCS used the direct windowing scheme and a digital signal processing with tie-breakers, whereas ACS used an up-crossing of the lowest threshold for the event detection and analog signal processing. An inverse of the effective deadtime is called the characteristic count rates, and they were $3.9 \times 10^7$ cps/pixel for the conventional PCD, $5.4 \times 10^7$ cps/pixel for both MEICC and 1CC, $7.1 \times 10^6$ cps/pixel for ACS, and $4.8 \times 10^6$ cps/pixel for DCS. The output counts of MEICC and 1CC at higher count rates were up to 14% higher than that of the conventional PCD's. The reason for these increases at higher count rates is not clear at this moment, although it must be related to the difference between the direct windowing scheme (used for the primary counters of MEICC and 1CC) and the simple pulse height analyzer (used for the conventional PCD).

The total counts at 1 mA recorded by the coincidence counters for both MEICC and 1CC relative to the conventional PCD were 0.28, 0.64, 1.04, 1.45, and 1.88 for $T_M=5$, 10, 20, 30, and 100 ns, respectively, which indicated that larger coincidence processing window had more false coincidence events. FIG. 23B and FIG. 23C show the CRCs of coincidence counters of MEICC and 1CC, respectively, with $T_M=5$, 10, 20, 30, and 100 ns. The CRCs of the primary counters of MEICC and 1CC were also presented. All of CRCs with $T_M \geq 10$ ns were above the CRCs of the primary counters and larger $T_M$ produced a larger CRC. The latter was because at higher count rates, more photons incidentally arrived at neighboring pixels within a larger coincidence processing window and were falsely treated as CS events. The CRCs of MEICC coincidence counters were above the CRCs of 1CC coincidence counter and it was believed that it was attributed to the present implementation of MEICC and 1CC. MEICC had a coincidence timer $t_{MAj}$ and the corresponding status $S_{MAj}$ for each energy window, which only handled events within the energy window j. In contrast, 1CC had a timer $t_{1A}$ and the corresponding status $S_{1A}$ for the lowest energy threshold, which handled the events for all of the windows. Consequently, the status $s_{1A}$ for 1CC was more frequently in a coincidence processing state than the status $S_{MAj}$ for MEICC was. Thus, the coincidence counters of MEICC had an ability to record more counts in total.

FIG. 23A-FIG. 23C show plots of count rate curves (CRCs) of five PCDs (FIG. 23A), coincidence counters of MEICC with various coincidence processing time window parameters ($T_M$) (FIG. 23B), those of 1CC with various $T_1$'s (FIG. 23C). In FIG. 23A, the CRC of 1CC was completely overlapped with that of MEICC. FIG. 23D shows a plot of the counting efficiency. The counting efficiency of 1CC were completely overlapped with those of MEICC. "Cv-PCD"=Conventional PCD. "Primary"=primary counters of MEICC and 1CC. Legends for (FIG. 23A and FIG. 23D) are presented in top-right; those for (FIG. 23B and FIG. 23C) in bottom-right. Error bars indicate the standard deviations over multiple noise realizations.

FIG. 23D shows a plot of the recorded counts per reading at various tube current conditions divided by those at 1 mA, which is called the counting efficiency in the following. The effective counting capability of both ACS and DCS was significantly lower than that of the other PCDs: The counting efficiency at 100 mA was 0.69 for ACS, 0.65 for DCS, and >0.94 for the other three PCDs. The tube current value that corresponded to the counting efficiency of 0.70 was 96 mA for ACS, 83 mA for DCS, 577 mA for the conventional PCD, and 690 mA for both MEICC and 1CC. The changes were a factor of 6.0 between ACS and the conventional PCD, and a factor of 7.0 between DCS and the conventional PCD. Performing the same analysis for the counting efficiency of 0.90, the changes were a factor of 6.9 between ACS and the conventional PCD, and a factor of 7.8 between DCS and the conventional PCD.

The imaging task performances are now discussed. FIG. 24A, FIG. 24B, FIG. 24C, FIG. 24D, FIG. 24E, and FIG. 24F show plots of the nCRLBs for the conventional CT imaging (FIG. 24A and FIG. 24B), the water-bone material decomposition (FIG. 24C and FIG. 24D), and K-edge imaging (FIG. 24E and FIG. 24F), plotted over a larger range (FIG. 24A, FIG. 24C, FIG. 24E) or a narrower range (FIG. 24B, FIG. 24D, FIG. 24F) of tube current values. For (FIG. 24B, FIG. 24D, FIG. 24F), markers were placed at slightly horizontally shifted locations for better visibility. Error bars indicate the standard deviations over 2,000 Bootstrap re-samples. "Cv-PCD"=Conventional PCD.

FIG. 24A, FIG. 24B, and Table 13 show nCRLBs of the five PCDs for the conventional CT imaging task. At 1 mA, MEICC and ACS provided the best nCRLB followed by 1CC, DCS, and the conventional PCD. The rank order of MEICC, 1CC, and the conventional PCD was consistent with the previous study without PP, because CS was the dominant cause of spectral distortion at 1 mA. Notice, however, that the differences between PCDs were comparable to or less than the standard deviations of nCRLBs. Thus, the differences at 1 mA may not be statistically significant. Throughout the count rate range investigated, nCRLBs of MEICC, 1CC, and the conventional PCD remained low and less than 1.6. MEICC provided the best nCRLBs among the five PCDs studied over the entire count rate range investigated. In contrast, the nCRLB of ACS was comparable to that of the conventional PCD at 10 mA (when the counting efficiency was 0.95) and significantly larger for >10 mA.

FIG. 24C, FIG. 24D and Table 14 present nCRLBs for the water-bone material decomposition task. At 1 mA, nCRLBs of all of MEICC, 1CC, ACS, and DCS were in the range of 0.47-0.60 and significantly better than the conventional PCD at 1.0. At and above 40 mA (when the counting efficiency for ACS was at 0.84 or lower), however, nCRLBs of ACS was larger than those of the conventional PCD and rapidly increased with increasing the count rates. The speed of the degradation was faster with water-bone material decomposition than with the conventional CT imaging. In contrast, MEICC had consistently lower nCRLBs than the conventional PCD and the best nCRLBs among the five PCDs, although the nCRLBs of MEICC relative to those of the conventional PCD at the corresponding tube current values generally increased from 0.47 at 1 mA to 0.80 (=1.73/2.15) at 800 mA. The nCRLB of ACS at 1 mA was larger than that of MEICC due to the stochastic nature; neither superiority nor equivalency could be declared due to insufficient statistical power.

FIG. 24E, FIG. 24F, and Table 15 present nCRLBs for the K-edge imaging task. At 1 mA, ACS had the best nCRLB at 0.45, followed by MEICC at 0.63 and the other three PCDs at around 1. At both 10 mA and 50 mA, both MEICC and ACS had comparable nCRLBs; however, nCRLB of ACS became comparable to that of the conventional PCD at 59 mA (at the counting efficiency of 0.79 for ACS) and increased quickly afterwards. In contrast, nCRLBs of MEICC remained low in the range of 55-82% of those of the conventional PCD at the corresponding tube current conditions. The nCRLBs of 1CC were comparable to those of the conventional PCD, and it was consistent with the previous study.[31] The nCRLBs of DCS at 1 and 10 mA were comparable to the conventional PCD, although it was expected to be better. It is suspected that the random numbers used to determine the winner pixel and winner window for tie-breakers might have increased the uncertainty of the estimation, although it is just a speculation (the standard deviations of nCRLBs were as large as 0.42 at 1 mA and 0.39 at 10 mA; see Table 15).

The nCRLBs of both ACS and DCS increased quickly due to PP and severe effects of false coincidence (see FIG. 22E). As count rates increased, lower energy windows had fewer counts and eventually only the highest energy window had counts. With only one effective window, the estimation problems for the water-bone material decomposition and K-edge imaging became ill-posed and this was the reason why the nCRLBs increased rapidly.

Figure 25:
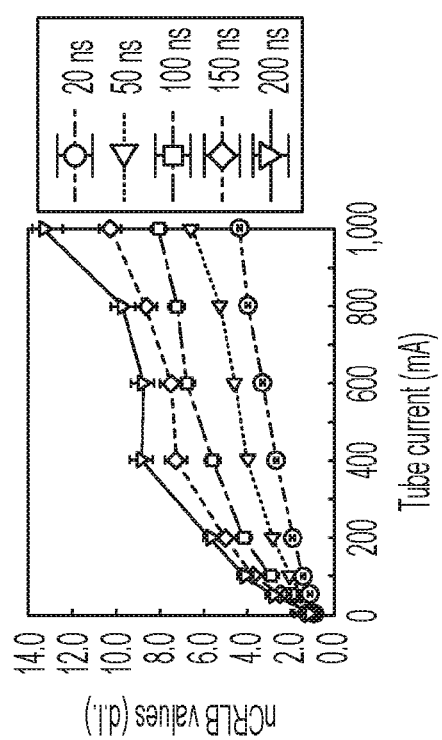
FIG. 25 shows plots for the nCRLBs of ACS with five different coincidence processing time window width ($T_A$) for the conventional CT. Error bars indicate the standard deviations over 2,000 Bootstrap re-samples.

FIG. 25 shows plots for the nCRLBs of ACS with five different coincidence processing time window width ($T_A$) for the conventional CT. Error bars indicate the standard deviations over 2,000 Bootstrap re-samples. As shown in FIG. 25, plots of nCRLB of ACS with different $T_A$ values for the conventional CT imaging are shown where ACS with a larger $T_A$ had a larger (i.e., worse) nCRLB and the effect of $T_A$ was quite significant. $T_A$=20 ns was sufficient to address CS with the temporal separations in anode arrival times and larger $T_A$'s simply degraded the performance. The MEICC with different $T_M$ values had similar effects; however, the differences were very small and MEICC with $T_M$=100 ns was still better than the conventional PCD.

TABLE 13 nCRLBs for the conventional CT imaging task

| | | Tube current (mA) | | | | | | | | |
|---|---|---|---|---|---|---|---|---|---|---|
| | | 1 | 10 | 50 | 100 | 200 | 400 | 600 | 800 | 1,000 |
| Incident count rate | (cps/mm$^2$) | 9.6 × 10$^5$ | 9.6 × 10$^6$ | 4.8 × 10$^7$ | 9.6 × 10$^7$ | 1.9 × 10$^8$ | 3.8 × 10$^8$ | 5.7 × 10$^8$ | 7.7 × 10$^8$ | 9.6 × 10$^8$ |
| | (cps/pixel) | 4.1 × 10$^4$ | 4.1 × 10$^5$ | 2.1 × 10$^6$ | 4.1 × 10$^6$ | 8.2 × 10$^6$ | 1.6 × 10$^7$ | 2.5 × 10$^7$ | 3.3 × 10$^7$ | 4.1 × 10$^7$ |
| Conventional | Mean | 1.00 | 0.98 | 0.98 | 1.05 | 1.12 | 1.20 | 1.28 | 1.30 | 1.54 |

TABLE 13-continued nCRLBs for the conventional CT imaging task

| | | Tube current (mA) | | | | | | | | |
|---|---|---|---|---|---|---|---|---|---|---|
| | | 1 | 10 | 50 | 100 | 200 | 400 | 600 | 800 | 1,000 |
| PCD | (St. dev) | (0.07) | (0.06) | (0.03) | (0.04) | (0.04) | (0.04) | (0.04) | (0.04) | (0.05) |
| MEICC | Mean | 0.90 | 0.91 | 0.93 | 1.01 | 1.07 | 1.16 | 1.24 | 1.20 | 1.42 |
| | (St. dev) | (0.06) | (0.05) | (0.03) | (0.04) | (0.04) | (0.04) | (0.04) | (0.04) | (0.05) |
| 1CC | Mean | 0.95 | 0.95 | 0.95 | 1.03 | 1.10 | 1.17 | 1.24 | 1.21 | 1.43 |
| | (St. dev) | (0.07) | (0.06) | (0.03) | (0.03) | (0.04) | (0.04) | (0.04) | (0.04) | (0.05) |
| ACS | Mean | 0.91 | 0.98 | 1.09 | 1.43 | 1.85 | 2.66 | 3.26 | 3.94 | 4.34 |
| | (St. dev) | (0.06) | (0.06) | (0.04) | (0.05) | (0.07) | (0.10) | (0.13) | (0.17) | (0.18) |
| DCS | Mean | 0.98 | 1.02 | 1.23 | 1.64 | 2.37 | 3.66 | 4.18 | 4.93 | 5.99 |
| | (St. dev) | (0.07) | (0.06) | (0.04) | (0.06) | (0.09) | (0.15) | (0.18) | (0.21) | (0.28) |

TABLE 14 nCRLBs for the water-bone material decomposition task

| | | Tube current (mA) | | | | | | | | |
|---|---|---|---|---|---|---|---|---|---|---|
| | | 1 | 10 | 50 | 100 | 200 | 400 | 600 | 800 | 1,000 |
| Incident count rate | (cps/mm$^2$) | $9.6 \times 10^5$ | $9.6 \times 10^6$ | $4.8 \times 10^7$ | $9.6 \times 10^7$ | $1.9 \times 10^8$ | $3.8 \times 10^8$ | $5.7 \times 10^8$ | $7.7 \times 10^8$ | $9.6 \times 10^8$ |
| | (cps/pixel) | $4.1 \times 10^4$ | $4.1 \times 10^5$ | $2.1 \times 10^6$ | $4.1 \times 10^6$ | $8.2 \times 10^5$ | $1.6 \times 10^7$ | $2.5 \times 10^7$ | $3.3 \times 10^7$ | $4.1 \times 10^7$ |
| Conventional PCD | Mean | 1.00 | 1.09 | 1.11 | 1.17 | 1.20 | 1.75 | 1.85 | 2.15 | 2.38 |
| | (St. dev) | (0.27) | (0.28) | (0.15) | (0.15) | (0.16) | (0.28) | (0.32) | (0.38) | (0.49) |
| MEICC | Mean | 0.47 | 0.56 | 0.86 | 1.02 | 0.90 | 1.52 | 1.45 | 1.73 | 2.19 |
| | (St. dev) | (0.07) | (0.08) | (0.09) | (0.11) | (0.10) | (0.21) | (0.20) | (0.23) | (0.34) |
| 1CC | Mean | 0.60 | 0.71 | 0.95 | 1.13 | 1.12 | 1.72 | 1.58 | 1.87 | 2.07 |
| | (St. dev) | (0.12) | (0.14) | (0.11) | (0.14) | (0.14) | (0.28) | (0.26) | (0.31) | (0.40) |
| ACS | Mean | 0.60 | 0.73 | 1.24 | 1.55 | 1.89 | 8.50 | 26.47 | 44.44 | 151.2 |
| | (St. dev) | (0.11) | (0.14) | (0.17) | (0.23) | (0.31) | (3.40) | (39.62) | (>100) | (>100) |
| DCS | Mean | 0.58 | 0.73 | 1.21 | 1.60 | 2.42 | 14.38 | 16.95 | 19.51 | 48.31 |
| | (St. dev) | (0.11) | (0.15) | (0.16) | (0.24) | (0.46) | (8.46) | (>100) | (20.45) | (80.11) |

TABLE 15 nCRLBs for the K-edge imaging task

| | | Tube current (mA) | | | | | | | | |
|---|---|---|---|---|---|---|---|---|---|---|
| | | 1 | 10 | 50 | 100 | 200 | 400 | 600 | 800 | 1,000 |
| Incident count rate | (cps/mm$^2$) | $9.6 \times 10^5$ | $9.6 \times 10^6$ | $4.8 \times 10^7$ | $9.6 \times 10^7$ | $1.9 \times 10^8$ | $3.8 \times 10^8$ | $5.7 \times 10^8$ | $7.7 \times 10^8$ | $9.6 \times 10^8$ |
| | (cps/pixel) | $4.1 \times 10^4$ | $4.1 \times 10^5$ | $2.1 \times 10^6$ | $4.1 \times 10^6$ | $8.2 \times 10^6$ | $1.6 \times 10^7$ | $2.5 \times 10^7$ | $3.3 \times 10^7$ | $4.1 \times 10^7$ |
| Conventional PCD | Mean | 1.00 | 1.00 | 1.20 | 0.97 | 2.45 | 2.84 | 3.24 | 5.40 | 5.69 |
| | (St. dev) | (0.32) | (0.29) | (0.24) | (0.17) | (0.82) | (1.01) | (1.08) | (2.96) | (2.93) |
| MEICC | Mean | 0.63 | 0.64 | 0.71 | 0.80 | 1.60 | 2.29 | 2.10 | 2.92 | 3.68 |
| | (St. dev) | (0.12) | (0.10) | (0.09) | (0.10) | (0.26) | (0.43) | (0.39) | (0.57) | (0.70) |
| 1CC | Mean | 0.99 | 0.99 | 1.20 | 0.98 | 2.35 | 2.97 | 2.94 | 5.27 | 5.39 |
| | (St. dev) | (0.32) | (0.29) | (0.22) | (0.16) | (0.76) | (1.08) | (0.95) | (2.75) | (2.27) |
| ACS | Mean | 0.45 | 0.59 | 0.77 | 2.87 | 13.14 | 27.93 | 53.66 | 261.5 | 901.6 |
| | (St. dev) | (0.13) | (0.13) | (0.11) | (0.86) | (23.78) | (>100) | (>100) | (>100) | (>100) |
| DCS | Mean | 0.94 | 1.08 | 1.56 | 3.92 | 19.43 | 38.99 | 112.7 | 385.0 | 208.5 |
| | (St. dev) | (0.42) | (0.39) | (0.35) | (1.44) | (>100) | (>100) | (>100) | (>100) | (>100) |

Among the five PCDs investigated, MEICC provided the best nCRLBs for all of the imaging tasks over the count rate range investigated except for a few conditions (e.g., K edge imaging at 1 mA, where ACS provided a better nCRLB). PP decreased the merit of MEICC in addressing CS. Nonetheless, MEICC consistently performed better than the conventional PCD did, albeit diminishing merit with increasing count rates. The nCRLBs of MEICC were in the range of 55-82% of those of the conventional PCD for K-edge imaging. At 1 mA, nCRLBs of MEICC were either comparable to or close to those of ACS and better than those of DCS. At higher count rates, MEICC had a significantly better performance than both ACS and DCS did, which was attributed to the following two reasons. One, the coincidence processing of MEICC did not interfere with the primary counting process; therefore, MEICC had a better counting capability than either ACS or DCS. Two, the inter-pixel communication of MEICC was a one-time one-way communication, whereas that of ACS and DCS was a continuous two-way communication over the coincidence processing time window. With MEICC, the communication was made to spread the counting signal from a pixel that detected an event to its neighboring pixels and these pixels acted independently afterwards. Both ACS and DCS in this study kept the communication open until both the winner pixel and the winner energy window were determined and a count was added. The communication was the key to address CS in real-time and output accurate counts; however, it significantly limited the count rate range within which the energy reconstruction functioned well.

It is believed that this is the first simulation study with the four temporal factors to assess the performances of ACS and DCS for specific imaging tasks. This study showed that both ACS and DCS performed poorly and worse than the conventional PCD did when count rates were higher and counting efficiency were lower than a certain value. The "break-even" points of the counting efficiency for ACS were 0.95 (at 10 mA) for the conventional CT imaging task, 0.84 (at 40 mA) for the water-bone material decomposition task, and 0.79 (at 59 mA) for the K-edge imaging task. As it will be discussed below, different implementations of ACS and DCS may result in different count rate-dependency; however, it is expected that these breaking points remain the same as long as other factors such as pixel sizes are not changed.

The performances of both ACS and DCS were qualitatively consistent with what has been reported previously in terms of the following aspects: (1) The spectral responses to a monoenergetic input at a very low count rate were excellent. (2) The spectral responses were degraded with increasing count rates. The changes from 1 mA to 100 mA appeared very similar to the experimental data showing changes from $5.3 \times 10^5$ cps/mm$^2$ to $4.6 \times 10^7$ cps/mm$^2$. (3) The nCRLBs of DCS at a low count rate were between those of ACS and the conventional PCD. (4) CRCs of ACS were lower than that of the conventional PCD due to a limited detector speed. (5) CRCs of DCS were lower than that of the conventional PCD.

Nevertheless, the ACS and DCS studied in this paper do not necessarily agree with those reported in the literature quantitatively because of differences in various design specifications and experimental settings such as pulse duration time, pixel sizes, pixel thicknesses, electric field strengths, x-ray spectra, and inter-pixel communication schemes. For example, it was reported that with a Medipix3 detector with 110-μm pixels, the count rates where the counting efficiency dropped to 0.90 changed by a factor of 4.3, from $2.8 \times 10^6$ cps/mm$^2$ with ACS activated to $1.2 \times 10^7$ cps/mm$^2$ without ACS activated. In contrast, the changes from the conventional PCD to ACS in this study were a factor of 6.9 for the counting efficiency of 0.90; and the change in the estimated deadtime was a factor of 5.4 from 25.8 ns to 140.5 ns. The performance of Medipix3 at higher count rates might be somewhat better than that of the ACS in this study. It was reported that with an XCounter PDT25-DE detector, the change in the characteristic count rate was a factor of 9-10 from DCS on to DCS off. In contrast, it was found that the change a factor of 8.1 from $4.8 \times 10^6$ cps/pixel for DCS to $3.9 \times 10^7$ cps/pixel for the conventional PCD.

DCS in this study was slower than ACS, despite DCS being expected to be faster than ACS for various reasons. It might be because, one, both DCS and ACS used the identical coincidence processing window width of 20 ns in this study, and two, DCS implemented in this study used the direct windowing scheme, whereas ACS used an up-crossing of the lowest threshold for event detection. As discussed before, the changes from the conventional PCD to ACS and DCS were a factor of 5.4 and 8.1, respectively, which were close to the results of Medipix3 and XCounter, respectively. Nonetheless, in actual implementation and circuitry designs, ACS may need a longer processing time than DCS does and DCS can use the minimum time (which was 20 ns in this study) required to address the time-shifted pulses due to the pixel boundary effect and the vertical separations had larger noise than expected in some cases, for example, K-edge imaging at 1 mA. It is suspected that the random numbers used to break ties to determine the winner pixel and winner window might have increased the uncertainty of the estimation and the use of deterministic rules may decrease the noise at the expense of either the accuracy of the energy reconstruction or the incident locations.

All of ACS, DCS, and MEICC implemented in this study used a straightforward scheme for each detector and used the identical and short coincidence processing time of 20 ns to study the generic characteristics of these detectors. Different implementations are possible and may produce different quantitative results. For example, ACS and DCS that concerns CS with 4 or fewer neighboring pixels than eight neighbors may have a better counting capability, but one needs to invent a way to reconstruct energy accurately. The ACS implemented by Medipix3 may have a longer coincidence processing time (up to 1 μs) and employ a very complex inter-pixel communication and task-sharing scheme. Each pixel computes the energy of one 2×2 super-pixel, determines the winner, and performs instantaneous one-way inter-pixel communication multiple times during the process to share the outcomes and stay consistent between pixels. A DCS with more complex energy reconstruction algorithm may improve the accuracy of the energy recovery. The use of 5×5 pixels instead of 3×3 pixels may further improve the accuracy of the energy recovery for both ACS and DCS. The DCS implemented by Hsieh and Sjolin determined the final winner pixel by rules which were independent of the deposited energy fraction. For MEICC, the use of four neighbors instead of eight neighbors can decrease a probability of false-coincidences, which may improve the performance against PP at higher count rates, although the ability to address CS at lower count rates may be reduced by ~10%. A use of fewer number of coincidence counters such as $2 \times N_C$ (=8) instead of $N_C^2$ (=16) and a different configuration for timers and statuses may result in a more energy- and resource-efficient performance.

As discussed above, the MEICC provides the best nCRLBs for all of the imaging tasks over the count rate range investigated except for a few conditions. PP decreases the merit of MEICC in addressing CS; however, MEICC consistently provides better nCRLBs than the conventional PCD does. The nCRLBs of MEICC for K-edge imaging are in the range of 55-82% of those of the conventional PCD. In contrast, both ACS and DCS have better nCRLBs than the conventional PCD does only when count rates are very low, e.g., when the counting efficiency for ACS are higher than 0.95 for the conventional CT imaging task, 0.84 for the water-bone material decomposition task, and 0.79 for the K-edge imaging task.

In order to improve the spatial resolution using coincidence information and to output data with charge sharing correction/compensation, an MEICC algorithm can be performed on the detector system. The MEICC detector output (e.g., both $N_C$ primary counter and $N_{CC}=N_C^2$ coincidence counters) will be input to the processing element and the MEICC algorithm will be performed. Here $N_C$ is the number of counters such as 4 and $N_{CC}$ is the number of coincidence counters such as 16 (in that case, the number of MEICC detector will output 20=4+16 counter data, whereas the conventional detector will output 4 counter data). The output of the MEICC algorithm will be either charge sharing corrected counter data such as $N_C$ or charge sharing compensated data, both of which are fewer number of datasets than the input to the MEICC algorithm. The output of the MEICC algorithm will then be transferred to the outside of the rotating CT gantry system via, e.g., non-contact data transmission.

Figure 26:
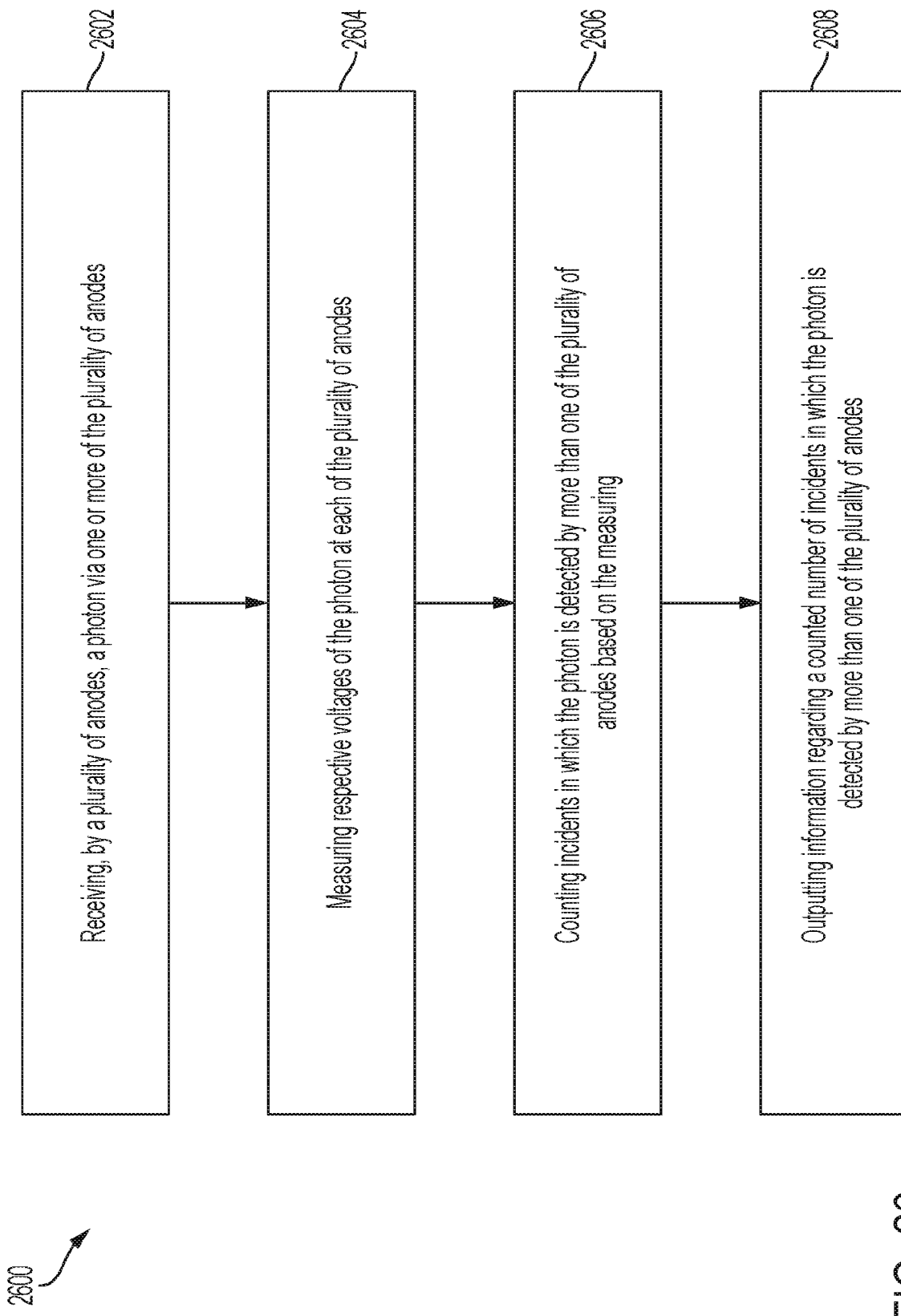
FIG. 26 shows a flow chart for a method according to examples of the present teachings.

FIG. 26 shows a flow chart for a computer-implemented method 2600 according to examples of the present teachings. The method 2600 comprises receiving, by a plurality of anodes, a photon via one or more of the plurality of anodes, as in 2602. The method continues by measuring, by the computing device, respective voltages of the photon at each of the plurality of anodes, as in 2604.

The method 2600 continues by counting incidents in which the photon is detected by more than one of the plurality of anodes based on the measuring, as in 2606. In examples, the counting is based on three different energy levels. The three different energy levels comprise a first energy range of about 20 keV to about 50 keV, a second energy range of about 50 keV to about 80 keV, and a third energy range of about equal to or greater than 80 keV.

In some examples, the counting is based on one or more primary counters and more than one coincidence counters, wherein each primary counter comprises more than one sub-counters. In some examples, the one or more primary counters are configured to operate using direct windowing or thresholding. In some examples, the one or more primary counters are configured to incremented for an event within a corresponding two-sided energy window. In some examples, the one or more primary counters are configured to incremented for an event about a corresponding one-sided energy threshold. In some examples, a number of coincidence counters is equal to or less than a square of the number of primary counters. In some examples, the counting is based on information without spatial information with different number of neighbor pixels.

In examples the counting, as in 2606, further comprises counting a number of spill-in and spill-out incidents with respect to a pixel of interest, as in 2608. A spill-in incident includes an incident in which a voltage measurement of the photon for a pixel neighboring the pixel of interest is greater than a voltage measurement of the photon for the pixel of interest. A spill-out incident includes an incident in which a voltage measurement of the photon for a pixel neighboring the pixel of interest is less than a voltage measurement of the photon for the pixel of interest.

The method 2600 continues by outputting information regarding a counted number of incidents in which the photon is detected by more than one of the plurality of anodes, as in 2610. The information regarding the counted number of incidents in which the photon is detected by more than one of the plurality of anodes is used as part of a production of an image associated with the received photon. In some examples, an output of 8-neighbor pixels is treated as one input. In some examples, an output of 4-neighbor pixels is treated as one input. In some examples, an output of N-neighbor pixels with $N \neq 4$ and $N \neq 8$ are treated as one input. In some examples, an output comprises outputs from the one or more primary counters and outputs from the coincidence counters. In some examples, the output further comprises an additional charge sharing correction/compensation component that takes the one or more primary counters and the coincidence counters data and outputs a corrected/compensated data. In some examples, a number of the output is equal to $N_C$. In some examples, a number of the output is greater than $N_C$. In some examples, a number of the output is less than $N_C$. In some examples, the output comprises spatial information with different number of neighbor pixels. In some examples, the spatial information is with pair-wise connected pixel-specific coincidence counters and provides information for identifying incident locations based on the primary counters and the coincidence counters.

Figure 27:
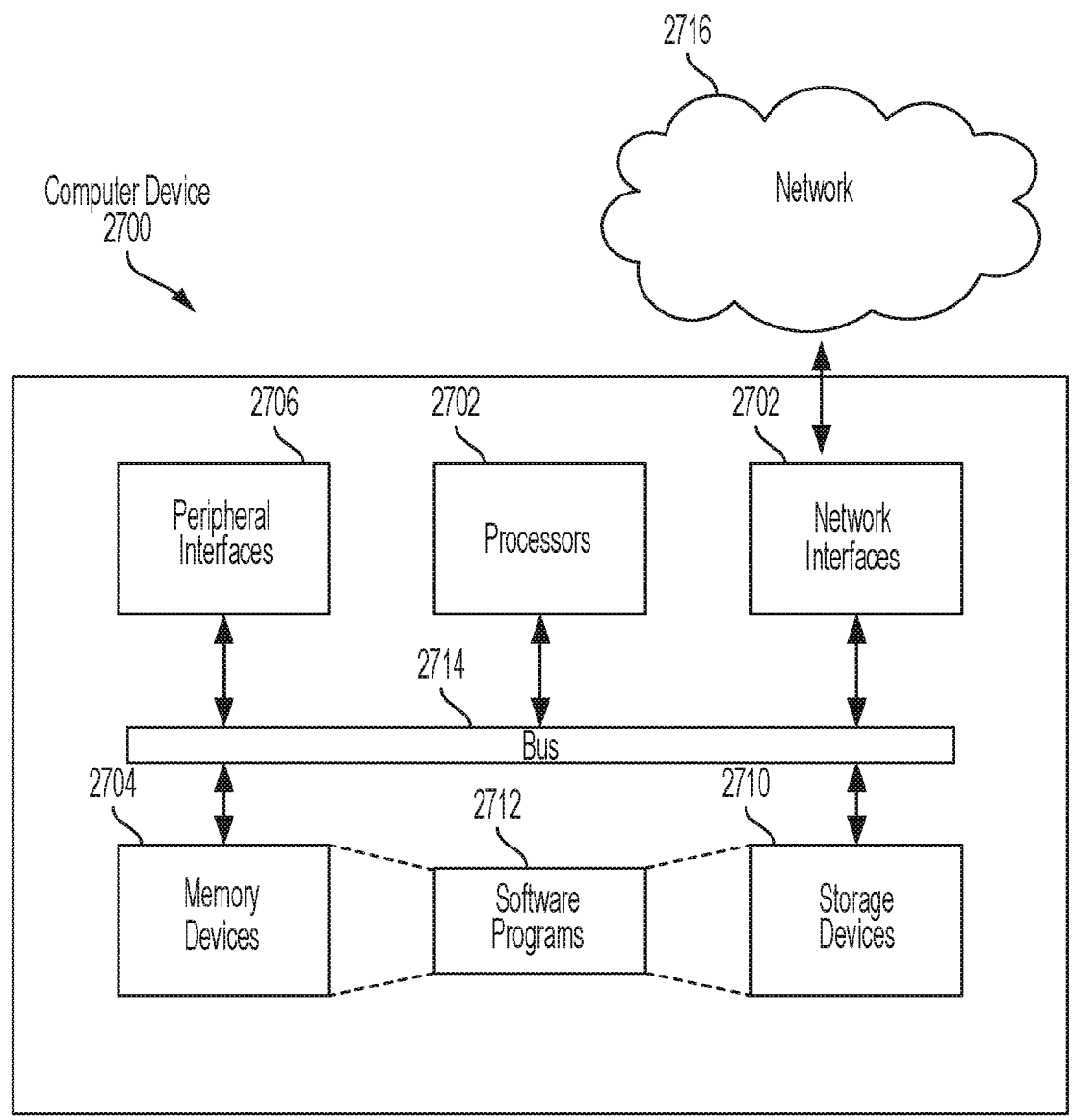
FIG. 27 illustrates an example of a hardware configuration for a computer device, which can be used to perform one or more of the processes described above.

FIG. 27 illustrates an example of a hardware configuration for a computer device, which can be used to perform one or more of the processes described above. The computer device 2700 can be any type of computer devices, such as desktops, laptops, servers, etc., or mobile devices, such as smart telephones, tablet computers, cellular telephones, personal digital assistants, etc. As illustrated in FIG. 27, the computer device 2700 can include one or more processors 2702 of varying core configurations and clock frequencies. The computer device 2700 can also include one or more memory devices 2704 that serve as a main memory during the operation of the computer device 2700. For example, during operation, a copy of the software that supports the above-described operations can be stored in the one or more memory devices 2704. The computer device 2700 can also include one or more peripheral interfaces 2706, such as keyboards, mice, touchpads, computer screens, touchscreens, etc., for enabling human interaction with and manipulation of the computer device 2700. The computer device 2700 can also include a bus 2714, such a data communication bus that connects various components of the computer device 2700.

The computer device 2700 can also include one or more network interfaces 2708 for communicating via one or more networks, such as Ethernet adapters, wireless transceivers, or serial network components, for communicating over wired or wireless media using protocols. The computer device 2700 can also include one or more storage device 2710 of varying physical dimensions and storage capacities, such as flash drives, hard drives, random access memory, etc., for storing data, such as images, files, and program instructions for execution by the one or more processors 2702.

Additionally, the computer device 2700 can include one or more software programs 2712 that enable the functionality described above. The one or more software programs 2712 can include instructions that cause the one or more processors 2702 to perform the processes described herein.

Copies of the one or more software programs 2712 can be stored in the one or more memory devices 2704 and/or on the one or more storage devices 2710. Likewise, the data utilized by one or more software programs 2712 can be stored in the one or more memory devices 2704 and/or on the one or more storage devices 2710.

In implementations, the computer device 2700 can communicate with other devices via a network 2716. The other devices can be any types of devices as described above. The network 2716 can be any type of network, such as a local area network, a wide-area network, a virtual private network, the Internet, an intranet, an extranet, a public switched telephone network, an infrared network, a wireless network, and any combination thereof. The network 2716 can support communications using any of a variety of commercially-available protocols, such as TCP/IP, UDP, 051, FTP, UPnP, NFS, CIFS, AppleTalk, and the like. The network 2716 can be, for example, a local area network, a wide-area network, a virtual private network, the Internet, an intranet, an extranet, a public switched telephone network, an infrared network, a wireless network, and any combination thereof.

The network can include one or more antennas or antenna array, which may include any type of antennas suitable for transmitting and/or receiving wireless communication signals, blocks, frames, transmission streams, packets, messages and/or data. For example, the one or more antennas or antenna array may include any suitable configuration, structure and/or arrangement of one or more antenna elements, components, units, assemblies and/or arrays. The one or more antennas or antenna array may include, for example, antennas suitable for directional communication, e.g., using beamforming techniques. For example, the one or more antennas or antenna array may include a phased array antenna, a multiple element antenna, a set of switched beam antennas, and/or the like. In some embodiments, the one or more antennas or antenna array may implement transmit and receive functionalities using separate transmit and receive antenna elements. In some embodiments, the one or more antennas or antenna array may implement transmit and receive functionalities using common and/or integrated transmit/receive elements. In some examples, the one or more antennas or antenna array may communicate over a wireless communication medium and may include a wireless communication channel over a 2.4 Gigahertz (GHz) frequency band, or a 5 GHz frequency band, a mmWave frequency band, e.g., a 60 GHz frequency band, a S1G band, and/or any other frequency band.

The computer device 2700 may include one or more radios including circuitry and/or logic to perform wireless communication between wireless communication devices. The one or more radios may include one or more wireless receivers (Rx) including circuitry and/or logic to receive wireless communication signals, RF signals, frames, blocks, transmission streams, packets, messages, data items, and/or data. The one or more radios may include one or more wireless transmitters (Tx) including circuitry and/or logic to transmit wireless communication signals, RF signals, frames, blocks, transmission streams, packets, messages, data items, and/or data.

In some examples, the one or more radios, transmitter(s), and/or receiver(s) may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, the one or more radios may include or may be implemented as part of a wireless Network Interface Card (NIC), and the like. In some examples, the one or more radios may be configured to communicate over a 2.4 GHz band, a 5 GHz band, a S1G band, a directional band, e.g., an mmWave band, and/or any other band. In some examples, the one or more radios may include, or may be associated with, the one or more antennas, respectively.

The computer device 2700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 2700 as described above need not be enclosed within a single enclosure or even located in close proximity to one another. Those skilled in the art will appreciate that the above-described componentry are examples only, as the computer device 2700 can include any type of hardware componentry, including any necessary accompanying firmware or software, for performing the disclosed implementations. The computer device 2700 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not of limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur by persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like, can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method for photon detection, the method comprising:
receiving, by a plurality of anodes, a photon via one or more of the plurality of anodes;
measuring respective voltages of the photon at each of the plurality of anodes;
counting incidents in which the photon is detected by more than one of the plurality of anodes based on the measuring, wherein the counting comprises storing in separate counters, with respect to a pixel of interest, and for each affected pixel, a no-charge sharing event count, and a plurality of counts of coincidences of photons with respective different energy levels, wherein counts of spill-in events and spill-out events are represented; and
outputting information regarding a counted number of incidents in which the photon is detected by more than one of the plurality of anodes,
wherein the information regarding the counted number of incidents in which the photon is detected by more than one of the plurality of anodes is used as part of a production of an image associated with the photon that is received.

2. The method of claim 1, wherein the counting is based on one or more primary counters and more than one coincidence counters, wherein each primary counter comprises more than one sub-counters.

3. The method of claim 2, wherein the one or more primary counters are configured to operate using direct windowing or thresholding.

4. The method of claim 2, wherein the one or more primary counters are configured to be incremented for an event within a corresponding two-sided energy window.

5. The method of claim 2, wherein the one or more primary counters are configured to be incremented for an event about a corresponding one-sided energy threshold.

6. The method of claim 2, wherein a number of coincidence counters is equal to or less than a square of a number of primary counters.

7. The method of claim 1, wherein the counting is based on information without spatial information with different numbers of neighbor pixels.

8. The method of claim 1, wherein an output of 8-neighbor pixels is treated as one input.

9. The method of claim 1, wherein an output of 4-neighbor pixels is treated as one input.

10. The method of claim 1, wherein an output of N-neighbor pixels with N≠4 and N≠8 are treated as one input.

11. The method of claim 10, wherein the output further comprises an additional charge sharing correction/compensation component that takes one or more primary counters data and coincidence counters data and outputs a corrected/ compensated data and wherein the output comprises spatial information with different number of neighbor pixels.

12. The method of claim 10, wherein a number of the output is equal to a number of the different energy levels, or is greater than the number of different energy levels.

13. The method of claim 12, wherein the spatial information is with pair-wise connected pixel-specific coincidence counters and provides information for identifying incident locations based on the primary counters and the coincidence counters.

14. The method of claim 1, wherein an output comprises outputs from the one or more primary counters and outputs from a plurality of coincidence counters.

15. The method of claim 1, wherein the counting is based on three different energy levels and the counting further comprises counting a number of spill-in and spill-out incidents with respect to a pixel of interest.

16. The method of claim 15, wherein the three different energy levels comprise a first energy range of about 20 keV to about 50 keV, a second energy range of about 50 keV to about 80 keV, and a third energy range of about equal to or greater than 80 keV.

17. The method of claim 1, wherein a spill-in incident includes an incident in which a voltage measurement of the photon for a pixel neighboring the pixel of interest is greater than a voltage measurement of the photon for the pixel of interest or wherein a spill-out incident includes an incident in which a voltage measurement of the photon for a pixel neighboring the pixel of interest is less than a voltage measurement of the photon for the pixel of interest.

18. The method of claim 1, wherein the photon originates as part of operation of a photon counting detector-based x-ray computed tomography (PCD-CT) system.

19. A computer program product comprising a computer readable storage medium having program instructions embodied therewith, the program instructions executable by a computing device to cause the computing device to perform operations comprising:

receiving, by a plurality of anodes, a photon via one or more of the plurality of anodes;

measuring respective voltages of the photon at each of the plurality of anodes;

counting incidents in which the photon is detected by more than one of the plurality of anodes based on the measuring, wherein the counting comprises storing in separate counters, with respect to a pixel of interest, and for each affected pixel, a no-charge sharing event count, and a plurality of counts of coincidences of photons with different energy levels, wherein counts of spill-in events and spill-out events are represented; and outputting information regarding a counted number of incidents in which the photon is detected by more than one of the plurality of anodes, wherein the information regarding the counted number of incidents in which the photon is detected by more than one of the plurality of anodes is used as part of a production of an image associated with the photon that is received.

20. A system comprising:

a processor, a computer readable memory, a non-transitory computer readable storage medium associated with a computing device, and program instructions executable by the computing device to cause the computing device to perform operations comprising:

receiving, by a computing device coupled to a plurality of anodes, a photon via one or more of the plurality of anodes;

measuring, by the computing device, respective voltages of the photon at each of the plurality of anodes;

counting, by the computing device, incidents in which the photon is detected by more than one of the plurality of anodes based on the measuring, wherein the counting comprises storing in separate counters, with respect to a pixel of interest, and for each affected pixel, a no-charge sharing event count, and a plurality of counts of coincidences of photons with different energy levels, wherein counts of spill-in events and spill-out events are represented; and outputting, by the computing device, information regarding a counted number of incidents in which the photon is detected by more than one of the plurality of anodes, wherein the information regarding the counted number of incidents in which the photon is detected by more than one of the plurality of anodes is used as part of a production of an image associated with the photon that is received.

* * * * *

UNITED STATES PATENT AND TRADEMARK OFFICE
CERTIFICATE OF CORRECTION

PATENT NO. : 12,196,897 B2  
APPLICATION NO. : 17/795697  
DATED : January 14, 2025  
INVENTOR(S) : Katsuyuki Taguchi Page 1 of 1

It is certified that error appears in the above-identified patent and that said Letters Patent is hereby corrected as shown below:

On the Title Page

Column 2, Abstract, Line 11: "courted" should be -- counted --.

Signed and Sealed this  
Eleventh Day of March, 2025

Coke Morgan Stewart  
*Acting Director of the United States Patent and Trademark Office*